United States Patent
Kim et al.

(10) Patent No.: US 11,200,639 B1
(45) Date of Patent: Dec. 14, 2021

(54) APPARATUS AND METHOD FOR PERFORMING ARTIFICIAL INTELLIGENCE ENCODING AND DECODING ON IMAGE BY USING LOW-COMPLEXITY NEURAL NETWORK

(71) Applicant: SAMSUNG ELECTRONICS CO., LTD., Suwon-si (KR)

(72) Inventors: Jaehwan Kim, Suwon-si (KR); Youngo Park, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/237,775

(22) Filed: Apr. 22, 2021

(30) Foreign Application Priority Data

Jun. 11, 2020 (KR) .......................... 10-2020-0070984
Oct. 6, 2020 (KR) .......................... 10-2020-0128878

(51) Int. Cl.
*G06T 3/40* (2006.01)
*G06N 3/04* (2006.01)
*G06N 3/08* (2006.01)
*G06T 9/00* (2006.01)

(52) U.S. Cl.
CPC ......... *G06T 3/4046* (2013.01); *G06N 3/0454* (2013.01); *G06N 3/08* (2013.01); *G06T 9/002* (2013.01)

(58) Field of Classification Search
CPC ..... G06T 3/4046; G06T 9/002; G06N 3/0454; G06N 3/08
See application file for complete search history.

(56) References Cited

U.S. PATENT DOCUMENTS

| 10,825,203 | B2 | 11/2020 | Kim et al. |
| 2020/0126262 | A1* | 4/2020 | Kim .................. G06T 9/002 |
| 2021/0134020 | A1 | 5/2021 | Dinh et al. |
| 2021/0136393 | A1 | 5/2021 | Kang et al. |

FOREIGN PATENT DOCUMENTS

| KR | 10-2018-0035760 A | 4/2018 |
| KR | 10-2018-0042728 A | 4/2018 |
| KR | 10-1885855 B1 | 8/2018 |
| KR | 10-2020-0044661 A | 4/2020 |
| KR | 10-2020-0044666 A | 4/2020 |

OTHER PUBLICATIONS

US 11,138,691 B2, 10/2021, Park et al. (withdrawn)
Communication dated Oct. 25, 2021 issued by the Korean Patent Office in Counterpart Korean Application No. 10-2020-0128878.
Communication dated Sep. 16, 2021 issued by the International Searching Authority in counterpart Application No. PCT/KR2021/004818 (PCT/ISA/220, PCT/ISA/210, and PCT/ISA/237).

* cited by examiner

*Primary Examiner* — Mark Roz
(74) *Attorney, Agent, or Firm* — Sughrue Mion, PLLC

(57) ABSTRACT

An artificial intelligence (AI) encoding apparatus includes a processor configured to execute one or more instructions stored in the AI encoding apparatus to: input, to a downscale deep neural network (DNN), a first reduced image downscaled from an original image and a reduction feature map having a resolution lower than a resolution of the original image; obtain a first image AI-downscaled from the original image in the downscale DNN; generate image data by performing a first encoding process on the first image; and output the image data.

10 Claims, 25 Drawing Sheets

FIG. 5

| IMAGE-RELATED INFORMATION | DNN SETTING INFORMATION |
|---|---|
| SD, 10Mbps, AV1 | "A" DNN SETTING INFORMATION |
| HD, 15Mbps, H.264 | "B" DNN SETTING INFORMATION |
| Full HD, 20Mbps, HEVC | "C" DNN SETTING INFORMATION |
| Full HD, 15Mbps, HEVC | "D" DNN SETTING INFORMATION |

# APPARATUS AND METHOD FOR PERFORMING ARTIFICIAL INTELLIGENCE ENCODING AND DECODING ON IMAGE BY USING LOW-COMPLEXITY NEURAL NETWORK

CROSS-REFERENCE TO RELATED APPLICATIONS

This application is based on and claims priority under 35 U.S.C. § 119 to Korean Patent Application Nos. 10-2020-0070984, filed on Jun. 11, 2020, and 10-2020-0128878, filed on Oct. 6, 2020, in the Korean Intellectual Property Office, the disclosures of which are incorporated by reference herein in their entireties.

BACKGROUND

1. Field

The disclosure relates to an image processing field. More particularly, the disclosure relates to a method and apparatus for encoding and decoding an image based on artificial intelligence (AI).

2. Description of the Related Art

An image is encoded by a codec conforming to a certain data compression standard, for example, a Moving Picture Experts Group (MPEG) standard, and is then stored in a recording medium in the form of a bitstream or transmitted via a communication channel.

With the development and spread of hardware capable of reproducing and storing high-resolution/high-quality images, the need for a codec capable of effectively encoding and decoding high-resolution/high-quality images is increasing.

SUMMARY

Provided are an artificial intelligence (AI) encoding apparatus and method and an AI decoding apparatus and method, which encode and decode an image based on AI in order to achieve a low bitrate.

Additional aspects will be set forth in part in the description which follows and, in part, will be apparent from the description, or may be learned by practice of the presented embodiments of the disclosure.

According to an embodiment of the disclosure, an artificial intelligence (AI) encoding apparatus includes a processor configured to execute one or more instructions stored in the AI encoding apparatus to: input, to a downscale neural network (NN), a first reduced image downscaled from an original image and a reduction feature map having a resolution lower than a resolution of the original image; obtain a first image AI-downscaled from the original image in the downscale NN; generate image data by performing a first encoding on the first image; and output the image data.

In an embodiment of the disclosure, the processor may be further configured to obtain, as the reduction feature map, a residual image between a second reduced image downscaled from the original image and the first reduced image.

In an embodiment of the disclosure, the processor may be further configured to: obtain a plurality of first reduced images including pixels located at different points from each other within pixel groups of the original image; and obtain a plurality of residual images between the plurality of first reduced images and the second reduced image as the reduction feature map.

In an embodiment of the disclosure, a sum of a number of the plurality of first reduced images and a number of the plurality of residual images may be equal to a number of input channels of a first layer of the downscale NN.

In an embodiment of the disclosure, the first image may be obtained by adding the second reduced image and an output image of a last layer of the downscale NN.

In an embodiment of the disclosure, the processor may be further configured to obtain an edge map corresponding to the original image as the reduction feature map.

In an embodiment of the disclosure, the first image may be obtained by adding a third reduced image downscaled from the original image and an output image of a last layer of the downscale NN.

In an embodiment of the disclosure, the processor may be further configured to: obtain a modified image downscaled and upscaled from the original image; and obtain a residual image between a fourth reduced image downscaled from the modified image and the first reduced image as the reduction feature map.

In an embodiment of the disclosure, output data of any one layer of a plurality of layers of the downscale NN may be added to output data of preceding layers prior to the any one layer, and a sum of the output data of the any one layer and the output data of the preceding layers may be input to a next layer of the any one layer.

According to another embodiment of the disclosure, an artificial intelligence (AI) encoding method includes: inputting, to a downscale neural network (NN), a first reduced image downscaled from an original image and a reduction feature map having a resolution lower than a resolution of the original image; obtaining a first image AI-downscaled from the original image in the downscale DNN; generating image data by performing a first encoding on the first image; and outputting the image data.

The AI encoding method may further include: obtaining, as the reduction feature map, a residual image between a second reduced image that is downscaled from the original image and the first reduced image.

The AI encoding method may further include: obtaining a plurality of first reduced images comprising pixels located at different points from each other within pixel groups of the original image; and obtaining, as the reduction feature map, a plurality of residual images between the plurality of first reduced images and the second reduced image.

A sum of a number of the plurality of first reduced images and a number of the plurality of residual images may be equal to a number of input channels of a first layer of the downscale NN.

The AI encoding method may further include: obtaining an edge map corresponding to the original image as the reduction feature map, wherein the obtaining the first image may include: adding a second reduced image downscaled from the original image and an output image of a last layer of the downscale NN.

According to another embodiment of the disclosure, a computer-readable recording medium having recorded thereon a program for executing the AI encoding method is provided.

According to another embodiment of the disclosure, an artificial intelligence (AI) decoding apparatus includes: a processor configured to execute one or more instructions stored in the AI decoding apparatus to: obtain image data generated as a result of performing a first encoding on a first image; obtain a second image by performing a first decoding process on the image data; input, to an upscale neural network (NN), a first enlarged image upscaled from the second image and an enlargement feature map having a resolution higher than a resolution of the second image; obtain a third image AI-upscaled from the second image in the upscale NN; and provide the third image to a display.

According to another embodiment of the disclosure, a server for providing an image based on artificial intelligence (AI) is provided. The server may include one or more processors configured to execute computer readable instructions to: obtain an original image; downscale the original image to a first reduced image and a second reduced image based on a first non-AI downscaling method and a second non-AI downscaling method, respectively; and obtain an AI downscaled image by processing the first reduced image and a residual image between the first reduced image and the second reduced image, through a downscale neural network (NN).

The one or more processors may be further configured to obtain the AI downscaled image by combining an processing result of the first reduced image and the residual image through the downscale NN, with the second reduced image.

The downscale NN may include a plurality of convolutional layers, and an input of the downscale NN may be directly provided to each of the plurality of convolutional layers.

The residual image may have a lower resolution than a resolution of the original image.

BRIEF DESCRIPTION OF THE DRAWINGS

Descriptions about respective drawings are provided to gain a sufficient understanding of the drawings of the present specification.

The above and other aspects, features, and advantages of certain embodiments of the disclosure will be more apparent from the following description taken in conjunction with the accompanying drawings, in which:

FIG. 5 is an exemplary diagram illustrating a mapping relationship between a plurality of pieces of image-related information and a plurality of pieces of DNN setting information;

DETAILED DESCRIPTION

Figure 1:
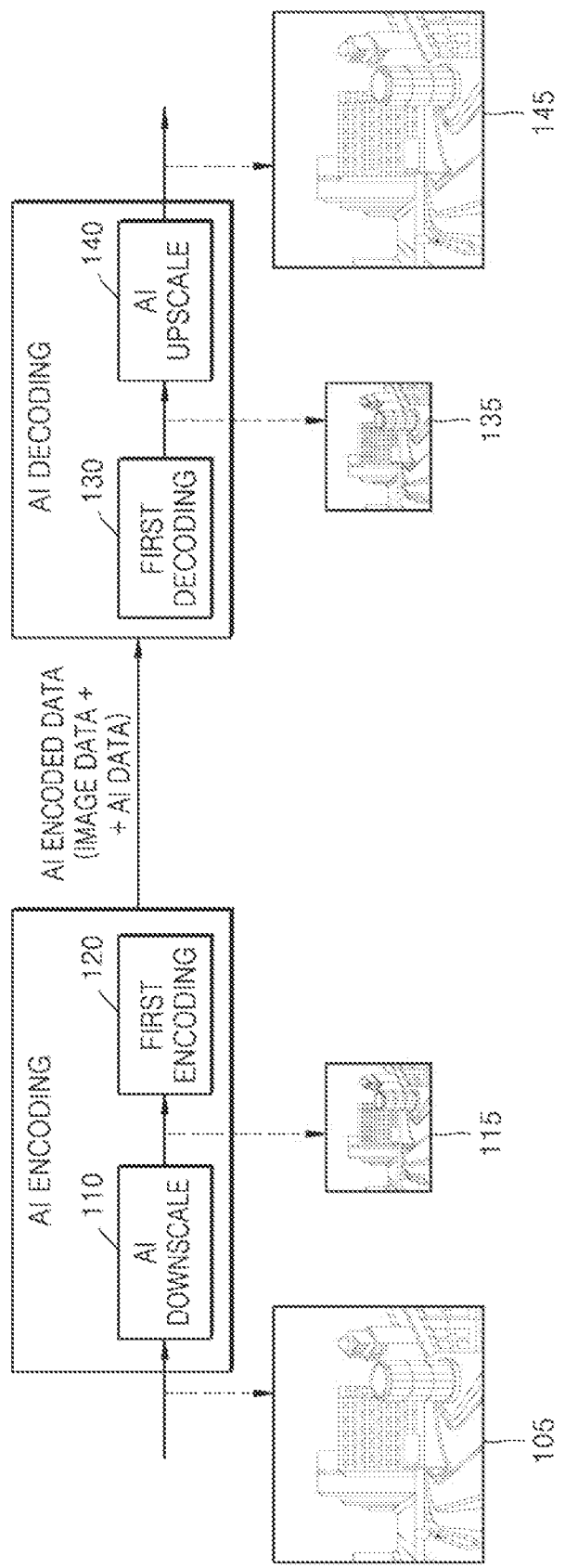
FIG. 1 is a diagram for describing an artificial intelligence (AI) encoding process and an AI decoding process, according to an embodiment of the disclosure.

Various embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

In describing the disclosure, when the detailed description of the relevant known functions or configurations is determined to unnecessarily obscure the gist of the disclosure, the detailed description thereof may be omitted herein. Also, numbers (e.g., first, second, etc.) used in the description of this specification are merely identification symbols for distinguishing one element from another.

Also, when one element is referred to as "connected" or "coupled" to another element, the one element may be directly connected or coupled to the other element, but it will be understood that the elements may be connected or coupled to each other via another element therebetween unless the context clearly indicates otherwise.

Also, an element represented by "-er(or) (unit)," "module," etc. in this specification may be one element in which two or more elements are combined, or may be divided into two or more element for each more subdivided function. Also, each of the elements to be described below may additionally perform, in addition to the main function thereof, some or all of the functions that other elements are responsible for, and some of the main functions that the respective elements are responsible for may be dedicated by other elements.

Throughout the disclosure, the expression "at least one of a, b or c" indicates only a, only b, only c, both a and b, both a and c, both b and c, all of a, b, and c, or variations thereof.

Also, in this specification, an "image" or a "picture" may represent a still image, a moving image including a plurality of consecutive still images (or frames), or a video.

Also, in this specification, a "deep neural network (DNN)" is a representative example of an artificial neural network model that simulates a brain nerve, and is not limited to an artificial neural network model using a specific algorithm.

Also, in this specification, "parameters" are values used in an operation process of each layer constituting a neural network, and may include, for example, weights used when an input value is applied to a certain operation expression. Parameters may be expressed in a matrix form. Parameters are values set as a result of training and may be updated through separate training data as necessary.

Also, in this specification, a "first DNN" refers to a DNN used for AI downscale of an image, and a "second DNN" refers to a DNN used for AI upscale of an image.

Also, in this specification, "DNN setting information" is information related to elements constituting a DNN and includes the above-described parameters. A first DNN or a second DNN may be configured by using DNN setting information.

Also, in this specification, an "original image" refers to an image to be subjected to AI encoding, and a "first image" refers to an image obtained as a result of AI downscaling an original image in an AI encoding process. Also, a "second image" refers to an image obtained through first decoding in an AI decoding process, and a "third image" refers to an image obtained by AI upscaling a second image in an AI decoding process.

Also, in this specification, "AI downscale" refers to a process of reducing a resolution of an image based on AI, and "first encoding" refers to an encoding process performed by a frequency conversion-based image compression method. Also, "first decoding" refers to a decoding process performed using a frequency conversion-based image reconstruction method, and "AI upscale" refers to a process of increasing a resolution of an image based on AI.

FIG. 1 is a diagram describing an AI encoding process and an AI decoding process, according to an embodiment of the disclosure.

As a resolution of an image increases rapidly for video streaming services, the amount of information to be processed for encoding and/or decoding increases, and accordingly, there is a need for a method of improving image encoding and decoding efficiency.

As illustrated in FIG. 1, according to an embodiment of the disclosure, a first image 115 is obtained by performing an AI downscale process 110 on an original image 105 having a high resolution. Because a first encoding process 120 and a first decoding process 130 are performed on the first image 115 having a relatively low resolution, a bitrate may be significantly reduced, as compared with the case of performing the first encoding process 120 and the first decoding process 130 on the original image 105.

Specifically, referring to FIG. 1, according to an embodiment of the disclosure, in an AI encoding process, the first image 115 is obtained by performing the AI downscale process 110 on the original image 105, and the first encoding process 120 is performed on the first image 115. In an AI decoding process, AI-encoded data including image data and AI data obtained as a result of the AI encoding is received, a second image 135 is obtained through the first decoding process 130, and a third image 145 is obtained by performing an AI upscale process 140 on the second image 135.

More specifically, in the AI encoding process, when the original image 105 is input, the AI downscale process 110 is performed on the original image 105 so as to obtain the first image 115 having a certain resolution and/or a certain image quality. At this time, the AI downscale process 110 is performed based on AI. The AI for the AI downscale process 110 has to be joint-trained with the AI for the AI upscale process 140 of the second image 135. This is because, when the AI for the AI downscale process 110 and the AI for the AI upscale process 140 are trained separately, the difference between the original image 105 to be subjected to the AI encoding and the third image 145 reconstructed through the AI decoding increases.

In an embodiment of the disclosure, the AI data may be used so as to maintain such a joint relationship between the AI encoding process and the AI decoding process. Therefore, the AI data obtained through the AI encoding process has to include information indicating an upscale target, and in the AI decoding process, the AI upscale process 140 has to be performed on the second image 135 according to the upscale target identified based on the AI data.

The AI for the AI downscale process 110 and the AI for the AI upscale process 140 may be implemented as a DNN. As described later with reference to FIG. 11, because the first DNN and the second DNN are joint-trained through sharing of loss information under a certain target, an AI encoding apparatus may provide, to an AI decoding apparatus, target information used when the first DNN and the second DNN perform joint training, and the AI decoding apparatus may perform the AI upscale process 140 to an image quality and/or a resolution targeting the second image 135 based on the provided target information.

Specifically, in the first encoding process 120 and the first decoding process 130 illustrated in FIG. 1, the amount of information of the first image 115 obtained by performing the AI downscale process 110 on the original image 105 may be reduced through the first encoding process 120. The first encoding process 120 may include a process of generating predicted data by predicting the first image 115, a process of generating residual data corresponding to the difference between the first image 115 and the predicted data, a process of transforming the residual data, which is a spatial domain component, into a frequency domain component, a process of quantizing the residual data transformed into the frequency domain component, a process of entropy-encoding the quantized residual data, and the like. The first encoding process 120 may be implemented through one of image compression methods using frequency transformation, such as MPEG-2, H.264 Advanced Video Coding (AVC), MPEG-4, High Efficiency Video Coding (HEVC), VC-1, VP8, VP9, and AOMedia Video 1 (AV1).

The second image 135 corresponding to the first image 115 may be reconstructed through the first decoding process 130 of the image data. The first decoding process 130 may include a process of generating quantized residual data by performing entropy decoding on image data, a process of performing inverse quantization on the quantized residual data, a process of transforming residual data of a frequency domain component into a spatial domain component, a process of generating predicted data, a process of reconstructing the second image 135 by using the predicted data and the residual data, and the like. The first decoding process 130 may be implemented through an image reconstruction method corresponding to one of the image compression methods using frequency transformation, such as MPEG-2, H.264, MPEG-4, HEVC, VC-1, VP8, VP9 and AV1 used in the first encoding process 120.

The AI encoded data obtained through the AI encoding process may include image data obtained as a result of performing the first encoding process 120 on the first image 115 and AI data related to the AI downscale process 110 of the original image 105. The image data may be used in the first decoding process 130, and the AI data may be used in the AI upscale process 140.

The image data may be transmitted in a bitstream form. The image data may include data obtained based on pixel values of the first image 115, for example, residual data that is the difference between the first image 115 and the predicted data of the first image 115. Also, the image data includes information used in the process of performing the first encoding process 120 on the first image 115. For example, the image data may include prediction mode information used to perform the first encoding process 120 on the first image 115, motion information, information related to quantization parameters used in the first encoding process 120, and the like. The image data may be generated in accordance with a rule (e.g., a syntax) of an image compression method used in the first encoding process 120 from among the image compression methods using frequency transformation, such as MPEG-2, H.264 AVC, MPEG-4, HEVC, VC-1, VP8, VP9, and AV1.

The AI data is used in the AI upscale process 140 based on the second DNN. As described above, because the first DNN and the second DNN are joint-trained, the AI data includes information that enables the AI upscale process 140 to be accurately performed on the second image 135 through the second DNN. In the AI decoding process, the AI upscale process 140 may be performed to a resolution and/or an image quality targeting the second image 135 based on the AI data.

The AI data may be transmitted together with the image data in a bitstream form. According to an implementation, the AI data may be transmitted separately from the image data in a frame or packet form. When the AI data is separately provided from the image data, the AI data may be transmitted without being encoded. Alternatively, according to an implementation, the AI data may be transmitted by being included in the image data. The image data and the AI data may be transmitted through the same network or different networks.

Figure 2:
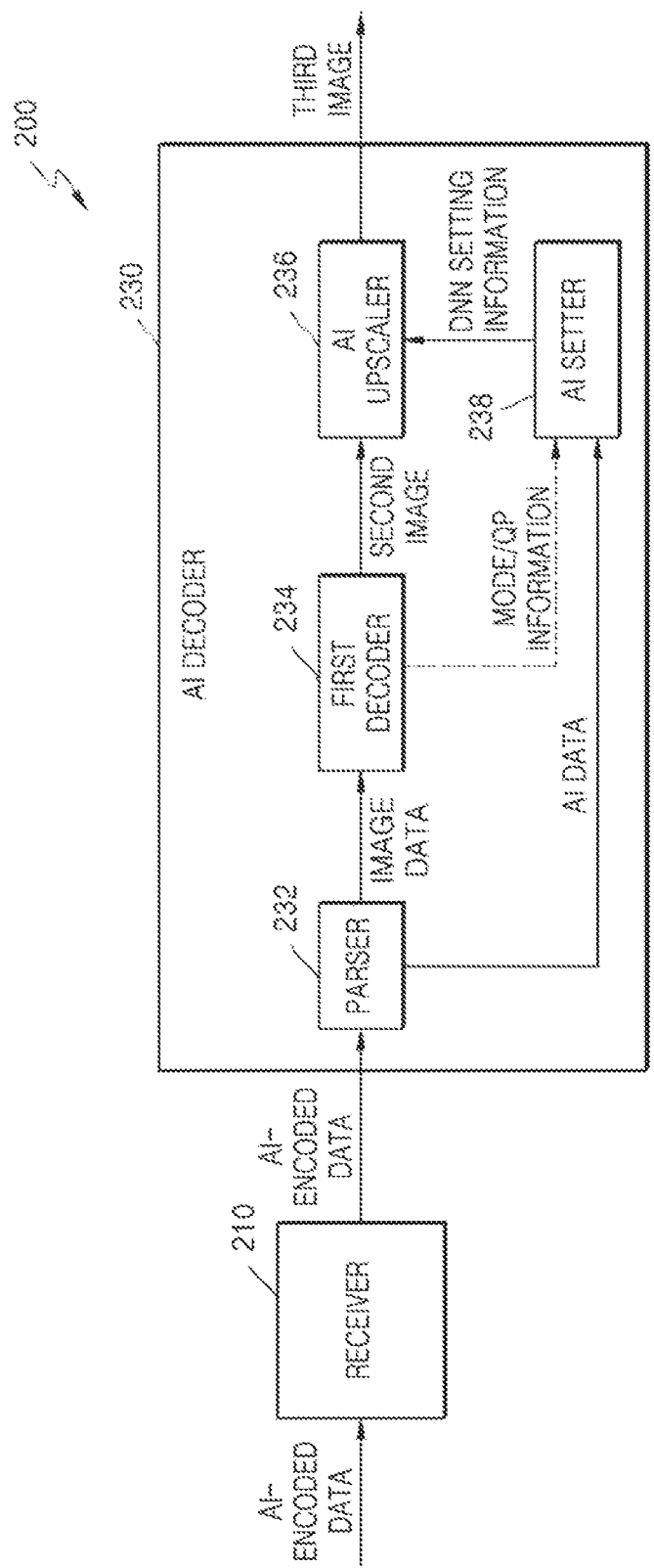
FIG. 2 is a block diagram illustrating a configuration of an AI decoding apparatus, according to an embodiment of the disclosure.

FIG. 2 is a block diagram illustrating a configuration of an AI decoding apparatus 200, according to an embodiment of the disclosure.

Referring to FIG. 2, the AI decoding apparatus 200 according to an embodiment of the disclosure includes a receiver 210 and an AI decoder 230. The AI decoder 230 may include a parser 232, a first decoder 234, an AI upscaler 236, and an AI setter 238.

In FIG. 2, the receiver 210 and the AI decoder 230 are illustrated as separate devices, but the receiver 210 and the AI decoder 230 may be implemented through a single processor. In this case, the receiver 210 and the AI decoder 230 may be implemented as a dedicated processor, or may be implemented by a combination of software and a general-purpose processor such as an application processor (AP), a central processing unit (CPU), or a graphics processing unit (GPU). Also, in the case of a dedicated processor, the dedicated processor may include a memory for implementing the embodiment of the disclosure, or may include a memory processor for using an external memory.

The receiver 210 and the AI decoder 230 may be implemented by a plurality of processors. In particular, the receiver 210 and the AI decoder 230 may be implemented by a combination of dedicated processors (e.g., an AI accelerator, an application-specific integrated circuit (ASIC), etc.), or may be implemented by a combination of software and a plurality of general-purpose processors such as an AP, a CPU, or a GPU. In an embodiment of the disclosure, the receiver 210 may be implemented as a first processor, the first decoder 234 may be implemented as a second processor that is different from the first processor, and the parser 232, the AI upscaler 236, and the AI setter 238 may be implemented as a third processor that is different from the first processor and the second processor.

The receiver 210 receives AI-encoded data obtained as a result of AI encoding. For example, the AI-encoded data may include a video file having a file format such as mp4 or mov.

The receiver 210 may receive AI-encoded data transmitted via a network. The receiver 210 outputs the AI encoded data to the AI decoder 230.

In an embodiment of the disclosure, the AI-encoded data may be obtained from a data storage medium including a magnetic medium such as a hard disk, a floppy disk, and magnetic tape, an optical recording medium such as a compact disc read-only memory (CD-ROM) and a digital versatile disc (DVD), and a magneto-optical medium such as a floptical disk.

The parser 232 parses the AI-encoded data, transmits, to the first decoder 234, image data generated as a result of performing the first encoding process on the first image 115, and transmits AI data to the AI setter 238.

In an embodiment of the disclosure, the parser 232 may parse the image data and the AI data that are included in the AI-encoded data separately from each other. The parser 232 may read a header in the AI encoded data and distinguish between the AI data and the image data included in the AI encoded data. In one example, the AI data may be included in a Vendor Specific InfoFrame (VSIF) of a high definition multimedia interface (HDMI) stream. The structure of the AI-encoded data including the AI data and the image data separated from each other will be described later with reference to FIG. 9.

In another embodiment of the disclosure, the parser 232 may parse the image data from the AI encoded data, and may extract the AI data from the image data, wherein the AI data may be intrinsically or additionally contained in the image data. The parser 232 may transmit the extracted AI data to the AI setter 238, and may transmit the entire image data or the remaining image data other than the extracted AI data, to the first decoder 234. That is, the AI data may be included in the image data. For example, the AI data may be included in supplemental enhancement information (SEI), which is an additional information area of a bitstream corresponding to the image data. The structure of the AI-encoded data including the image data in which the AI data is included will be described later with reference to FIG. 10.

In another embodiment of the disclosure, the parser 232 may divide the bitstream corresponding to the image data into a first bitstream to be processed by the first decoder 234 and a second bitstream corresponding to the AI data, and output the first and the second bitstreams to the first decoder 234 and the AI setter 238, respectively.

The parser 232 may confirm that the image data included in the AI encoded data is image data obtained through a certain codec (e.g., MPEG-2, H.264, MPEG-4, HEVC, VC-1, VP8, VP9, or AV1). In this case, the corresponding information may be transmitted to the first decoder 234 so that the image data may be processed by the identified codec.

The first decoder 234 performs decoding on the image data received from the parser 232, to obtain the second image 135 corresponding to the first image 115, as a reconstructed image of the first image 115. The second image 135 obtained by the first decoder 234 is provided to the AI upscaler 236.

According to an implementation, first decoding-related information, such as prediction mode information, motion information, and quantization parameter information, may be provided from the first decoder 234 to the AI setter 238. The first decoding-related information may be used to obtain DNN setting information.

The AI data provided to the AI setter 238 includes pieces of information that enable the second image 135 to be AI-upscaled. In this case, an upscale target of the second image 135 may correspond to a downscale target of the first DNN. Therefore, the AI data may include information that enables identification of the downscale target of the first DNN, and/or enables identification of the upscale target of the second DNN.

Specific examples of the information included in the AI data include difference information about the difference between the resolution of the original image 105 and the resolution of the first image 115 and information related to the first image 115.

The difference information may be expressed as information about the degree of resolution conversion of the first image 115 with respect to the original image 105 (e.g., resolution conversion rate information). Because the resolution of the first image 115 may be known through the resolution of the reconstructed second image 135 and the degree of resolution conversion may be confirmed therethrough, the difference information may be expressed only with resolution information of the original image 105. The resolution information may be expressed as a horizontal/vertical screen size, or may be expressed as a ratio (16:9, 4:3, etc.) and a size of one axis. Also, when there is preset resolution information, the difference information may be expressed in an index or flag form.

The information related to the first image 115 may include information about at least one of the resolution of the first image 115, the bitrate of the image data obtained as a result of performing the first encoding process on the first image 115, or the codec type used to perform the first encoding process on the first image 115.

The AI setter 238 may determine the upscale target of the second image 135 based on at least one of the difference information included in the AI data or the information related to the first image 115. The upscale target may indicate, for example, to what resolution the second image 135 has to be upscaled.

When the upscale target is determined, the AI upscaler 236 performs an AI upscale process on the second image 135 through the second DNN so as to obtain the third image 145 corresponding to the upscale target.

Prior to describing a method, performed by the AI setter 238, of determining an upscale target based on AI data, an AI upscale process through the second DNN will be described with reference to FIGS. 3 and 4.

Figure 3:
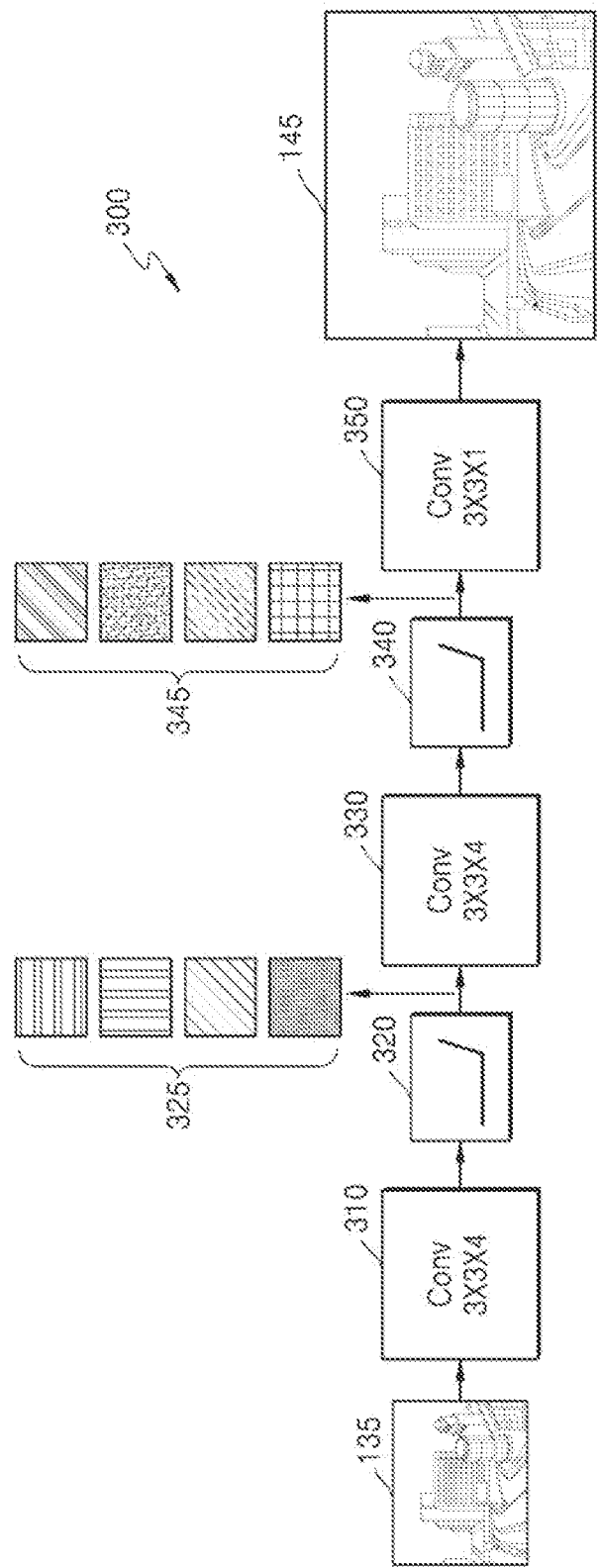
FIG. 3 is an exemplary diagram illustrating a second deep neural network (DNN) for AI upscale of a second image.
Figure 4:
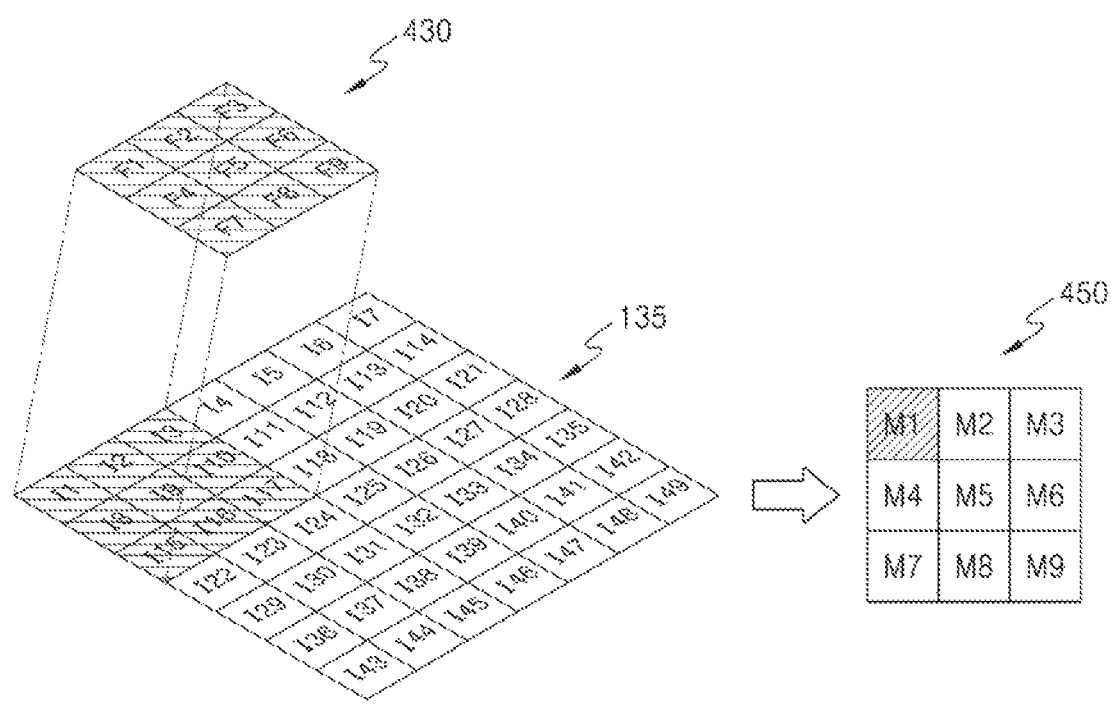
FIG. 4 is a diagram for describing a convolution operation performed by a convolution layer.

FIG. 3 is an exemplary diagram illustrating a second DNN 300 for AI upscale of the second image 135, and FIG. 4 illustrates a convolution operation in a first convolution layer 310 of FIG. 3.

As illustrated in FIG. 3, the second image 135 is input to the first convolution layer 310. 3×3×4 indicated in the first convolution layer 310 illustrated in FIG. 3 exemplifies a convolution process on one input image by using four filter kernels each having a 3×3 size. As a result of the convolution process, four feature maps are generated by the four filter kernels. The four feature maps represent unique characteristics of the second image 135. For example, the four feature maps may represent a vertical direction characteristic, a horizontal direction characteristic, or an edge characteristic of the second image 135.

Referring to FIG. 4, the convolution operation in the first convolution layer 310 will be described in detail.

One feature map 450 may be generated through a multiplication operation and an addition operation between the parameters of the filter kernel 430 having a 3×3 size used in the first convolution layer 310 and the pixel values of the second image 135 corresponding thereto. Because the four filter kernels are used in the first convolution layer 310, four feature maps may be generated through the convolution operation process using the four filter kernels.

In FIG. 4, I1 to I49 indicated in the second image 135 represent the pixels of the second image 135, and F1 to F9 indicated in the filter kernel 430 represent the parameters of the filter kernel 430. Also, M1 to M9 indicated in the feature map 450 represent samples of the feature map 450.

FIG. 4 illustrates that the second image 135 includes 49 pixels, but this is only an example. When the second image 135 has a 4K resolution, the second image 135 may include, for example, 3840×2160 pixels.

In the convolution operation process, the multiplication operation may be performed on the pixel values of the pixels I1, I2, I3, I8, I9, I10, I15, I16, and I17 of the second image 135 and the parameters F1, F2, F3, F4, F5, F6, F7, F8, and F9 of the filter kernel 430, and a value obtained by combining (e.g., by performing an addition operation on) the result values of the multiplication operation may be assigned as the value of the sample M1 of the feature map 450. When a stride of the convolution operation is 2, the multiplication operation may be performed on the pixel values of the pixels I3, I4, I5, I10, I11, I12, I17, I18, and I19 of the second image 135 and the parameters F1, F2, F3, F4, F5, F6, F7, F8, and F9 of the filter kernel 430, and a value obtained by combining the result values of the multiplication operation may be assigned as the value of the sample M2 of the feature map 450.

While the filter kernel 430 moves along the stride until reaching the last pixel of the second image 135, the convolution operation between the pixel values of the second image 135 and the parameters of the filter kernel 430 may be performed to obtain the feature map 450 having a certain size.

According to the disclosure, the values of the parameters of the second DNN, for example, the parameters of the filter kernel used in the convolution layers of the second DNN (e.g., F1, F2, F3, F4, F5, F6, F7, F8, and F9 of the filter kernel 430) may be optimized through the joint training of the first DNN and the second DNN. The AI setter 238 may determine the upscale target corresponding to the downscale target of the first DNN based on the AI data, and may determine the parameters corresponding to the determined upscale target as the parameters of the filter kernel used in the convolution layers of the second DNN.

The convolution layers included in the first DNN and the second DNN may perform the convolution operation process described with reference to FIG. 4, but the convolution operation process described with reference to FIG. 4 is only an example, and the disclosure is not limited thereto.

Referring back to FIG. 3, the feature maps output from the first convolution layer 310 are input to a first activation layer 320.

The first activation layer 320 may impart non-linear characteristics to each feature map. The first activation layer 320 may include a step function, a sigmoid function, a Tanh function, a rectified linear unit (ReLU) function, and the like, but is not limited thereto.

Imparting the nonlinear characteristics in the first activation layer 320 means changing and outputting some sample values of the feature map, which is the output of the first convolution layer 310. At this time, the change is performed by applying the nonlinear characteristics.

The first activation layer 320 determines whether to transmit the sample values of the feature maps output from the first convolution layer 310 to a second convolution layer 330. For example, some sample values of the feature maps are activated by the first activation layer 320 and are transmitted to the second convolution layer 330, and some sample values thereof are deactivated by the first activation layer 320 and are not transmitted to the second convolution layer 330. Unique characteristics of the second image 135 represented by the feature maps are emphasized by the first activation layer 320.

Feature maps 325 output from the first activation layer 320 are input to the second convolution layer 330. One of the feature maps 325 illustrated in FIG. 3 is a result of processing the feature map 450 described with reference to FIG. 4 in the first activation layer 320.

3×3×4 indicated in the second convolution layer 330 exemplifies a convolution process on the input feature maps 32 by using four 3×4 filter kernels each having a 3×3 size. The output of the second convolution layer 330 is input to the second activation layer 340. The second activation layer 340 may impart nonlinear characteristics to the input data.

Feature maps 345 output from the second activation layer 340 are input to the third convolution layer 350. 3×3×1 indicated in the third convolution layer 350 illustrated in FIG. 3 exemplifies a convolution process for producing one output image by using one filter kernel having a 3×3 size. The third convolution layer 350 is a layer for outputting a final image and generates one output by using one filter kernel. According to an embodiment of the disclosure, the third convolution layer 350 may output the third image 145 through the convolution operation.

There may be a plurality of pieces of DNN setting information indicating the number of filter kernels of the first convolution layer 310, the second convolution layer 330, and the third convolution layer 350 of the second DNN 300, the parameters of the filter kernel, and the like, as described later, and the pieces of DNN setting information have to be joined with the pieces of DNN setting information of the first DNN. The joint between the pieces of DNN setting information of the second DNN and the pieces of DNN setting information of the first DNN may be implemented through the joint training of the first DNN and the second DNN.

FIG. 3 illustrates that the second DNN 300 includes three convolution layers, for example, first, second, and third convolution layers 310, 330, and 350, and two activation layers, for example, first and second activation layers 320 and 340, but this is only an example. According to an implementation, the number of convolution layers and the number of activation layers may be variously changed. Also, according to an implementation, the second DNN 300 may be implemented through a recurrent neural network (RNN). This case means changing a convolutional neural network (CNN) structure of the second DNN 300 according to the embodiment of the disclosure to an RNN structure.

In an embodiment of the disclosure, the AI upscaler 236 may include at least one arithmetic logic unit (ALU) for the convolution operation and the operation of the activation layer described above. The ALU may be implemented as a processor. For the convolution operation, the ALU may include a multiplier that performs a multiplication operation between the sample values of the feature map output from the second image 135 or the previous layer and the sample values of the filter kernel, and an adder that adds the result values of the multiplication operation. Also, for the operation of the activation layer, the ALU may include a multiplier that multiplies an input sample value by a weight used in a sigmoid function, a Tanh function, or an ReLU function, which is previously determined, and a comparator that compares a result of the multiplying to a certain value and determines whether to transmit the input sample value to the next layer.

Hereinafter, a method, performed by the AI setter 238, of determining the upscale target and a method, performed by the AI upscaler 236, of performing an AI upscale process on the second image 135 according to the upscale target will be described.

In an embodiment of the disclosure, the AI setter 238 may store a plurality of pieces of DNN setting information that are settable in the second DNN.

The pieces of DNN setting information may include information about at least one of the number of convolution layers included in the second DNN, the number of filter kernels for each convolution layer, or the parameters of each filter kernel.

The pieces of DNN setting information may correspond to various upscale targets, respectively, and the second DNN may operate based on DNN setting information corresponding to a specific upscale target. The second DNN may have different structures from each other according to the DNN setting information. For example, the second DNN may include three convolution layers according to certain DNN setting information, and the second DNN may include four convolution layers according to other DNN setting information.

In an embodiment of the disclosure, the DNN setting information may include only parameters of the filter kernel used in the second DNN. In this case, the structure of the second DNN is not changed, but only the parameters of the internal filter kernel may be changed according to the DNN setting information.

The AI setter 238 may obtain DNN setting information for AI upscale of the second image 135 from among the pieces of DNN setting information. Each of the pieces of DNN setting information used herein is information for obtaining the third image 145 having a previously determined resolution and/or a previously determined image quality and is joint-trained with the first DNN.

For example, one of the pieces of DNN setting information may include pieces of information for obtaining the third image 145 having a resolution that is twice higher than the second image 135, for example, the third image 145 having a 4K (4096*2160) resolution that is twice higher than the second image 135 of 2K (2048*1080) resolution, and another of the pieces of DNN setting information may include pieces of information for obtaining the third image 145 having a resolution that is four times higher than the second image 135, for example, the third image 145 having n 8K (8192*4320) resolution that is four times higher than the second image 135 of 2K (2048*1080) resolution.

Each of the pieces of DNN setting information is generated in association with the DNN setting information of a first DNN of an AI encoding apparatus 700, and the AI setter 238 obtains one of the pieces of DNN setting information according to an enlargement ratio corresponding to a reduction ratio of the DNN setting information of the first DNN. To this end, the AI setter 238 has to check the information of the first DNN. In order for the AI setter 238 to check the information of the first DNN, the AI decoding apparatus 200 according to an embodiment of the disclosure receives AI data including the information of the first DNN from the AI encoding apparatus 700.

In other words, the AI setter 238 may use the information received from the AI encoding apparatus 700 to check information targeted by the DNN setting information of the first DNN used to obtain the first image 115, and may obtain DNN setting information of the second DNN joint-trained therewith.

When the DNN setting information for AI upscale of the second image 135 from among the pieces of DNN setting information is obtained, the DNN setting information may be transmitted to the AI upscaler 236, and input data may be processed based on the second DNN operating according to the DNN setting information.

For example, when any one of the pieces of the DNN setting information is obtained, the AI upscaler 236 may set the number of filter kernels and the parameters of the filter kernel as a value included in the obtained DNN setting information with respect to each of the first convolution layer 310, the second convolution layer 330, and the third convolution layer 350 of the second DNN 300 illustrated in FIG. 3.

Specifically, when the parameters of the 3×3 filter kernel used in any one convolution layer of the second DNN illustrated in FIG. 4 are {1, 1, 1, 1, 1, 1, 1, 1, 1} and DNN setting information is changed, the AI upscaler 236 may replace the parameters of the filter kernel with {2, 2, 2, 2, 2, 2, 2, 2, 2}, which are parameters included in the changed DNN setting information.

The AI setter 238 may obtain DNN setting information for upscaling the second image 135 from among the pieces of DNN setting information, based on the information included in the AI data, and the AI data used to obtain the DNN setting information will be described in detail.

In an embodiment of the disclosure, the AI setter 238 may obtain DNN setting information for upscale of the second image 135 from among the pieces of DNN setting information, based on difference information included in the AI data. For example, when it is determined that the resolution (e.g., 4K (4096×2160)) of the original image 105 is twice the resolution (e.g., 2K (2048×1080)) of the first image 115, based on the difference information, the AI setter 238 may obtain DNN setting information capable of doubling the resolution of the second image 135.

In another embodiment of the disclosure, the AI setter 238 may obtain DNN setting information for AL upscale of the second image 135 from among the pieces of DNN setting information, based on the information related to the first image 115, which is included in the AI data. The AI setter 238 may previously determine a mapping relationship between image-related information and DNN setting information, and may obtain DNN setting information mapped to the information related to the first image 115.

FIG. 5 is an exemplary diagram illustrating a mapping relationship between a plurality of pieces of image-related information and a plurality of pieces of DNN setting information.

It may be seen from FIG. 5 that the AI encoding/AI decoding process according to an embodiment of the disclosure may consider additional setting parameters in addition to a change in resolution. As illustrated in FIG. 5, DNN setting information may be selected considering, individually or collectively, the resolution such as SD, HD, or Full HD, the bitrate such as 10 Mbps, 15 Mbps, or 20 Mbps, and the codec information such as AV1, H.264, or HEVC. For this consideration, training considering each factor in the AI training process has to be performed in connection with the encoding and decoding process (see FIG. 11).

Therefore, as illustrated in FIG. 5, according to the training content, when a plurality of pieces of DNN setting information are provided based on image-related information including a codec type and an image resolution, DNN setting information for AI upscale of the second image 135 may be obtained based on information related to the first image 115 received during the AI decoding process.

That is, because the AI setter 238 matches the image-related information shown on the left side of the table illustrated in FIG. 5 with the DNN setting information on the right side of the table, the DNN setting information according to the image-related information may be used.

As illustrated in FIG. 5, when it is confirmed from the information related to the first image 115 that the resolution of the first image 115 is SD, the bitrate of the image data obtained as a result of performing the first encoding process on the first image 115 is 10 Mbps, and the first image 115 is first-encoded with the AV1 codec, the AI setter 238 may obtain "A" DNN setting information from among the pieces of DNN setting information.

Also, when it is confirmed from the information related to the first image 115 that the resolution of the first image 115 is HD, the bitrate of the image data obtained as a result of performing the first encoding process is 15 Mbps, and the first image 115 is first-encoded with the H.264 codec, the AI setter 238 may obtain "B" DNN setting information from among the pieces of DNN setting information.

Also, when it is confirmed from the information related to the first image 115 that the resolution of the first image 115 is Full HD, the bitrate of the image data obtained as a result of performing the first encoding on the first image 115 is 20 Mbps, and the first image 115 is first-encoded with the HEVC codec, the AI setter 238 may obtain "C" DNN setting information from among the pieces of DNN setting information. When it is confirmed that the resolution of the first image 115 is Full HD, the bitrate of the image data obtained as a result of performing the first encoding process on the first image 115 is 15 Mbps, and the first image 115 is first-encoded with the HEVC codec, the AI setter 238 may obtain "D" DNN setting information from among the pieces of DNN setting information. One of the "C" DNN setting information and the "D" DNN setting information is selected according to whether the bitrate of the image data obtained as a result of performing the first encoding process on the first image 115 is 20 Mbps or 15 Mbps. That the bitrates of the image data are different from each other when the first images 115 having the same resolution are first-encoded with the same codec means that the image qualities of the reconstructed images are different from each other. Therefore, the first DNN and the second DNN may be joint-training based on a certain image quality, and accordingly, the AI setter 238 may obtain DNN setting information according to the bitrate of the image data indicating the image quality of the second image 135.

In another embodiment of the disclosure, the AI setter 238 may obtain DNN setting information for AI upscale of the second image 135 from among the pieces of DNN setting information, based on both the information provided from the first decoder 234 (prediction mode information, motion information, quantization parameter information, etc.) and the information related to the first image 115 included in the AI data. For example, the AI setter 238 may receive, from the first decoder 234, quantization parameter information used to perform the first encoding process on the first image 115, may confirm the bitrate of the image data obtained as a result of encoding the first image 115 from the AI data, and may obtain DNN setting information corresponding to the quantization parameter and the bitrate. Even with the same bitrate, the degree of image quality of the reconstructed image may be different according to the complexity of the image. The bitrate is a value entirely representing the first image (e.g., a video) 115 to be first-encoded and may describe how much data the first image (or the video) 115 contains per second. The image quality of each of a plurality of frames which are contained in the first image (or the video) 115, may be different from each other even within the first image 115. Therefore, when considering the prediction mode information, the motion information, and/or quantization parameter together, which may be obtained from the first decoder 234 for each frame, DNN setting information that is more suitable for the second image 135 may be obtained, as compared with the case in which only the AI data is used.

Also, according to an implementation, the AI data may include an identifier of prearranged DNN setting information. The identifier of the DNN setting information is the upscale target corresponding to the downscale target of the first DNN and is information for discriminating a pair of pieces of DNN setting information joint-trained between the first DNN and the second DNN so that the AI upscale of the second image 135 is enabled. The AI setter 238 may obtain the identifier of the DNN setting information included in the AI data and then obtain the DNN setting information corresponding to the identifier of the DNN setting information, and the AI upscaler 236 may perform an AI upscale process on the second image 135 by using the corresponding DNN setting information. For example, an identifier indicating each of a plurality of pieces of DNN setting information settable in the first DNN and an identifier indicating each of a plurality of pieces of DNN setting information settable in the second DNN may be pre-designated. In this case, the same identifier may be designated for a pair of pieces of DNN setting information that are settable in each of the first DNN and the second DNN. The AI data may include an identifier of DNN setting information set in the first DNN for AI downscale of the original image 105. The AI setter 238 having received the AI data may obtain DNN setting information indicated by the identifier included in the AI data from among the pieces of DNN setting information, and the AI upscaler 236 may perform an AI upscale process on the second image 135 by using the corresponding DNN setting information.

In addition, according to an implementation, the AI data may include DNN setting information. The AI setter 238 may obtain the DNN setting information included in the AI data, and the AI upscaler 236 may perform an AI upscale process on the second image 135 by using the corresponding DNN setting information.

According to an implementation, when pieces of information constituting the DNN setting information (e.g., the number of convolution layers, the number of filter kernels for each convolution layer, the parameters of each filter kernel, etc.) are stored in the form of a lookup table, the AI setter 238 may obtain DNN setting information by combining some values selected from among values of the lookup table based on the information included in the AI data, and the AI upscaler 236 may perform an AI upscale process on the second image 135 by using the corresponding DNN setting information.

According to an implementation, when the structure of the DNN corresponding to the upscale target is determined, the AI setter 238 may obtain DNN setting information corresponding to the determined structure of the DNN, for example, parameters of the filter kernel.

As described above, the AI setter 238 obtains the DNN setting information of the second DNN through the AI data including information related to the first DNN, and the AI upscaler 236 may perform an AI upscale process on the second image 135 through the second DNN set with the corresponding DNN setting information. This may reduce the amount of memory usage and the amount of computations, as compared with the case in which upscale is performed by directly analyzing the features of the second image 135.

In an embodiment of the disclosure, when the second image 135 includes a plurality of frames, the AI setter 238 may independently obtain DNN setting information for each certain number of frames, or may obtain common DNN setting information for all frames.

Figure 6:
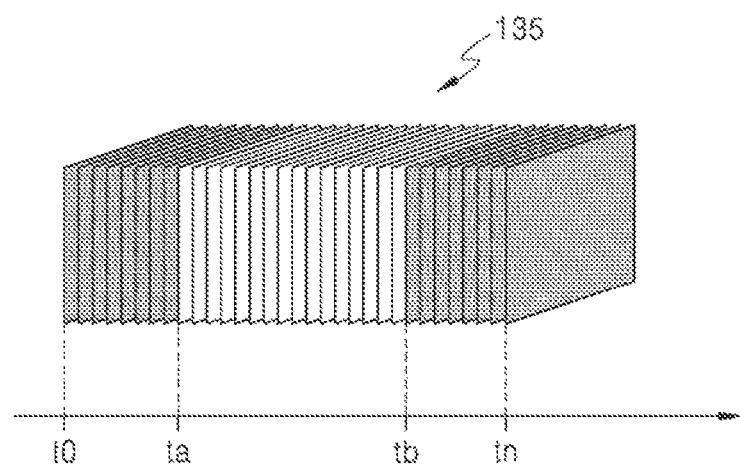
FIG. 6 is a diagram illustrating a second image including a plurality of frames.

FIG. 6 is a diagram illustrating a second image 135 including a plurality of frames.

As illustrated in FIG. 6, the second image 135 may include frames corresponding to t0 to tn.

In one example, the AI setter 238 may obtain DNN setting information of the second DNN through AI data, and the AI upscaler 236 may perform an AI upscale process on the frames corresponding to t0 to tn based on the corresponding DNN setting information. That is, the AI upscale process may be performed on the frames corresponding to t0 to tn based on the common DNN setting information.

In another example, the AI setter 238 may obtain "A" DNN setting information from AI data for some of the frames corresponding to t0 to tn, for example, frames corresponding to t0 to ta, and may obtain "B" DNN setting information from AI data for frames corresponding to ta+1 to tb. Also, the AI setter 238 may obtain "C" DNN setting information from AI data for frames corresponding to tb+1 to tn. In other words, the AI setter 238 may independently obtain DNN setting information for each group including a certain number of frames from among a plurality of pieces of frames, and the AI upscaler 236 may perform an AI upscale process on the frames included in each group by using the independently obtained DNN setting information.

In another example, the AI setter 238 may independently obtain DNN setting information for each frame constituting the second image 135. For example, when the second image 135 includes three frames, the AI setter 238 may obtain DNN setting information in relation to a first frame, obtain DNN setting information in relation to a second frame, and obtain DNN setting information in relation to a third frame. That is, the DNN setting information may be independently obtained for each of the first frame, the second frame, and the third frame. According to the method of obtaining the DNN setting information based on the information provided from the first decoder 234 (prediction mode information, motion information, quantization parameter information, etc.) and the information related to the first image 115 included in the AI data, DNN setting information may be independently obtained for each frame constituting the second image 135. This is because mode information, quantization parameter information, etc. may be independently determined for each frame constituting the second image 135.

In another example, the AI data may include information indicating to which frame the DNN setting information obtained based on the AI data is valid. For example, when the AI data includes information indicating that DNN setting information is valid up to the frame corresponding to ta, the AI setter 238 obtains DNN setting information based on the AI data, and the AI upscaler 236 performs an AI upscale process on the frames corresponding to t0 to ta by using the corresponding DNN setting information. When another AI data includes information indicating that DNN setting information is valid up to the frame corresponding to tn, the AI setter 238 may obtain DNN setting information based on the other AI data, and the AI upscaler 236 may perform an AI upscale process on the frames corresponding to ta+1 to tn by using the obtained DNN setting information.

Hereinafter, an AI encoding apparatus 700 for AI encoding of an original image 105 will be described with reference to FIG. 7.

Figure 7:
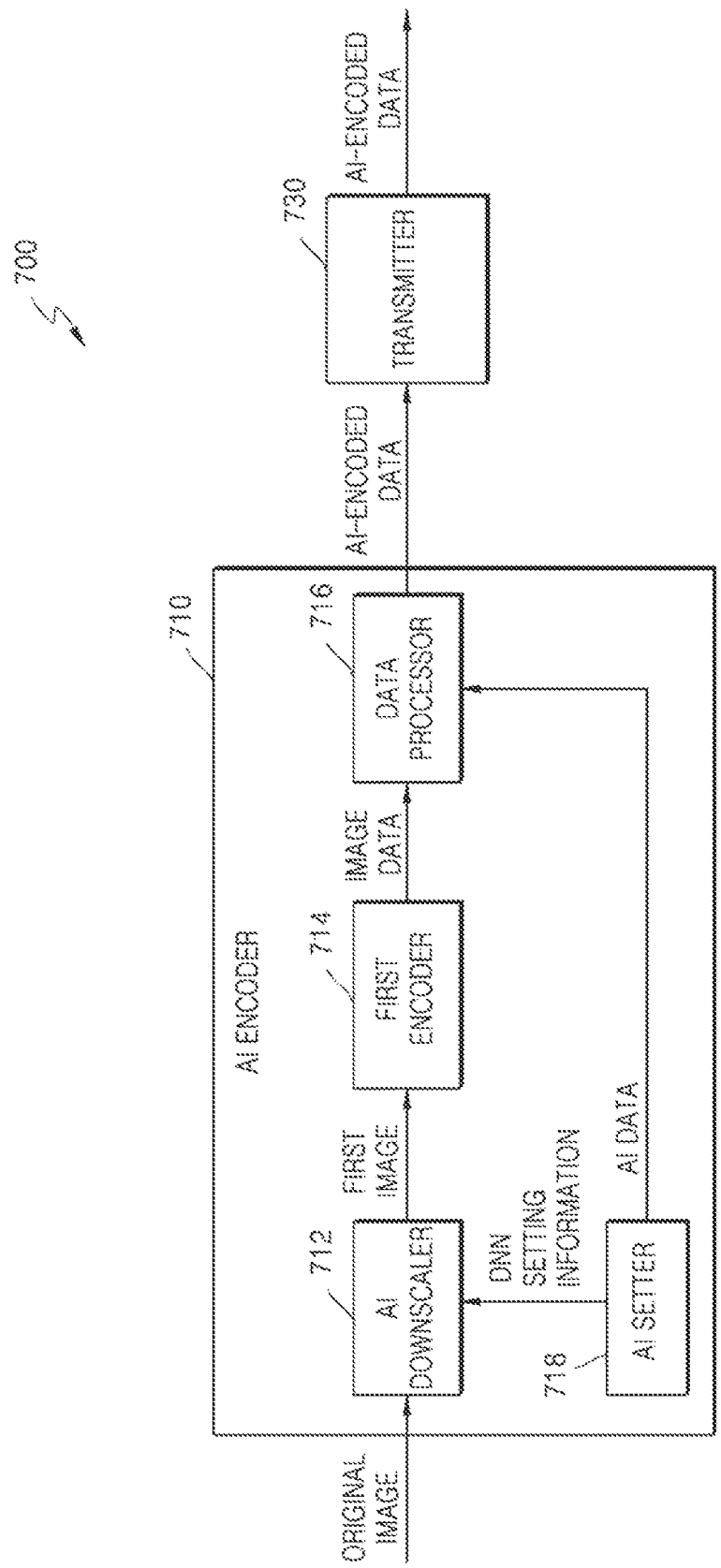
FIG. 7 is a block diagram illustrating a configuration of an AI encoding apparatus, according to an embodiment of the disclosure.

FIG. 7 is a block diagram illustrating the configuration of the AI encoding apparatus 700, according to an embodiment of the disclosure.

Referring to FIG. 7, the AI encoding apparatus 700 may include an AI encoder 710 and a transmitter 730. The AI encoder 710 may include an AI downscaler 712, a first encoder 714, a data processor 716, and an AI setter 718.

In FIG. 7, the AI encoder 710 and the transmitter 730 are illustrated as separate devices, but the AI encoder 710 and the transmitter 730 may be implemented through a single processor. In this case, the AI encoder 710 and the transmitter 730 may be implemented by a combination of dedicated processors, or may be implemented by a combination of software and a general-purpose processor such as an AP, a CPU, or a GPU. Also, in the case of a dedicated processor, the dedicated processor may include a memory for implementing the embodiment of the disclosure, or may include a memory processor for using an external memory.

The AI encoder 710 and the transmitter 730 may include a plurality of processors. In this case, the AI encoder 710 and the transmitter 730 may be implemented by a combination of dedicated processors, or may be implemented by a combination of software and a plurality of general-purpose processors such as an AP, a CPU, or a GPU. In an embodiment of the disclosure, the first encoder 714 may be implemented as a first processor, the AI downscaler 712, the data processor 716, and the AI setter 718 may be implemented as a second processor that is different from the first processor, and the transmitter 730 may be implemented as a third processor that is different from the first processor and the second processor.

The AI encoder 710 performs an AI downscale process on the original image 105 and a first encoding process on the first image 115 and transmits AI-encoded data to the transmitter 730. The transmitter 730 transmits the AI encoded data to the AI decoding apparatus 200.

Image data includes data obtained as a result of performing the first encoding process on the first image 115. The image data may include data obtained based on pixel values of the first image 115, for example, residual data that is the difference between the first image 115 and the predicted data of the first image 115. Also, the image data includes information used in the process of performing the first encoding process on the first image 115. For example, the image data may include prediction mode information used to perform the first encoding process on the first image 115, motion information, information related to quantization parameters used to perform the first encoding process on the first image 115, and the like.

AI data includes information that enables the AI upscaler 236 to perform an AI upscale process on the second image 135 as the upscale target corresponding to the downscale target of the first DNN.

In one example, the AI data may include difference information between the original image 105 and the first image 115.

In one example, the AI data may include information related to the first image 115. The information related to the first image 115 may include information about at least one of the resolution of the first image 115, the bitrate of the image data obtained as a result of performing the first encoding process on the first image 115, or the codec type used to perform the first encoding process on the first image 115.

In an embodiment of the disclosure, the AI data may include an identifier of prearranged DNN setting information so that the AI upscale process is performed on the second image 135 as the upscale target corresponding to the downscale target of the first DNN.

Also, in an embodiment of the disclosure, the AI data may include DNN setting information settable in the second DNN.

The AI downscaler 712 may obtain the first image 115 AI-downscaled from the original image 105 through the first DNN. The AI downscaler 712 may AI-downscale the original image 105 by using the DNN setting information provided from the AI setter 718.

The AI setter 718 may determine the downscale target of the original image 105 based on a previously determined criterion.

In order to obtain the first image 115 matching the downscale target, the AI setter 718 may store a plurality of pieces of DNN setting information that are settable in the first DNN. The AI setter 718 obtains DNN setting information corresponding to the downscale target from among the pieces of DNN setting information, and provides the obtained DNN setting information to the AI downscaler 712.

The pieces of DNN setting information may be those trained so as to obtain the first image 115 having a previously determined resolution and/or a previously determined image quality. For example, one of the pieces of DNN setting information may include pieces of information for obtaining the third image 145 having a resolution that is ½ times lower than the original image 105, for example, the first image 115 having a resolution of 2K (2048*1080) that is ½ times lower than the original image 105 of 4K (4096*2160) resolution, and another of the pieces of DNN setting information may include pieces of information for obtaining the first image 115 having a resolution that is ¼ times lower than the original image 105, for example, the first image 115 having a resolution of 2K (2048*1080) that is ¼ times lower than the original image 105 of 8K (8192*4320) resolution.

According to an implementation, when pieces of information constituting the DNN setting information (e.g., the number of convolution layers, the number of filter kernels for each convolution layer, the parameters of each filter kernel, etc.) are stored in the form of a lookup table, the AI setter 718 may obtain DNN setting information by combining some values selected from among values of the lookup table according to the downscale target, and provide the obtained DNN setting information to the AI downscaler 712.

According to an implementation, the AI setter 718 may determine the structure of the DNN corresponding to the downscale target and obtain DNN setting information corresponding to the determined structure of the DNN, for example, parameters of the filter kernel.

The pieces of DNN setting information for the AI downscale of the original image 105 may have an optimized value by joint training of the first DNN and the second DNN. Each of the pieces of DNN setting information may include at least one of the number of convolution layers included in the first DNN, the number of filter kernels for each convolution layer, or the parameters of each filter kernel.

The AI downscaler 712 may set the first DNN with DNN setting information determined for the AI downscale of the original image 105, and obtain the first image 115 having a certain resolution and/or a certain image quality through the first DNN. When the DNN setting information for the AI downscale of the original image 105 is obtained from among the pieces of DNN setting information, each layer in the first DNN may process input data based on pieces of information included in the DNN setting information.

Hereinafter, a method, performed by the AI setter 718, of determining a downscale target will be described. The downscale target may indicate, for example, how much the first image 115 with a reduced resolution has to be obtained from the original image 105.

The AI setter 718 obtains one or more pieces of input information. In an embodiment of the disclosure, the input information may include at least one of a target resolution of the first image 115, a target bitrate of the image data, a bitrate type of the image data (e.g., a variable bitrate type, a constant bitrate type, an average bitrate type, etc.), a color format to which the AI downscale is applied (a luminance component, a chrominance component, a red component, a green component, or a blue component, etc.), a codec type for performing the first encoding process on the first image 115, compression history information, a resolution of the original image 105, or a type of the original image 105.

One or more pieces of input information may be stored in advance in the AI encoding apparatus 700, or may include information input from a user.

The AI setter 718 controls the operation of the AI downscaler 712 based on the input information. In an embodiment of the disclosure, the AI setter 718 may determine the downscale target according to the input information, and may provide, to the AI downscaler 712, DNN setting information corresponding to the determined downscale target.

In an embodiment of the disclosure, the AI setter 718 may transmit at least a part of the input information to the first encoder 714, so that the first encoder 714 may perform a first encoding process on the first image 115 with a bitrate of a specific value, a bitrate of a specific type, and a specific codec.

In an embodiment of the disclosure, the AI setter 718 may determine the downscale target based on a compression rate (e.g., a difference in resolution between the original image 105 and the first image 115, a target bitrate, etc.), a compression quality (e.g., a bitrate type), compression history information, and a type of the original image 105.

In one example, the AI setter 718 may determine the downscale target based on a compression rate or a compression quality, which is preset or is input from a user.

As another example, the AI setter 718 may determine the downscale target by using compression history information stored in the AI encoding apparatus 700. For example, the encoding quality or compression rate that the user prefers may be determined according to the compression history information that may be used by the AI encoding apparatus 700, and the downscale target may be determined according to the coding quality determined based on the compression history information. For example, the resolution, image quality, and the like of the first image 115 may be determined according to the coding quality that has been used most frequently, based on the compression history information.

As another example, the AI setter 718 may also determine the downscale target based on the coding quality that has been used more frequently than a certain threshold value, based on the compression history information (e.g., an average quality of coding qualities that have been used more frequently than the certain threshold value).

As another example, the AI setter 718 may determine the downscale target based on the resolution, type (e.g., file format), etc. of the original image 105.

In an embodiment of the disclosure, when the original image 105 includes a plurality of frames, the AI setter 718 may independently obtain DNN setting information for each certain number of frames, and may provide the independently obtained DNN setting information to the AI downscaler 712.

In an example, the AI setter 718 may divide the frames constituting the original image 105 into a certain number of groups, and may independently obtain DNN setting information for each group. The same or different DNN setting information may be obtained for each group. The number of frames included in the groups may be equal or different for each group.

In another example, the AI setter 718 may independently determine DNN setting information for each frame constituting the original image 105. The same or different DNN setting information may be obtained for each frame.

Hereinafter, an exemplary structure of a first DNN 800 that is the basis of AI downscale will be described.

Figure 8:
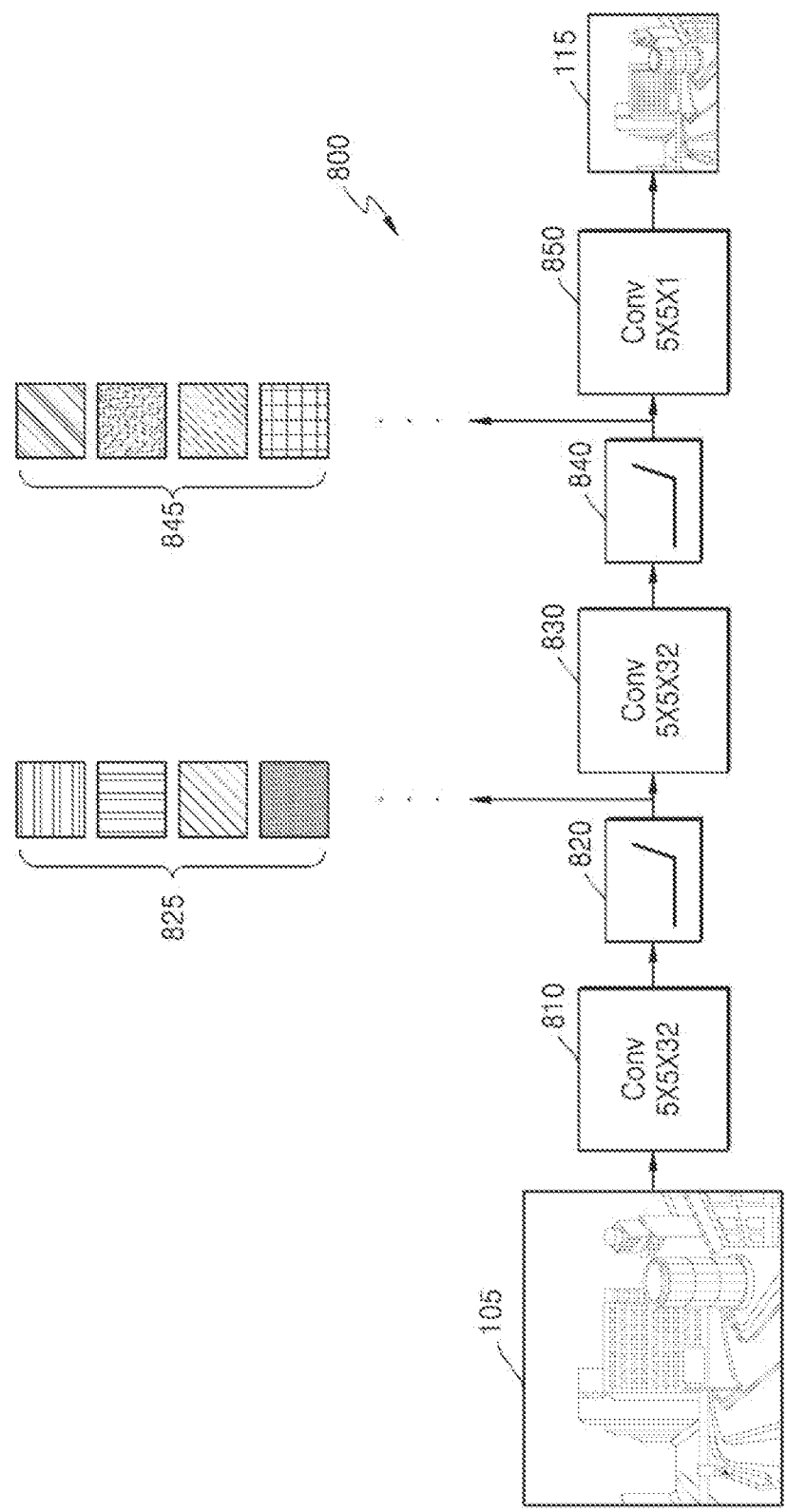
FIG. 8 is an exemplary diagram illustrating a first DNN for AI downscale of an original image.

FIG. 8 is an exemplary diagram illustrating the first DNN 800 for AI downscale of an original image 105.

As illustrated in FIG. 8, the original image 105 is input to a first convolution layer 810. The first convolution layer 810 performs a convolution process on the original image 105 by using 32 filter kernels each having a 5×5 size. 32 feature maps generated as a result of the convolution process are input to a first activation layer 820.

The first activation layer 820 may impart non-linear characteristics to the 32 feature maps.

The first activation layer 820 determines whether to transmit the sample values of the feature maps output from the first convolution layer 810 to a second convolution layer 830. For example, some sample values of the feature maps are activated by the first activation layer 820 and are transmitted to the second convolution layer 830, and some sample values are deactivated by the first activation layer 820 and are not transmitted to the second convolution layer 830. Information indicated by the feature maps output from the first convolution layer 810 is emphasized by the first activation layer 820.

An output 825 of the first activation layer 820 is input to the second convolution layer 830. The second convolution layer 830 performs a convolution process on input data by using 32 filter kernels each having a 5×5 size. The 32 feature maps output as a result of the convolution process may be input to the second activation layer 840, and the second activation layer 840 may impart non-linear characteristics to the 32 feature maps.

An output 845 of the second activation layer 840 is input to a third convolution layer 850. The third convolution layer 850 performs a convolution process on input data by using one filter kernel having a 5×5 size. As a result of the convolution process, one image may be output from the third convolution layer 850. The third convolution layer 850 is a layer for outputting a final image and obtains one output by using one filter kernel. According to an embodiment of the disclosure, the third convolution layer 850 may output the first image 115 through a result of the convolution operation.

There may be a plurality of pieces of DNN setting information indicating the number of filter kernels of the first convolution layer 810, the second convolution layer 830, and the third convolution layer 850 of the second DNN 800, the parameters of the filter kernel, and the like, and the pieces of DNN setting information have to be joined with the pieces of DNN setting information of the first DNN. The joint between the pieces of DNN setting information of the first DNN and the pieces of DNN setting information of the second DNN may be implemented through the joint training of the first DNN and the second DNN.

FIG. 8 illustrates that the first DNN 800 includes three convolution layers, for example, first, second, and third convolution layers 810, 830, and 850 and two activation layers, for example, first and second convolution layers 820 and 840, but this is only an example. According to an implementation, the number of convolution layers and the number of activation layers may be variously changed. Also, according to an implementation, the first DNN 800 may be implemented through an RNN. This case means changing a CNN structure of the first DNN 800 according to the embodiment of the disclosure to an RNN structure.

In an embodiment of the disclosure, the AI downscaler 712 may include at least one ALU for the convolution operation and the operation of the activation layer. The ALU may be implemented as a processor. For the convolution operation, the ALU may include a multiplier that performs a multiplication operation between the sample values of the feature map output from the original image 105 or the previous layer and the sample values of the filter kernel, and an adder that adds the result values of the multiplication operation. Also, for the operation of the activation layer, the ALU may include a multiplier that multiplies an input sample value by a weight used in a sigmoid function, a Tanh function, or an ReLU function, which is previously determined, and a comparator that compares a result of the multiplying to a certain value and determines whether to transmit the input sample value to the next layer.

Referring back to FIG. 7, the AI setter 718 transmits the AI data to the data processor 716. The AI data includes information that enables the AI upscaler 236 to perform an AI upscale process on the second image 135 as the upscale target corresponding to the downscale target of the first DNN.

The first encoder 714 having received the first image 115 from the AI downscaler 712 may reduce the amount of information included in the first image 115 by performing a first encoding process on the first image 115 according to a frequency transformation-based image compression method. Image data is obtained as a result of performing the first encoding process through a certain codec (e.g., MPEG-2, H.264, MPEG-4, HEVC, VC-1, VP8, VP9, or AV1). The image data is obtained according to a rule of a certain codec, that is, a syntax. For example, the image data may include residual data, which is a difference between the first image 115 and predicted data of the first image 115, prediction mode information used to perform the first encoding process on the first image 115, motion information, and information related to quantization parameters used to perform the first encoding process on the first image 115.

The image data obtained as a result of the first encoding process performed by the first encoder 714 is provided to the data processor 716.

The data processor 716 generates AI-encoded data including the image data received from the first encoder 714 and the AI data received from the AI setter 718.

In an embodiment of the disclosure, the data processor 716 may generate the AI-encoded data including the image data and the AI data in separate states. For example, the AI data may be included in a VSIF of an HDMI stream.

In another embodiment of the disclosure, the data processor 716 may include the AI data in the image data obtained as a result of the first encoding process performing by the first encoder 714, and may generate the AI-encoded data including the corresponding image data. For example, the data processor 716 may generate image data in the form of one bitstream by combining a bitstream corresponding to the image data and a bitstream corresponding to the AI data. To this end, the data processor 716 may express the AI data as bits having a value of 0 or 1, that is, a bitstream. In an embodiment of the disclosure, the data processor 716 may include a bitstream corresponding to the AI data in supplemental enhancement information (SEI), which is an additional information area of the bitstream obtained as a result of performing the first encoding process.

The AI-encoded data is transmitted to the transmitter 730. The transmitter 730 transmits the AI-encoded data obtained as a result of the AI encoding via a network.

In an embodiment of the disclosure, the AI-encoded data may be stored in a data storage medium including a magnetic medium such as a hard disk, a floppy disk, and magnetic tape, an optical recording medium such as a CD-ROM and a DVD, and a magneto-optical medium such as a floptical disk.

Figure 9:
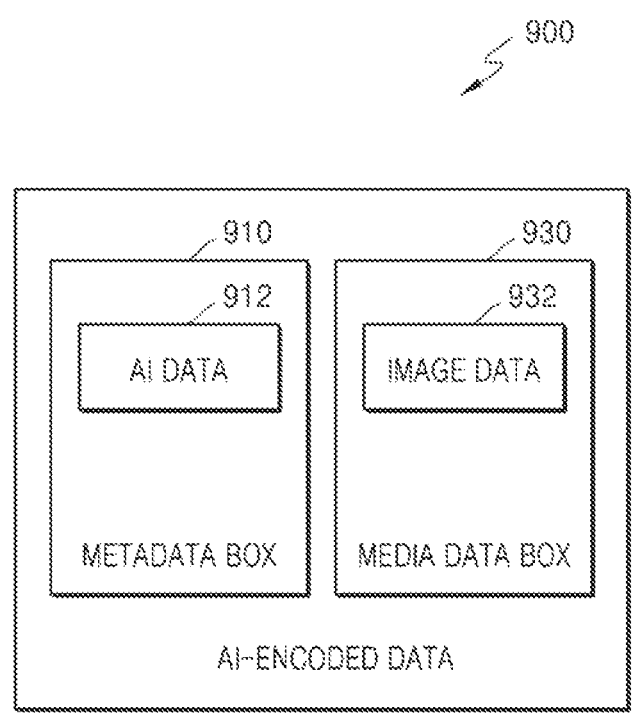
FIG. 9 is a diagram illustrating a structure of AI-encoded data, according to an embodiment of the disclosure.

FIG. 9 is a diagram illustrating a structure of AI-encoded data 900, according to an embodiment of the disclosure.

As described above, AI data 912 and image data 932 may be separately included in the AI-encoded data 900. The AI-encoded data 900 may have a container format such as MP4, AVI, MKV, or FLV. The AI encoded data 900 may include a metadata box 910 and a media data box 930.

The metadata box 910 includes information about the image data 932 included in the media data box 930. For example, the metadata box 910 may include information about a type of the first image 115, a type of codec used to encode the first image 115, and a reproduction time of the first image 115. Also, the AI data 912 may be included in the metadata box 910. The AI data 912 may be encoded according to an encoding method provided in a certain container format, and may be stored in the metadata box 910.

The media data box 930 may include the image data 932 generated according to a syntax of a certain image compression method.

Figure 10:
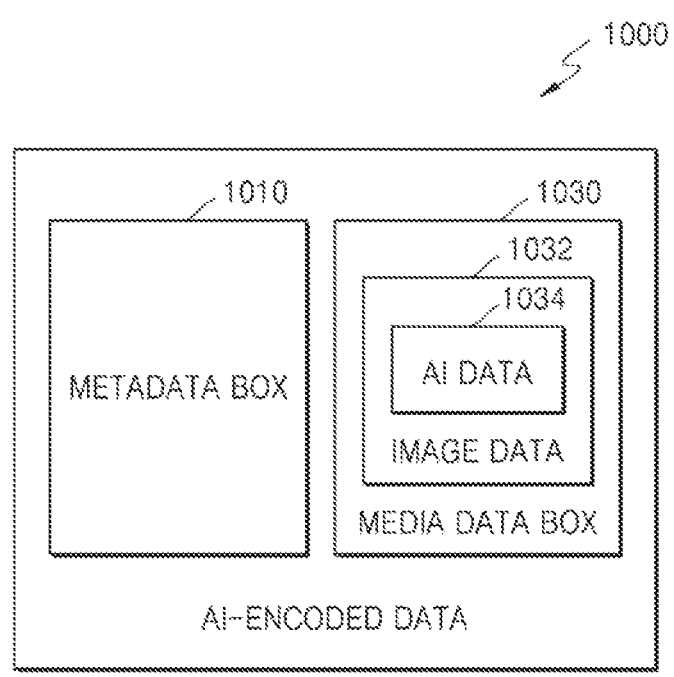
FIG. 10 is a diagram illustrating a structure of AI-encoded data, according to another embodiment of the disclosure.

FIG. 10 is a diagram illustrating a structure of AI-encoded data 1000, according to another embodiment of the disclosure.

Referring to FIG. 10, AI data 1034 may be included in image data 1032. The AI-encoded data 1000 may include a metadata box 1010 and a media data box 1030. When the AI data 1034 is included in the image data 1032, the AI data 1034 may not be included in the metadata box 1010.

The media data box 1030 includes the image data 1032 including the AI data 1034. For example, the AI data 1034 may be included in an additional information area of the image data 1032.

Hereinafter, referring to FIG. 11, a method of joint-training a first DNN 800 and a second DNN 300 will be described.

Figure 11:
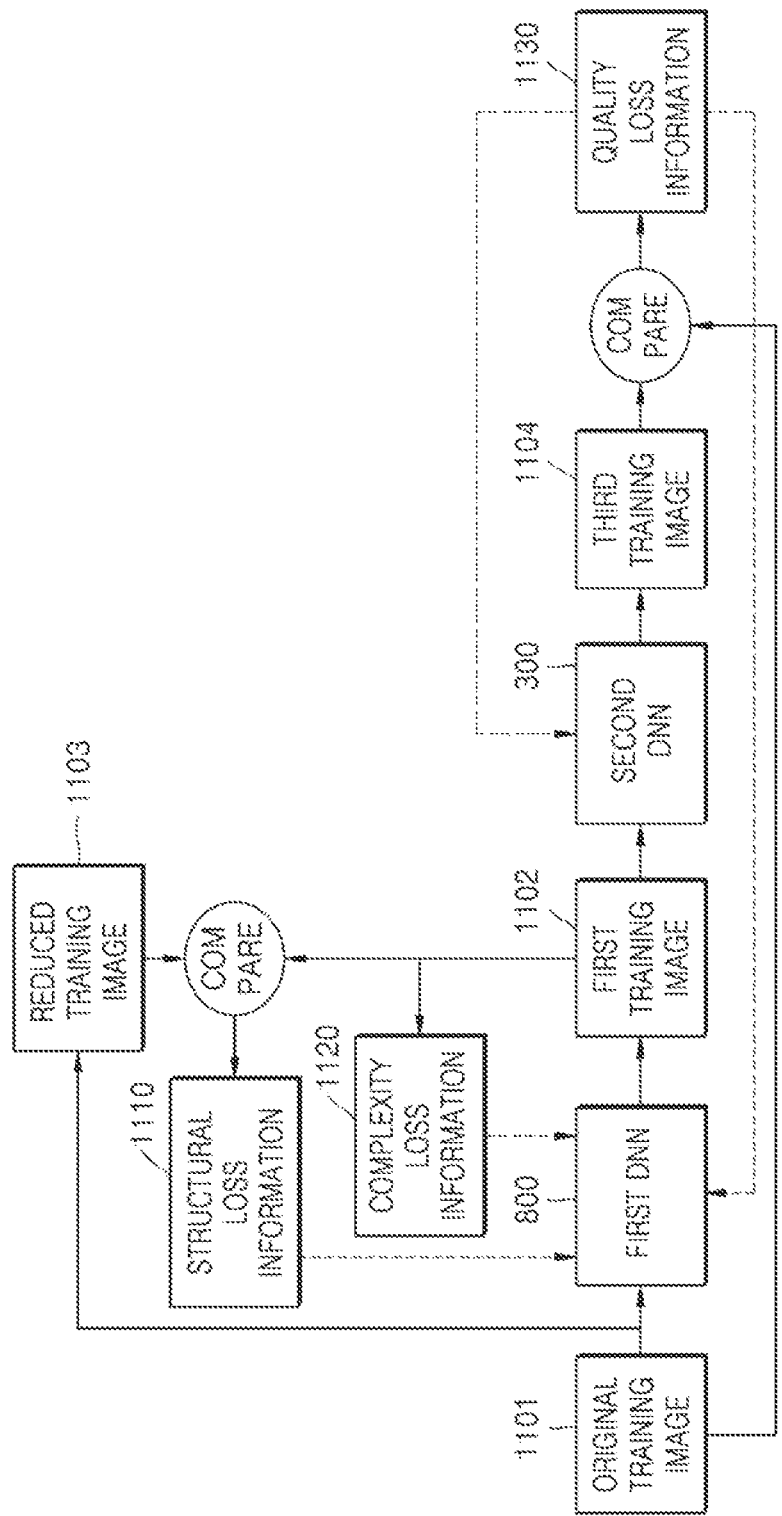
FIG. 11 is a diagram for describing a method of training a first DNN and a second DNN.

FIG. 11 is a diagram for describing a method of training the first DNN 800 and the second DNN 300.

In an embodiment of the disclosure, the original image 105 that is AI-encoded through the AI encoding process is reconstructed to the third image 145 through the AI decoding process. In order to maintain similarity between the original image 105 and the third image 145 obtained as a result of the AI decoding, correlation between the AI encoding process and the AI decoding process may be required. That is, information lost in the AI encoding process must be able to be reconstructed in the AI decoding process. To this end, the joint training of the first DNN 800 and the second DNN 300 may be required.

Ultimately, for enhancement of AI decoding, it may be necessary to reduce a difference between an original training image 1101 and a third training image 1104, which is represented as quality loss information 1130 illustrated in FIG. 11. Therefore, the quality loss information 1130 is used for both the training of the first DNN 800 and the training of the second DNN 300.

First, a training process illustrated in FIG. 11 will be described.

In FIG. 11, the original training image 1101 is an image to which AI downscaling is applied, and a first training image 1102 is an image that is AI-downscaled from the original training image 1101. Also, the third training image 1104 is an image that is AI-upscaled from the first training image 1102.

The original training image 1101 includes a still image or a moving image including a plurality of frames. In an embodiment of the disclosure, the original training image 1101 may include a luminance image extracted from a still image or a moving image including a plurality of frames. Also, in an embodiment of the disclosure, the original training image 1101 may include a patch image extracted from a still image or a moving image including a plurality of frames. When the original training image 1101 includes a plurality of frames, the first training image 1102, the second training image, and the third training image 1104 also include a plurality of frames. When a plurality of frames of the original training image 1101 are sequentially input to the first DNN 800, a plurality of frames of the first training image 1102, the second training image, and the third training image 1104 may be sequentially obtained through the first DNN 800 and the second DNN 300.

For the joint training of the first DNN 800 and the second DNN 300, the original training image 1101 is input to the first DNN 800. The original training image 1101 input to the first DNN 800 is AI-downscaled and output as the first training image 1102, and the first training image 1102 is input to the second DNN 300. The third training image 1104 is output as a result of AI-upscaling the first training image 1102.

Referring to FIG. 11, the first training image 1102 is input to the second DNN 300. According to an implementation, the second training image obtained through the first encoding process and the first decoding process of the first training image 1102 may be input to the second DNN 300. In order to input the second training image to the second DNN, any one of MPEG-2, H.264, MPEG-4, HEVC, VC-1, VP8, VP9, and AV1 may be used. Specifically, any one codec of MPEG-2, H.264, MPEG-4, HEVC, VC-1, VP8, VP9, and AV1 may be used to perform the first encoding process on the first training image 1102 and the first decoding process on image data corresponding to the first training image 1102.

Referring to FIG. 11, apart from outputting the first training image 1102 through the first DNN 800, a reduced training image 1103 that is legacy-downscaled from the original training image 1101 is obtained. The legacy down-scale may include at least one of a bilinear scale, a bicubic scale, a lanczos scale, or a stair step scale.

In order to prevent the structural features of the first image 115 from significantly deviating based on the structural features of the original image 105, the reduced training image 1103 that preserves the structural features of the original training image 1101 is obtained.

Before the progress of training, the first DNN 800 and the second DNN 300 may be set with previously determined DNN setting information. As the training progresses, structural loss information 1110, complexity loss information 1120, and quality loss information 1130 may be determined.

The structural loss information 1110 may be determined based on a result of comparison between the reduced training image 1103 and the first training image 1102. In one example, the structural loss information 1110 may correspond to a difference between structural information of the reduced training image 1103 and structural information of the first training image 1102. The structural information may include various features that may be extracted from luminance of an image, contrast, and an image such as histogram. The structural loss information 1110 indicates to what extent the structural information of the original training image 1101 is maintained in the first training image 1102. As the structural loss information 1110 is smaller, the structural information of the first training image 1102 becomes similar to the structural information of the original training image 1101.

The complexity loss information 1120 may be determined based on spatial complexity of the first training image 1102. In one example, as the spatial complexity, a total variance value of the first training image 1102 may be used. The complexity loss information 1120 is related to the bitrate of the image data obtained by first-encoding the first training image 1102. As the complexity loss information 1120 is smaller, the bitrate of the image data is smaller.

The quality loss information 1130 may be determined based on a result of comparison between the original training image 1101 and the third training image 1104. The quality loss information 1130 may include at least one of an L1-norm value, an L2-norm value, a structural similarity (SSIM) value, a peak signal-to-noise ratio-human vision system (PSNR-HVS) value, a multiscale SSIM (MS-SSIM) value, a variance inflation factor (VI F) value, or a video multimethod assessment fusion (VMAF) value with respect to the difference between the original training image 1101 and the third training image 1104. The quality loss information 1130 indicates to what extent the third training image 1104 is similar to the original training image 1101. As the quality loss information 1130 is smaller, the third training image 1104 is more similar to the original training image 1101.

Referring to FIG. 11, the structural loss information 1110, the complexity loss information 1120, and the quality loss information 1130 are used for the training of the first DNN 800, and the quality loss information 1130 is used for the training of the second DNN 300. That is, the quality loss information 1130 is used for the training of both the first DNN 800 and the second DNN 300.

The first DNN 800 may update the parameters so that final loss information determined based on the structural loss information 1110, the complexity loss information 1120, and the quality loss information 1130 is reduced or minimized. Also, the second DNN 300 may update the parameters so that the quality loss information 1130 is reduced or minimized.

Final loss information for the training of the first DNN 800 and the second DNN 300 may be determined as in Equation 1 below:

$$LossDS = a*\text{structural loss information} + b*\text{complexity loss information} + c*\text{quality loss information}$$

$$LossUS = d*\text{quality loss information} \quad [\text{Equation 1}]$$

In Equation 1, LossDS represents the final loss information to be reduced or minimized for the training of the first DNN 800, and LossUS represents the final loss information to be reduced or minimized for the training of the second DNN 300. Also, a, b, c, and d may correspond to the previously determined certain weights.

That is, the first DNN 800 updates the parameters in a direction in which LossDS of Equation 1 is decreased, and the second DNN 300 updates parameters in a direction in which LossUS is decreased. When the parameters of the first DNN 800 are updated according to LossDS derived in the training process, the first training image 1102 obtained based on the updated parameters becomes different from the first training image 1102 of the previous training process. Accordingly, the third training image 1104 also becomes different from the third training image 1104 of the previous training process. When the third training image 1104 becomes different from the third training image 1104 of the previous training process, the quality loss information 1130 is also newly determined and the second DNN 300 updates the parameters accordingly. When the quality loss information 1130 is newly determined, LossDS is also newly determined. Thus, the first DNN 800 updates the parameters according to the newly determined LossDS. That is, the parameter update of the first DNN 800 causes the parameter update of the second DNN 300, and the parameter update of the second DNN 300 causes the parameter update of the first DNN 800. In other words, because the first DNN 800 and the second DNN 300 are joint-trained through sharing of the quality loss information 1130, the parameters of the first DNN 800 and the parameters of the second DNN 300 may be optimized with correlation with each other.

Referring to Equation 1, it may be seen that LossUS is determined according to the quality loss information 1130, but this is only an example. LossUS may be determined based on the quality loss information 1130 and at least one of the structural loss information 1110 or the complexity loss information 1120.

It has been described that the AI setter 238 of the AI decoding apparatus 200 and the AI setter 718 of the AI encoding apparatus 700 store a plurality of pieces of DNN setting information, and a method of training each of the pieces of DNN setting information stored in the AI setter 238 and the AI setter 718 will be described.

As described in connection with Equation 1, the first DNN 800 updates the parameters considering the degree of similarity between the structural information of the first training image 1102 and the structural information of the original training image 1101 (the structural loss information 1110), the bitrate of the image data obtained as a result of performing the first encoding process on the first training image 1102 (the complexity loss information 1120), and the difference between the third training image 1104 and the original training image 1101 (the quality loss information 1130).

Specifically, the parameters of the first DNN 800 may be updated so that the first training image 1102, which is similar to the structural information of the original training image 1101 and has a small bitrate of image data obtained when the first encoding process is performed, may be obtained and the second DNN 300 that performs an AI upscale process on the first training image 1102 obtains the third training image 1104 similar to the original training image 1101.

As the weights a, b, and c in Equation 1 are adjusted, the directions in which the parameters of the first DNN 800 are optimized becomes different from each other. For example, when the weight b is determined to be high, the parameters of the first DNN 800 may be updated with more importance to lowering the bitrate than the quality of the third training image 1104. Also, when the weight c is determined to be high, the bitrate is higher. The parameters of the first DNN 800 may be updated with more importance to increasing the quality of the third training image 1104 than to maintaining the structural information of the original training image 1101.

Also, the directions in which the parameters of the first DNN 800 are optimized may become different from each other according to a type of a codec used to perform the first encoding process on the first training image 1102. This is because the second training image to be input to the second DNN 300 may change according to the type of the codec.

That is, the parameters of the first DNN 800 and the parameters of the second DNN 300 are updated in association with each other, based on the weight a, the weight b, the weight c, and the type of codec for performing the first encoding process on the first training image 1102. Therefore, when the weight a, the weight b, and the weight c are determined as certain values, the type of the codec is determined as a certain type, and then the first DNN 800 and the second DNN 300 are trained, the parameters of the first DNN 800 and the parameters of the second DNN 300 that are optimized in association with each other may be determined.

When the weight a, the weight b, the weight c, and the type of the codec are changed and then the first DNN 800 and the second DNN 300 are trained, the parameters of the first DNN 800 and the parameters of the second DNN 300 that are optimized in association with each other may be determined. In other words, when the first DNN 800 and the second DNN 300 are trained while changing the weight a, the weight b, the weight c, and the type of the codec, a plurality of pieces of DNN setting information trained in association with each other may be determined by the first DNN 800 and the second DNN 300.

As described above with reference to FIG. 5, the pieces of DNN setting information of the first DNN 800 and the second DNN 300 may be mapped to pieces of information related to the first image. In order to establish such a mapping relationship, the first training image 1102 output from the first DNN 800 is first-encoded with a specific codec according to a specific bitrate, and the second training image obtained by first-decoding the bitstream obtained as a result of performing the first encoding process may be input to the second DNN 300. That is, by training the first DNN 800 and the second DNN 300 after setting the environment so that the first training image 1102 having a specific resolution is first-encoded at a specific bitrate by a specific codec, the resolution of the first training image 1102, the type of the codec used to perform the first encoding process on the first training image 1102, and a pair of DNN setting information mapped to the bitrate of the bitstream obtained as a result of performing the first encoding process on the first training image 1102 may be determined. By variously changing the resolution of the first training image 1102, the type of the codec used to perform the first encoding process on the first training image 1102, and the bitrate of the bitstream obtained according to the first encoding process on the first training image 1102, a mapping relationship between the pieces of DNN setting information of the first DNN 800 and the second DNN 300 and the information related to the first image may be determined.

Figure 12:
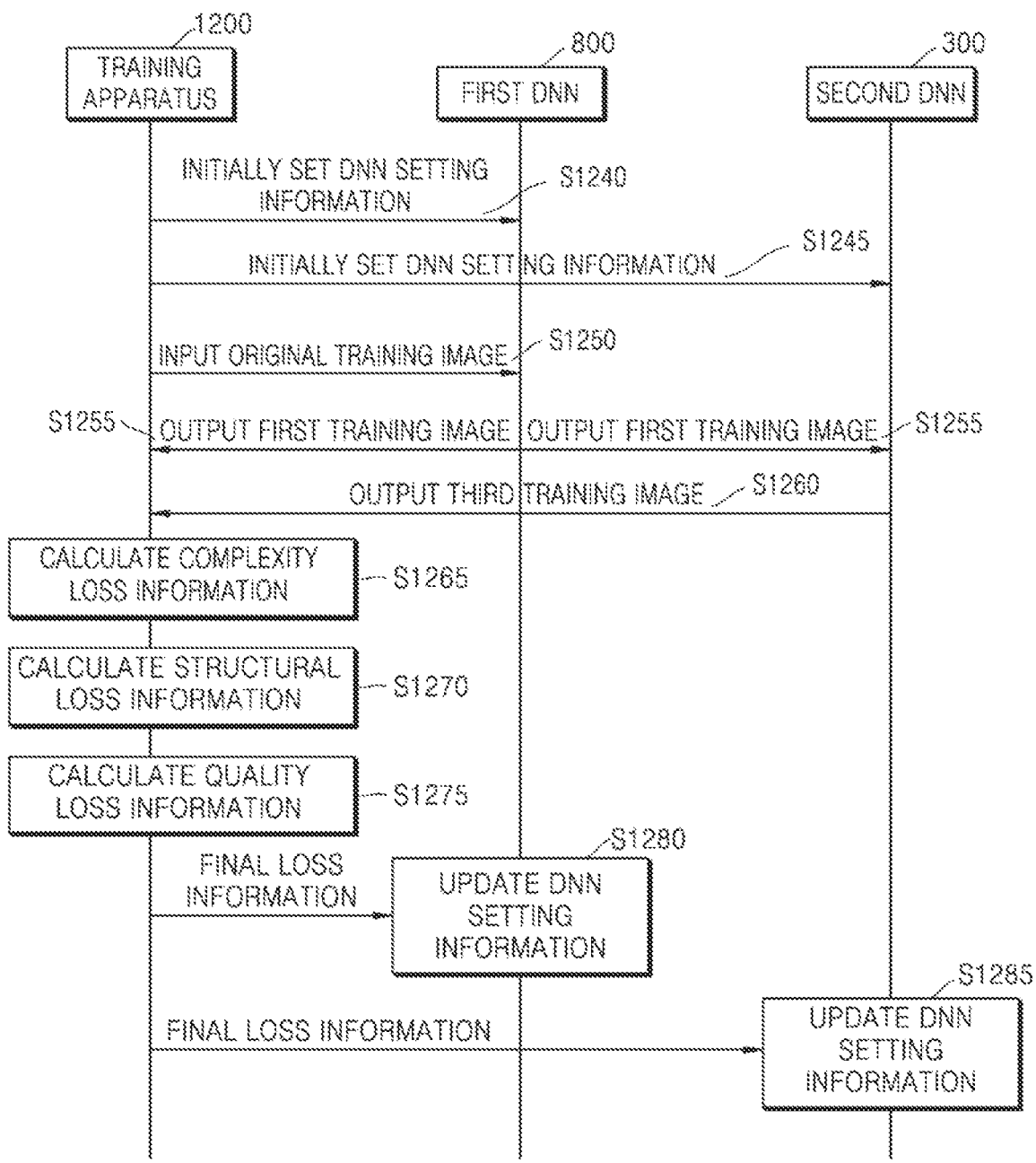
FIG. 12 is a diagram for describing a process, performed by a training apparatus, of training a first DNN and a second DNN.

FIG. 12 is a diagram for describing a process, performed by a training apparatus 1200, of training a first DNN 800 and a second DNN 300.

The training of the first DNN 800 and the second DNN 300 described above with reference to FIG. 11 may be performed by the training apparatus 1200. The training apparatus 1200 includes the first DNN 800 and the second DNN 300. The training apparatus 1200 may be, for example, the AI encoding apparatus 700 or a separate server. DNN setting information of the second DNN 300 obtained as a result of training is stored in the AI decoding apparatus 200.

Referring to FIG. 12, the training apparatus 1200 initially sets DNN setting information of the first DNN 800 and the second DNN 300 (S1240 and S1245). Therefore, the first DNN 800 and the second DNN 300 may operate according to previously determined DNN setting information. The DNN setting information may include information about at least one of the number of convolution layers included in the first DNN 800 and the second DNN 300, the number of filter kernels for each convolution layer, the size of the filter kernel for each convolution layer, or the parameters of each filter kernel.

The training apparatus 1200 inputs the original training image 1101 to the first DNN 800 (S1250). The original training image 1101 may include at least one frame constituting a still image or a moving image.

The first DNN 800 processes the original training image 1101 according to the initially set DNN setting information, and outputs the first training image 1102 AI-downscaled from the original training image 1101 (S1255). FIG. 12 illustrates that the first training image 1102 output from the first DNN 800 is directly input to the second DNN 300, but the first training image 1102 output from the first DNN 800 may be input to the second DNN 300 by the training apparatus 1200. Also, the training apparatus 1200 may perform a first encoding process and a first decoding process on the first training image 1102 with a certain codec, and then input the second training image to the second DNN 300.

The second DNN 300 processes the first training image 1102 or the second training image according to the initially set DNN setting information, and outputs the third training image 1104 AI-upscaled from the first training image 1102 or the second training image (S1260).

The training apparatus 1200 calculates complexity loss information 1120 based on the first training image 1102 (S1265).

The training apparatus 1200 calculates structural loss information 1110 by comparing the reduced training image 1103 with the first training image 1102 (S1270).

The training apparatus 1200 calculates quality loss information 1130 by comparing the original training image 1101 with the third training image 1104 (S1275).

The first DNN 800 updates the initially set DNN setting information through a back propagation process based on final loss information (S1280). The training apparatus 1200 may calculate final loss information for the training of the first DNN 800 based on the complexity loss information 1120, the structural loss information 1110, and the quality loss information 1130.

The second DNN 300 updates the initially set DNN setting information through a back propagation process based on the quality loss information or the final loss information (S1285). The training apparatus 1200 may calculate the final loss information for the training of the second DNN 300 based on the quality loss information 1130.

Then, the training apparatus 1200, the first DNN 800, and the second DNN 300 update the DNN setting information while repeating the processes S1250 to S1285 until the final loss information is minimized. At this time, while the processes are repeated, the first DNN 800 and the second DNN 300 operate according to the DNN setting information updated in the previous process.

Table 1 below shows the effects of the case in which the original image 105 is encoded and decoded by HEVC and the case in which the original image 105 is AI-encoded and AI-decoded according to the embodiment of the disclosure.

TABLE 1

| Content | Resolution | Number of frames | Amount of information (Mbps) | | Subjective quality score (VMAF) | |
|---|---|---|---|---|---|---|
| | | | HEVC | AI Encoding/ AI Decoding | HEVC | AI Encoding/ AI Decoding |
| Content 01 | 8K | 300 | 46.3 | 21.4 | 94.80 | 93.54 |
| Content 02 | (7680 × | frames | 46.3 | 21.6 | 98.05 | 98.98 |
| Content 03 | 4320) | | 46.3 | 22.7 | 96.08 | 96.00 |
| Content 04 | | | 46.1 | 22.1 | 86.26 | 92.00 |
| Content 05 | | | 45.4 | 22.7 | 93.42 | 92.98 |
| Content 06 | | | 46.3 | 23.0 | 95.99 | 95.61 |
| Content 07 | | Average | 46.11 | 22.25 | 94.10 | 94.85 |

As may be seen from Table 1, although the subjective image quality in the case in which content including 300 frames of 8K resolution is AI-encoded and AI-decoded according to the embodiment of the disclosure is higher than the subjective image quality in the case in which content is encoded and decoded with HEVC, the bitrate is reduced by 50% or more.

The above-described AI encoding apparatus 700 obtains the first image 115 by processing the original image 105 through the first DNN, and the AI decoding apparatus 200 obtains the third image 145 by processing the second image 135 through the second DNN. Because the original image 105 and the second image 135, which are the targets of the AI encoding and the AI decoding, are directly input to the first DNN and the second DNN, the amount of computations to be performed in the first DNN and the second DNN may increase. For example, the first DNN has to decrease the resolution of the original image 105 so as to obtain the first image 115, and the second DNN has to increase the resolution of the second image 135 so as to obtain the third image 145. That is, the first DNN requires an operation of decreasing the resolution of the original image 105, and the second DNN requires an operation of increasing the resolution of the second image 135. These operations may be omitted in the AI downscale process and the AI upscale process based on pre-processed data to be described later.

Also, because both the first DNN and the second DNN described above receive and process one image (i.e., the original image 105 and the second image 135), it is difficult to quickly grasp the characteristics of the images that are the targets of the AI downscale and the AI upscale. Therefore, in order to perform an AI downscale process and an AI upscale process that accurately reflect image characteristics, layers for image characteristic extraction have to be included in the first DNN and the second DNN. This may cause an increase in the number of layers included in the first DNN and the second DNN.

That is, according to the AI downscale process and the AI upscale process described above, the number of layers to be included in the first DNN and the second DNN may increase and the amount of computations may also increase. Therefore, there is a need to implement the first DNN and the second DNN with low complexity.

Hereinafter, the AI downscale process and the AI upscale process using the first DNN and the second DNN with low complexity will be described with reference to FIGS. 13 to 21.

Figure 13:
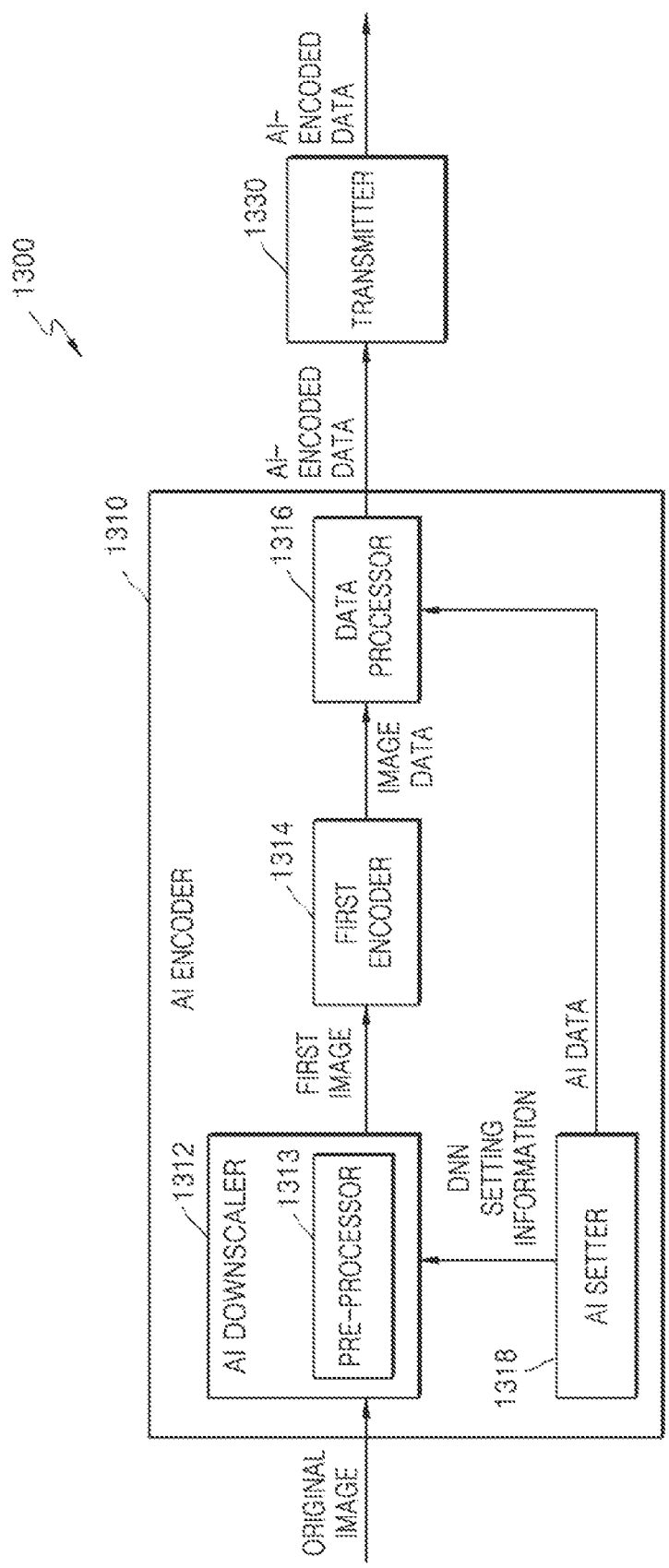
FIG. 13 is a block diagram illustrating a configuration of an AI encoding apparatus, according to another embodiment of the disclosure.

FIG. 13 is a block diagram illustrating a configuration of an AI encoding apparatus 1300, according to another embodiment of the disclosure.

Referring to FIG. 13, the AI encoding apparatus 1300 may include an AI encoder 1310 and a transmitter 1330. The AI encoder 1310 may include an AI downscaler 1312, a first encoder 1314, a data processor 1316, and an AI setter 1318.

The functions of the AI encoder 1310 and the transmitter 1330 may be the same as the functions of the AI encoder 710 and the transmitter 730 described above with reference to FIG. 7. That is, the AI downscaler 1312 of the AI encoder 1310 may obtain a first image 115 by AI-downscaling the original image 105, and the first encoder 1314 may perform a first encoding process on the first image 115. AI data related to AI downscale and image data obtained as a result of performing the first encoding process are transmitted to the data processor 1316. The AI setter 1318 obtains DNN setting information corresponding to a downscale target from among a plurality of pieces of DNN setting information and transmits the obtained DNN setting information to the AI downscaler 1312.

The data processor 1316 generates AI-encoded data including the image data and the AI data and outputs the generated AI-encoded data to the transmitter 1330, and the transmitter 1330 outputs the AI-encoded data. Because the functions of the AI encoder 1310 and the transmitter 1330 have been described in detail with reference to FIG. 7, detailed descriptions thereof are omitted herein.

Comparing the AI downscaler 1312 with the AI downscaler 712 illustrated in FIG. 7, the AI downscaler 1312 includes a pre-processor 1313.

The pre-processor 1313 pre-processes the original image 105 and inputs data obtained as a result of the pre-processing to the first DNN.

In an embodiment of the disclosure, the data obtained as a result of the pre-processing may include a plurality of images having a resolution lower than that of the original image 105. The resolution of the images may be lower than the resolution of the original image 105 and higher than the resolution of the first image 115. Alternatively, the resolution of the images may be equal to the resolution of the first image 115.

Because the images having a resolution lower than that of the original image 105 are input to the first DNN, the amount of computations to be performed in the first DNN may be reduced, as compared with the case in which a single original image 105 is input to the first DNN. In other words, when the original image 105 is input to the first DNN, an operation of reducing the resolution of the original image 105 to the resolution of the first image 115 is required, but when images having a resolution lower than that of the original image 105 are input to the first DNN, an operation of changing the resolution of the image may not be required, or the amount of computations may be reduced.

Because the number of layers included in the first DNN is proportional to the amount of computations, the number of layers included in the first DNN may be decreased by reducing the amount of computations to be performed in the first DNN.

Some images obtained as a result of the pre-processing may include a feature map of the original image 105. The feature map represents unique characteristics of the original image 105, for example, a vertical direction characteristic, a horizontal direction characteristic, or an edge characteristic. The first DNN may quickly grasp the characteristics of the original image 105 by using the feature map input from the pre-processor 1313 without the need to directly obtain, from the original image 105, the feature map representing the characteristics of the original image 105.

That is, according to an embodiment of the disclosure, the structure of the first DNN may be simplified because a plurality of images, which have a resolution lower than that of the original image 105 and some of which are the feature maps, are input to the first DNN.

The pre-processor 1313 may pre-process the original image 105 by using a rule-based method (or also referred to as a legacy method) instead of a neural network that requires a large amount of computations and uses parameters obtained as a result of training in computation. The legacy method is used in the pre-processing because pre-processing the original image 105 based on the neural network has a significant difference in the amount of computations, as compared with inputting the original image 105 directly to the first DNN.

In an embodiment of the disclosure, the data obtained as a result of the pre-processing may include a first reduced image downscaled from the original image 105 and a reduction feature map corresponding to the original image 105. The first reduced image may be obtained by downscaling the original image 105 by using a legacy scale method. In an embodiment of the disclosure, the legacy scale method may include at least one of a nearest neighbor scale method, a bilinear scale method, a bicubic scale method, a lanczos scale method, or a stair step scale method.

The resolution of the first reduced image and the reduction feature map is lower than the resolution of the original image 105. For example, the resolution of the first reduced image and the reduction feature map may be equal to the resolution of the first image 115.

The first DNN obtains the first image 115 by processing the first reduced image and the reduction feature map output from the pre-processor 1313. As described above, the first DNN may operate according to DNN setting information corresponding to a downscale target from among a plurality of pieces of DNN setting information.

Hereinafter, the configuration of the pre-processor 1313 and the structure of the first DNN that processes the pre-processed data will be described in detail.

Figure 14:
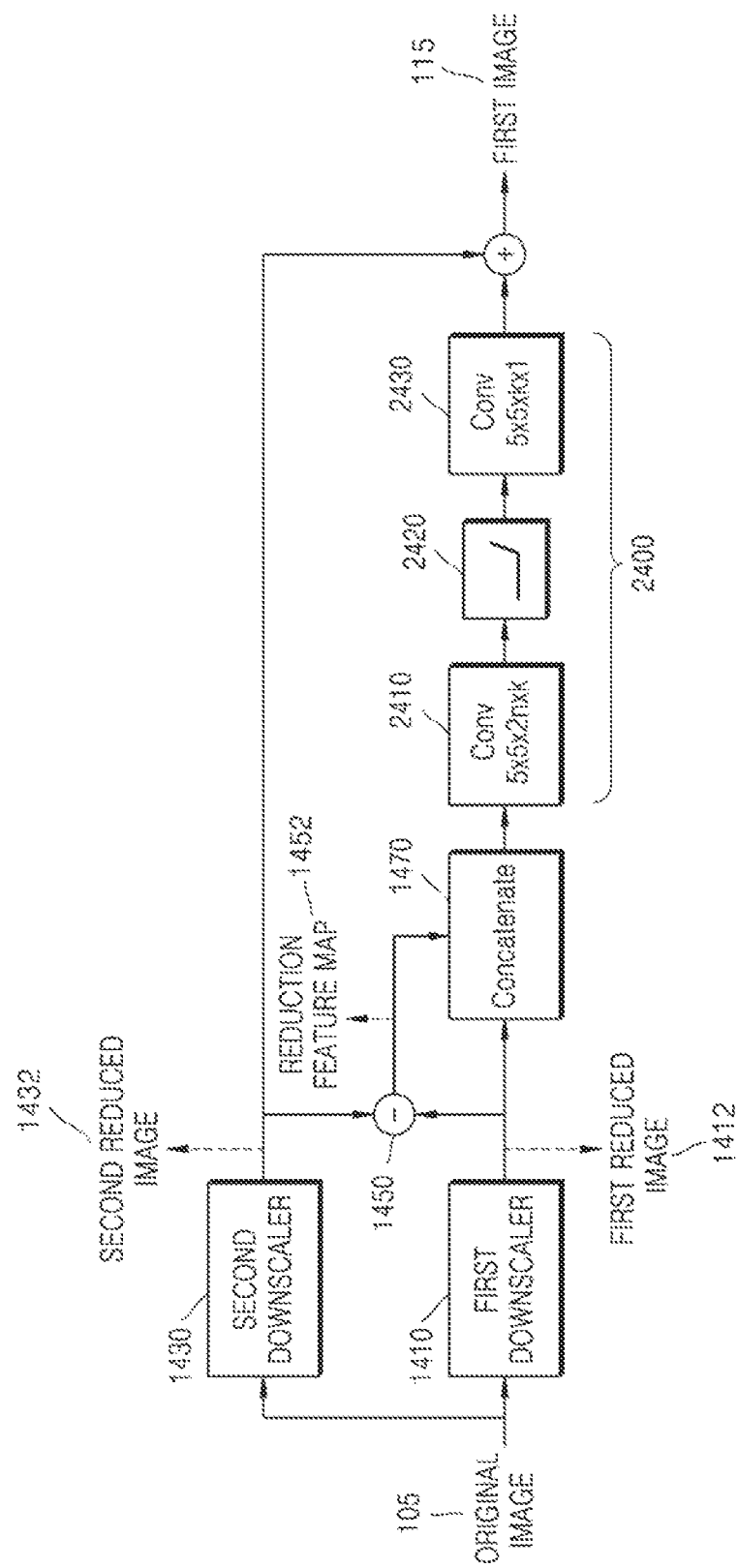
FIG. 14 is a diagram for describing an AI downscale process using a first DNN, according to an embodiment of the disclosure.

FIG. 14 is a diagram for describing an AI downscale process using a first DNN 2400, according to an embodiment of the disclosure.

A pre-processor 1313 includes a first downscaler 1410, a second downscaler 1430, and a subtractor 1450 so as to pre-process an original image 105.

Each of the first downscaler 1410 and the second downscaler 1430 may downscale the original image 105 according to a previously determined scale method. The first downscaler 1410 and the second downscaler 1430 downscale the original image 105 by using a rule-based scaling method (also referred to as a legacy scale method or a non-AI scale method).

In an embodiment of the disclosure, the legacy scale method may include at least one of a nearest neighbor scale method, a bilinear scale method, a bicubic scale method, a lanczos scale method, or a stair step scale method.

Each of the first downscaler 1410 and the second downscaler 1430 may downscale the original image 105 according to different scale methods from each other. For example, the first downscaler 1410 may downscale the original image 105 by using a nearest neighbor scale method, and the second downscaler 1430 may downscale the original image 105 by using a bicubic scale method.

The first downscaler 1410 obtains a first reduced image 1412 by downscaling the original image 105. The second downscaler 1430 obtains a second reduced image 1432 by downscaling the original image 105.

The subtractor 1450 obtains a residual image between the second reduced image 1432 and the first reduced image 1412 as a reduction feature map 1452. The residual image may include difference values between pixel values of one image of the first reduced image 1412 and the second reduced image 1432 and pixel values of the other image thereof.

The first reduced image 1412 and the reduction feature map 1452 are concatenated 1470 and input to the first DNN 2400. The sum of the number of first reduced images 1412 and the number of reduction feature maps 1452 has to be equal to the number of input channels of the first layer of the first DNN 2400. In FIG. 14, 5×5×2n×k of a first convolution layer 2410, which is the first layer of the first DNN 2400, means that the first convolution layer 2410 processes 2n images with k filter kernels each having a 5×5 size and outputs k feature maps. Here, n and k are real numbers greater than zero.

Because the number of input channels of the first convolution layer 2410 is 2n, the sum of the number of first reduced images 1412 and the number of reduction feature maps 1452 has to be 2n. That is, when the number of first reduced images 1412 is p, the number of reduction feature maps 1452 has to be 2n-p.

In an embodiment of the disclosure, the first downscaler 1410 obtains p first reduced images 1412 by downscaling the original image 105 by using p different scale methods (p is a natural number) from each other. The second downscaler 1430 obtains q second reduced images 1432 by downscaling the original image 105 by using q different scale methods (q is a natural number) from each other. The subtractor 1450 may obtain 2n-p residual images between the p first reduced images 1412 and the q second reduced images 1432. The p first reduced images 1412 and the 2n-p residual images may be input to the first DNN 2400.

In another embodiment of the disclosure, the first downscaler 1410 obtains n first reduced images 1412 by downscaling the original image 105 by using n different scale methods from each other. The second downscaler 1430 obtains one second reduced image 1432 by downscaling the original image 105 by using any one of the scale methods. The subtractor 1450 may obtain n residual images between each of the n first reduced images 1412 and one second reduced image 1432. The n first reduced images 1412 and the n residual images may be input to the first DNN 2400.

In another embodiment of the disclosure, the first downscaler 1410 obtains n first reduced images 1412 by downscaling the original image 105 by using n different scale methods from each other. The second downscaler 1430 obtains n second reduced images 1432 by downscaling the original image 105 by using n different scale methods from each other. The subtractor 1450 may obtain n residual images between the n first reduced images 1412 and the n second reduced images 1432. For example, the subtractor 1450 may map the n first reduced images 1412 and the n second reduced images 1432 on a one-to-one basis, and may obtain n residual images between the first reduced images 1412 and the second reduced images 1432 mapped to each other. The n first reduced images 1412 and the n residual images may be input to the first DNN 2400.

In another embodiment of the disclosure, the first downscaler 1410 obtains n different first reduced images 1412 from the original image 105 according to the nearest neighbor scale method, and the second downscaler 1430 obtains one second reduced image 1432 by downscaling the original image 105 by any one of the non-AI scale methods. The subtractor 1450 may obtain n residual images between each of the n first reduced images 1412 and one second reduced image 1432. The n first reduced images 1412 and the n residual images may be input to the first DNN 2400.

According to the nearest neighbor scale method, the first downscaler 1410 may determine pixel groups including n pixels from the original image 105 and may obtain n first reduced images 1412 including pixels located at different points from each other in each pixel group. The pixel groups including the n pixels may have a shape of a square block or a rectangular block.

For example, when the first downscaler 1410 intends to obtain four first reduced images 1412, the first downscaler 1410 determines pixel groups including four neighboring pixels in the original image 105. Each of the pixel groups including the four pixels may have a shape of a square block. The first downscaler 1410 may obtain a first reduced image 1412 including pixels located at the upper left of the four pixels included in each of the pixel groups, a first reduced image 1412 including pixels located at the upper right thereof, a first reduced image 1412 including pixels located at the lower left thereof, and a first reduced image 1412 including pixels located at the lower right thereof.

As another example, when each of the pixel groups including the four pixels has the shape of a rectangular block, the first downscaler 1410 may obtain a first reduced image 1412 including pixels located at the top (or leftmost) of the four pixels included in each of the pixel groups, a first reduced image 1412 including pixels located in the second top (or second leftmost) thereof, a first reduced image 1412 including pixels located at the third top (or third leftmost) thereof, and a first reduced image 1412 including pixels located at the bottom (or rightmost) thereof.

The pre-processor 1313 may determine the resolutions of the first reduced image 1412 and the second reduced image 1432 according to the target resolution of the first image 115. For example, when a ratio between the target resolution of the first image 115 and the resolution of the original image 105 is ½, the pre-processor 1313 may determine the resolutions of the first reduced image 1412 and the second reduced image 1432 to be half the resolution of the original image 105. The first downscaler 1410 and the second downscaler 1430 may respectively obtain, from the original image 105, the first reduced image 1412 and the second reduced image 1432, the resolutions of which are reduced by half.

As another example, when a ratio between the target resolution of the first image 115 and the resolution of the original image 105 is ¼, the pre-processor 1313 may determine the resolutions of the first reduced image 1412 and the second reduced image 1432 to be half the resolution of the original image 105. The first downscaler 1410 and the second downscaler 1430 may respectively obtain, from the original image 105, the first reduced image 1412 and the second reduced image 1432, the resolutions of which are reduced by half. In this case, in order to obtain the first image 115, the resolution of which is reduced by quarter as compared with the original image 105, the first DNN 2400 may perform an operation of reducing the resolutions of the first reduced image 1412 and the reduction feature map 1452 by half.

The first reduced image 1412 and the reduction feature map 1452 are input to the first convolution layer 2410. The first convolution layer 2410 performs a convolution process on the first reduced image 1412 and the reduction feature map 1452 by using k filter kernels each having a 5×5 size. k feature maps generated as a result of the convolution process are input to a first activation layer 2420.

The first activation layer 2420 may impart non-linear characteristics to the k feature maps. The first activation layer 2420 determines whether to transmit the sample values of the feature maps output from the first convolution layer 2410 to a second convolution layer 2430. For example, some sample values of the feature maps are activated by the first activation layer 2420 and are transmitted to the second convolution layer 2430, and some sample values thereof are deactivated by the first activation layer 2420 and are not transmitted to the second convolution layer 2430. Information indicated by the feature maps output from the first convolution layer 2410 is emphasized by the first activation layer 2420.

An output of the first activation layer 2420 is input to the second convolution layer 2430. The second convolution layer 2430 performs a convolution process on k feature maps by using one filter kernel having a 5×5 size. As a result of the convolution process, one image may be output from the second convolution layer 2430.

The first image 115 may be obtained by adding the second reduced image 1432 obtained by the second downscaler 1430 to the image output from the second convolution layer 2430. That the second reduced image 1432 is added to the image output from the second convolutional layer 2430 may mean that the pixel values of the two images are added to obtain one image. Adding the two images to each other has a different meaning from concatenating the two images to each other. Specifically, concatenating the two images with each other means that each of the pixel values of the two images are input to the layer as input variables, and adding the two images to each other means that the pixel values of the two images are added to create one image. For example, when a first image having pixel values $[x_1, x_2, $ and $x_3]$ and a second image having pixel values $[x_1', x_2',$ and $x_3']$ are concatenated, the pixel values $[x_1, x_2, x_3, x_1', x_2',$ and $x_3']$ of the first image and the second image are provided to the layer as input. On the other hand, when the first image and the second image are added, the sum $[x_1+x_1', x_2+x_2',$ and $x_3+x_3']$ of the pixel values $[x_1, x_2,$ and $x_3]$ of the first image and the pixel values $[x_1', x_2',$ and $x_3']$ of the second image is provided to the layer as input.

In an embodiment of the disclosure, when the resolution of the second reduced image 1432 is different from the resolution of the image output from the second convolution layer 2430, the resolution of the second reduced image 1432 may be scaled according to the resolution of the image output from the second convolution layer 2430.

According to an implementation, the second reduced image 1432 is not added to the image output from the second convolution layer 2430, and the image output from the second convolution layer 2430 may be determined as the first image 115.

FIG. 14 illustrates that the first DNN 2400 includes two convolution layers 2410 and 2430 and one activation layer 2420, but this is only an example. According to an implementation, the number of convolution layers and the number of activation layers may be variously changed. Also, according to an implementation, the first DNN 2400 may be implemented through an RNN. That is, a CNN structure of the first DNN 2400 according to the embodiment of the disclosure may be changed to an RNN structure.

FIG. 14 illustrates that the size of the filter kernel of the convolution layers 2410 and 2430 is 5×5, but this is only an example. The size of the filter kernel used in each convolutional layer may vary according to an implementation.

As described above, because the first reduced image 1412 and the reduction feature map 1452 input to the first DNN 2400 have a resolution lower than that of the original image 105, the amount of computations in the first DNN 2400 for processing the first reduced image 1412 and the reduction feature map 1452 may be reduced. Specifically, when the filter kernel moves along a certain stride and a convolution operation with input data is performed, the number of convolution operations inevitably increases when the resolution of the input data is high. However, in an embodiment of the disclosure, the number of convolution operations may be reduced because the first reduced image 1412 and the reduction feature map 1452, the resolutions of which are reduced through the pre-processing of the original image 105, are input to the first DNN 2400.

Also, in an embodiment of the disclosure, because not only the first reduced image 1412 reduced from the original image 105 but also the reduction feature map 1452 representing unique characteristics of the original image 105, for example, a vertical direction characteristic, a horizontal direction characteristic, or an edge characteristic are input to the first DNN 2400, the training of the first DNN 2400 may be simplified, as compared with the case of using one piece of information (i.e., the original image). Also, because various data representing the characteristics of the original image 105 are input to the first DNN 2400, the first image 115 and the third image 145 in which identity with the original image 105 is maintained may be obtained even with the first DNN 2400 including a small number of layers.

Figure 15:
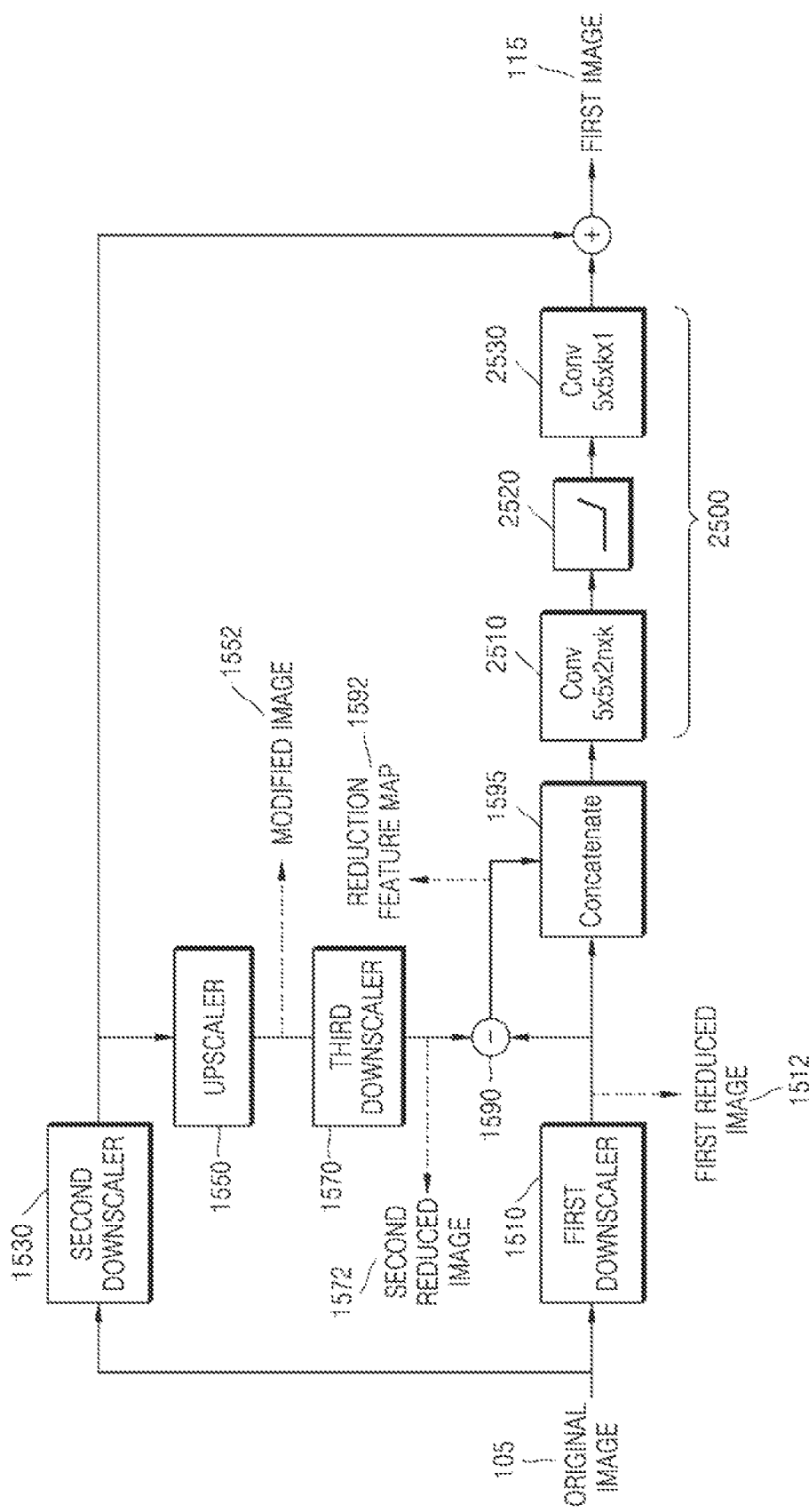
FIG. 15 is a diagram for describing an AI downscale process using a first DNN, according to another embodiment of the disclosure.

FIG. 15 is a diagram for describing an AI downscale process using a first DNN 2500, according to another embodiment of the disclosure.

A pre-processor 1313 includes a first downscaler 1510, a second downscaler 1530, an upscaler 1550, a third downscaler 1570, and a subtractor 1590 so as to pre-process an original image 105.

The first downscaler 1510 may downscale the original image 105 according to a previously determined scale method (e.g., a non-AI scaling method). The first downscaler 1510 downscales the original image 105 by using a rule-based scale method.

The second downscaler 1530 and the upscaler 1550 may downscale and upscale the original image 105 according to a previously determined scale method (e.g., a non-AI scale method).

The scale method used by the first downscaler 1510 and the scale method used by the second downscaler 1530 and the upscaler 1550 may be identical to or different from each other.

A modified image 1552 is obtained from the original image 105 according to the downscale and the upscale of the second downscaler 1530 and the upscaler 1550. The resolution of the modified image 1552 may be equal to the resolution of the original image 105. The second downscaler 1530 and the upscaler 1550 are for quality degradation of the original image 105, and at least some pixel values in the original image 105 may be changed by the second downscaler 1530 and the upscaler 1550.

The third downscaler 1570 may downscale the modified image 1552 according to a previously determined scale method. The third downscaler 1570 downscales the modified image 1552 by using a rule-based scale method.

The first downscaler 1510 and the third downscaler 1570 may respectively downscale the original image 105 and the modified image 1552 by using the same scale method. For example, the first downscaler 1510 and the third downscaler 1570 may respectively downscale the original image 105 and the modified image 1552 by using a nearest neighbor scale method.

According to an implementation, the first downscaler 1510 and the third downscaler 1570 may respectively downscale the original image 105 and the modified image 1552 by using different scale methods from each other. For example, the first downscaler 1510 may downscale the original image 105 by using a nearest neighbor scale method, and the third downscaler 1570 may downscale the modified image 1552 by using a bicubic scale method.

The subtractor 1590 obtains, as a reduction feature map 1592, a residual image between a first reduced image 1512 obtained by the first downscaler 1510 and a second reduced image 1572 obtained by the third downscaler 1570. The residual image may include difference values between pixel values of one image of the first reduced image 1512 and the second reduced image 1572 and pixel values of the other image thereof.

The first reduced image 1512 and the reduction feature map 1592 are concatenated 1595 and input to the first DNN 2500. The sum of the number of first reduced images 1512 and the number of reduction feature maps 1592 has to be equal to the number of input channels of the first layer of the first DNN 2500. In FIG. 15, 5×5×2n×k of a first convolution layer 2500, which is the first layer of the first DNN 2510, means that the first convolution layer 2510 processes 2n images with k filter kernels each having a 5×5 size and outputs k feature maps. Here, n and k are real numbers greater than zero.

Because the number of input channels of the first convolution layer 2510 is 2n, the sum of the number of first reduced images 1512 and the number of reduction feature maps 1592 has to be 2n. That is, when the number of first reduced images 1512 is p, the number of reduction feature maps 1592 has to be 2n-p.

In an embodiment of the disclosure, the first downscaler 1510 obtains p first reduced images 1512 by downscaling the original image 105 by using p different scale methods (p is a natural number) from each other. The third downscaler 1570 obtains q second reduced images 1572 by downscaling the modified image 1552 by using q different scale methods (q is a natural number) from each other. The subtractor 1590 may obtain 2n-p residual images between the p first reduced images 1512 and the q second reduced images 1572. The p first reduced images 1512 and the 2n-p residual images may be input to the first DNN 2500.

In another embodiment of the disclosure, the first downscaler 1510 obtains n first reduced images 1512 by downscaling the original image 105 by using n different scale methods from each other. The third downscaler 1570 obtains one second reduced image 1572 by downscaling the modified image 1552 by using any one of the scale methods. The subtractor 1590 may obtain n residual images between each of the n first reduced images 1512 and one second reduced image 1572. The n first reduced images 1512 and the n residual images may be input to the first DNN 2500.

In another embodiment of the disclosure, the first downscaler 1510 obtains n first reduced images 1512 by downscaling the original image 105 by using n different scale methods from each other. The third downscaler 1570 obtains n second reduced images 1572 by downscaling the modified image 1552 by using n different scale methods from each other. The subtractor 1590 may obtain n residual images between the n first reduced images 1512 and the n second reduced images 1572. For example, the subtractor 1590 may map the n first reduced images 1512 and the n second reduced images 1572 on a one-to-one basis, and may obtain n residual images between the first reduced images 1512 and the second reduced images 1572 mapped to each other. The n first reduced images 1512 and the n residual images may be input to the first DNN 2500.

In another embodiment of the disclosure, the first downscaler 1510 obtains n different first reduced images 1512 from the original image 105 according to a nearest neighbor scale method, and the third downscaler 1570 obtains n different second reduced images 1572 according to a nearest neighbor scale method. The subtractor 1590 may obtain n residual images between the n first reduced images 1512 and the n second reduced images 1572. The n first reduced images 1512 and the n residual images may be input to the first DNN 2500. Because the nearest neighbor scale method has been described with reference to FIG. 14, detailed descriptions are omitted herein.

The pre-processor 1313 may determine the resolutions of the first reduced image 1512 and the second reduced image 1572 according to the target resolution of the first image 115. For example, when a ratio between the target resolution of the first image 115 and the resolution of the original image 105 is ½, the pre-processor 1313 may determine the resolutions of the first reduced image 1512 and the second reduced image 1572 to be half the resolution of the original image 105. The first downscaler 1510 and the third downscaler 1570 may respectively obtain the first reduced image 1512 and the second reduced image 1572, the resolutions of which are reduced by half, as compared with the original image 105.

As another example, when a ratio between the target resolution of the first image 115 and the resolution of the original image 105 is ¼, the pre-processor 1313 may determine the resolutions of the first reduced image 1512 and the second reduced image 1572 to be half the resolution of the original image 105. The first downscaler 1510 and the third downscaler 1570 may respectively obtain the first reduced image 1512 and the second reduced image 1572, the resolutions of which are reduced by half, as compared with the original image 105. In this case, in order to obtain the first image 115, the resolution of which is reduced by quarter as compared with the original image 105, the first DNN 2500 may perform an operation of reducing the resolutions of the first reduced image 1512 and the reduction feature map 1592 by half The first reduced image 1512 and the reduction feature map 1592 are input to the first convolution layer 2510. The first convolution layer 2510 performs a convolution process on the first reduced image 1512 and the reduction feature map 1592 by using k filter kernels each having a 5×5 size. k feature maps generated as a result of the convolution process are input to a first activation layer 2520.

The first activation layer 2520 may impart non-linear characteristics to the k feature maps. An output of the first activation layer 2520 is input to the second convolution layer 2530.

The second convolution layer 2530 performs a convolution process on k feature maps by using one filter kernel having a 5×5 size. As a result of the convolution process, one image may be output from the second convolution layer 2530.

The first image 115 may be obtained by adding the reduced image obtained by the second downscaler 1530 to the image output from the second convolution layer 2530. In an embodiment of the disclosure, when the resolution of the reduced image obtained by the second downscaler 1530 is different from the resolution of the image output from the second convolution layer 2530, the resolution of the reduced image obtained by the second downscaler 1530 may be scaled according to the resolution of the image output from the second convolution layer 2530. According to an implementation, the second downscaler 1530 may downscale the original image 105 according to the resolution of the first image 115. In this case, the upscaler 1550 may upscale the reduced image obtained by the second downscaler 1530 according to the resolution of the original image 105.

According to an implementation, the reduced image obtained by the second downscaler 1530 is not added to the image output from the second convolution layer 2530, and the image output from the second convolution layer 2530 may be determined as the first image 115.

FIG. 15 illustrates that the first DNN 2500 includes two convolution layers 2510 and 2530 and one activation layer 2520, but this is only an example. According to an implementation, the number of convolution layers and the number of activation layers may be variously changed. Also, according to an implementation, the first DNN 2500 may be implemented through an RNN. That is, a CNN structure of the first DNN 2500 according to the embodiment of the disclosure may be changed to an RNN structure.

FIG. 15 illustrates that the size of the filter kernel of the convolution layers 2510 and 2530 is 5×5, but this is only an example. The size of the filter kernel used in each convolutional layer may vary according to an implementation.

Figure 16:
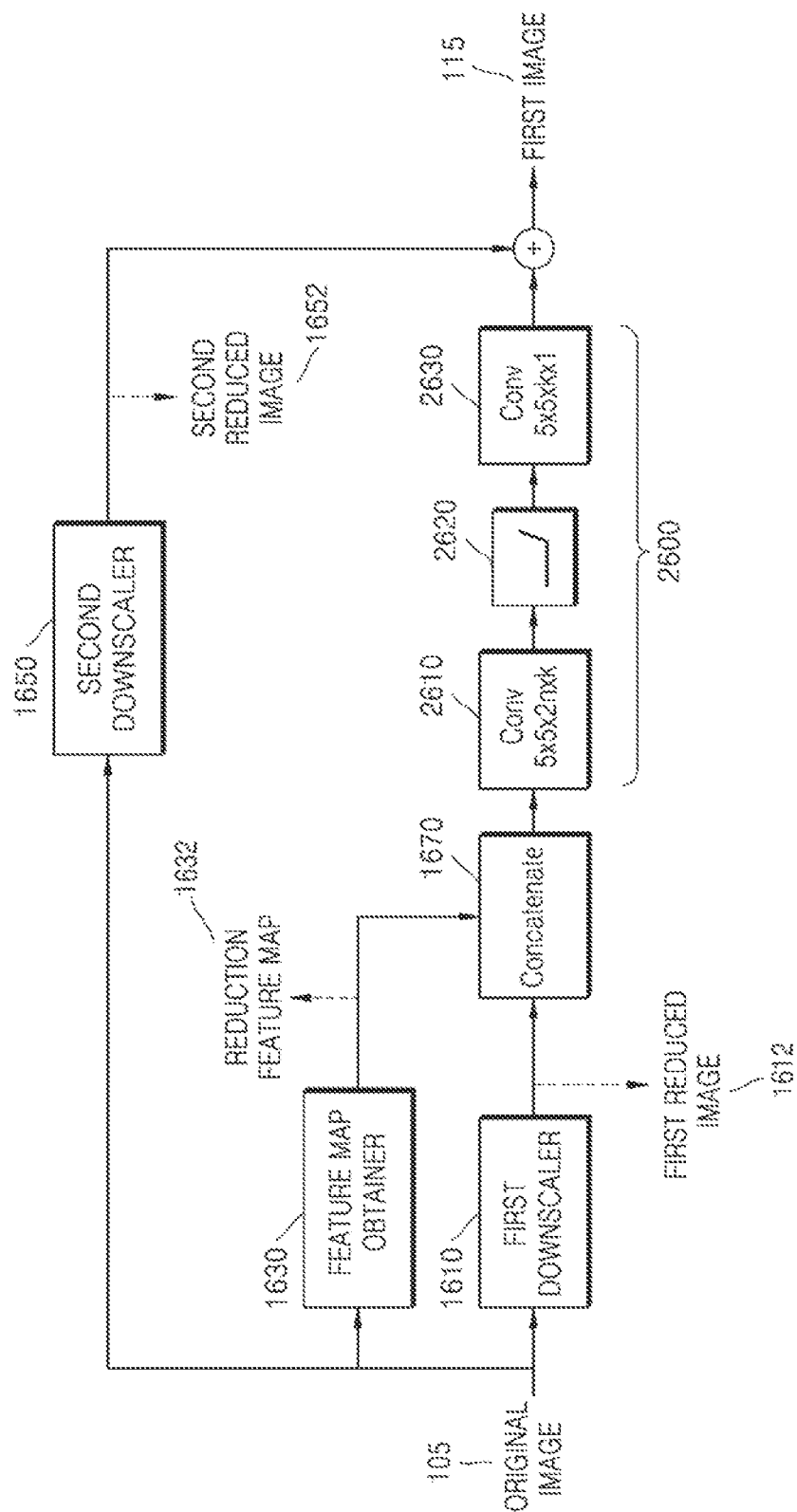
FIG. 16 is a diagram for describing an AI downscale process using a first DNN, according to another embodiment of the disclosure.

FIG. 16 is a diagram for describing an AI downscale process using a first DNN 2600, according to another embodiment of the disclosure.

A pre-processor 1313 may include a first downscaler 1610, a feature map obtainer 1630, and a second downscaler 1650 so as to pre-process an original image 105. According to an implementation, the second downscaler 1650 may not be included in the pre-processor 1313.

The first downscaler 1610 may downscale the original image 105 according to a previously determined scale method. The first downscaler 1610 downscales the original image 105 by using a rule-based scale method.

The feature map obtainer 1630 generates a reduction feature map 1632 from the original image 105 according to a previously determined feature map extraction algorithm. When a resolution of an image generated according to the feature map extraction algorithm is different from a resolution of a first reduced image 1612 obtained by the first downscaler 1610, the feature map obtainer 1630 may scale the resolution of the image generated according to the feature map extraction algorithm so as to match the resolution of the first reduced image 1612.

In an embodiment of the disclosure, the feature map obtainer 1630 may obtain an edge map generated according to an edge detection algorithm as the reduction feature map 1632. The edge detection algorithm may include a sobel algorithm, a prewitt algorithm, a Roberts algorithm, a compass algorithm, or a canny algorithm, but is not limited thereto.

Because the edge map well shows the edge characteristics of the original image 105, for example, the amount of change in brightness in the vertical direction and the amount of change in brightness in the horizontal direction, the AI downscale considering image characteristics may be performed more quickly as the edge map is input to the first DNN 2600 as the reduction feature map 1632.

In an embodiment of the disclosure, the feature map obtainer 1630 may obtain the reduction feature map 1632 by processing the original image 105 with a neural network. For example, the feature map obtainer 1630 may obtain the reduction feature map 1632 by using a neural network such as VGGnet.

The first reduced image 1612 and the reduction feature map 1632 obtained by the feature map obtainer 1630 are concatenated 1670 and input to the first DNN 2600.

The sum of the number of first reduced images 1612 and the number of reduction feature maps 1632 has to be equal to the number of input channels of the first layer of the first DNN 2600. In FIG. 16, 5×5×2n×k of a first convolution layer 2600, which is the first layer of the first DNN 2610, means that the first convolution layer 2610 processes 2n images with k filter kernels each having a 5×5 size and outputs k feature maps. Here, n and k are real numbers greater than zero.

Because the number of input channels of the first convolution layer 2610 is 2n, the sum of the number of first reduced images 1612 and the number of reduction feature maps 1632 has to be 2n. That is, when the number of first reduced images 1612 is p, the number of reduction feature maps 1632 has to be 2n-p.

In an embodiment of the disclosure, the first downscaler 1610 obtains p first reduced images 1612 by downscaling the original image 105 by using p different scale methods (p is a natural number) from each other. The feature map obtainer 1630 may obtain 2n-p reduction feature maps 1632 according to 2n-p feature map extraction algorithms.

In another embodiment of the disclosure, the first downscaler 1610 may obtain different p first reduced images 1612 from the original image 105 according to a nearest neighbor scale method. The feature map obtainer 1630 may obtain 2n-p reduction feature maps 1632 according to the 2n-p feature map extraction algorithms.

The pre-processor 1313 may determine the resolutions of the first reduced image 1612 and the reduction feature map 1632 according to the target resolution of the first image 115.

For example, when a ratio between the target resolution of the first image 115 and the resolution of the original image 105 is ½, the pre-processor 1313 may determine the resolutions of the first reduced image 1612 and the reduction feature map 1632 to be half the resolution of the original image 105. The first downscaler 1610 and the feature map obtainer 1630 may respectively obtain the first reduced image 1612 and the reduction feature map 1632, the resolutions of which are reduced by half, as compared with the original image 105.

As another example, when a ratio between the target resolution of the first image 115 and the resolution of the original image 105 is ¼, the pre-processor 1313 may determine the resolutions of the first reduced image 1612 and the reduction feature map 1632 to be half the resolution of the original image 105. The first downscaler 1610 and the feature map obtainer 1630 may respectively obtain the first reduced image 1612 and the reduction feature map 1632, the resolutions of which are reduced by half, as compared with the original image 105. In this case, in order to obtain the first image 115, the resolution of which is reduced by quarter as compared with the original image 105, the first DNN 2600 may perform an operation of reducing the resolutions of the first reduced image 1612 and the reduction feature map 1632 by half.

The first reduced image 1612 and the reduction feature map 1632 are input to the first convolution layer 2610. The first convolution layer 2610 performs a convolution process on the first reduced image 1612 and the reduction feature map 1632 by using k filter kernels each having a 5×5 size. k feature maps generated as a result of the convolution process are input to a first activation layer 2620.

The first activation layer 2620 may impart non-linear characteristics to the k feature maps. An output of the first activation layer 2620 is input to the second convolution layer 2630.

The second convolution layer 2630 performs a convolution process on k feature maps by using one filter kernel having a 5×5 size. As a result of the convolution process, one image may be output from the second convolution layer 2630. The image output from the second convolution layer 2630 may be determined as the first image 115.

As illustrated in FIG. 16, an image output from the second convolution layer 2630 and a second reduced image 1652 obtained by the second downscaler 1650 are added to obtain the first image 115. The second downscaler 2630 may obtain the second reduced image 1652 by legacy-downscaling the original image.

FIG. 16 illustrates that the first DNN 2600 includes two convolution layers 2610 and 2630 and one activation layer 2620, but this is only an example. According to an implementation, the number of convolution layers and the number of activation layers may be variously changed. Also, according to an implementation, the first DNN 2600 may be implemented through an RNN. That is, a CNN structure of the first DNN 2600 according to the embodiment of the disclosure may be changed to an RNN structure.

FIG. 16 illustrates that the size of the filter kernel of the convolution layers 2610 and 2630 is 5×5, but this is only an example. The size of the filter kernel used in each convolutional layer may vary according to an implementation.

Figure 17:
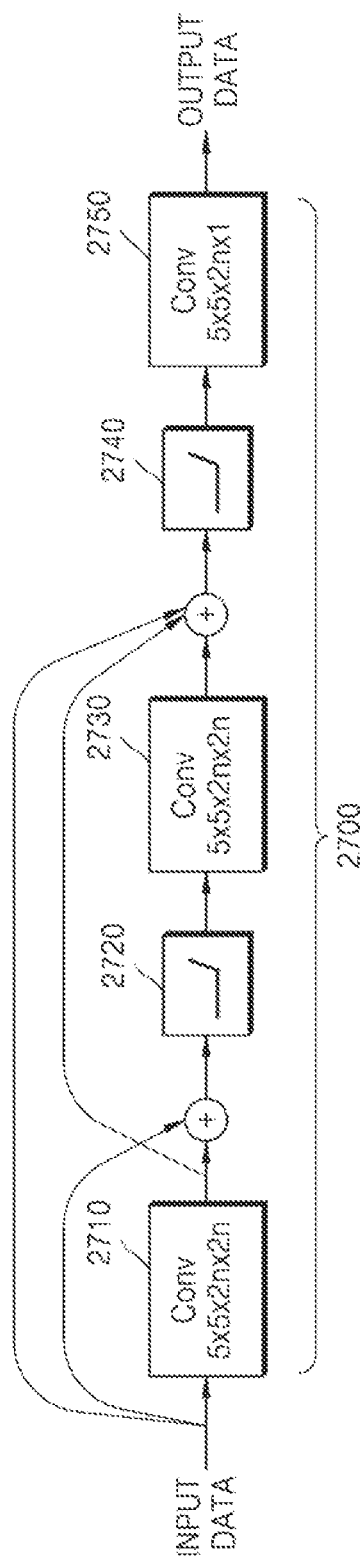
FIG. 17 is an exemplary diagram illustrating a first DNN according to another embodiment of the disclosure.

FIG. 17 is an exemplary diagram illustrating a first DNN 2700 according to another embodiment of the disclosure.

The first DNN 2700 may correspond to any one of the first DNNs 2400, 2500, and 2600 described above with reference to FIGS. 14 to 16. The first DNN 2700 may include a plurality of convolutional layers 2710, 2730, and 2750 and a plurality of activation layers 2720 and 2740, but the number of convolutional layers and the number of activation layers may be variously determined according to an implementation.

Referring to FIG. 17, output data of any one convolution layer 2710 or 2730 is added to output data and input data of a previous layer of the convolution layer 2710 or 2730 and then transmitted to a next layer of the convolution layer 2170 or 2730. For example, convolutional layers are connected to all preceding convolutional layers instead of being connected to only an immediately preceding convolutional layer, such that input data of the first DNN 2700 is input to the second convolution layer 2730 as well as to the first convolution layer 2710.

Specifically, the output of the first convolution layer 2710 is added to the input data and then transmitted to the first activation layer 2720, and the output of the second convolution layer 2730 is added to the output and input data of the first convolution layer 2710 and then transmitted to the second activation layer 2740. The output of the third convolution layer 2750 may be determined as output data of the first DNN 2700. As described above, the output data of the first DNN 2700 may be added to the reduced image obtained by the second downscalers 1430, 1530, and 1650 of FIGS. 14 to 16 to obtain the first image 115.

Referring to FIG. 17, the number of input channels and the number of output channels (the number of filter kernels) of the first convolution layer 2710 and the second convolution layer 2730 are all 2n, and the number of input channels of the third convolution layer 2750 is 2n. When 2n output data and 2n input data of the first convolution layer 2710 are added together, element values of output data and input data, that is, pixel values or sample values, may be added for each channel corresponding to each other. When 2n output data of the second convolution layer 2730 are added to 2n output data and 2n input data of the first convolution layer 2710, element values of output data and input data, that is, pixel values, may be added for each channel corresponding to each other.

The output data and the input data of the previous layer are added to the output data of any one layer so as to reduce the number of input channels and the number of output channels to be processed in each layer. Because the decrease in the number of input channels of each convolution layer means that the number of images or feature maps subjected to the convolution process has decreased, the amount of computations for the convolution process may be reduced.

Figure 18:
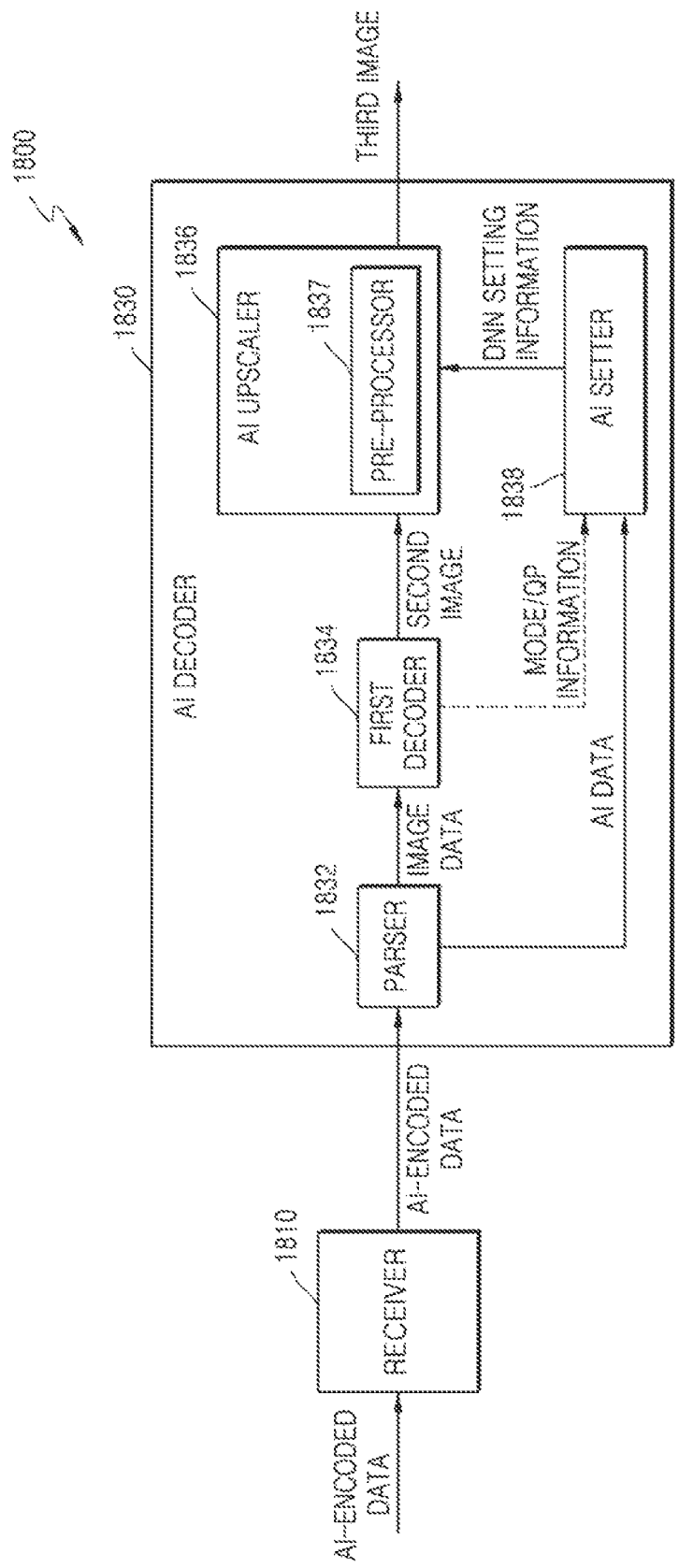
FIG. 18 is a block diagram illustrating a configuration of an AI decoding apparatus, according to another embodiment of the disclosure.

FIG. 18 is a block diagram illustrating a configuration of an AI decoding apparatus 1800, according to another embodiment of the disclosure.

Referring to FIG. 18, the AI decoding apparatus 1800 may include a receiver 1810 and an AI decoder 1830. The AI decoder 1830 may include a parser 1832, a first decoder 1834, an AI upscaler 1836, and an AI setter 1838.

The functions of the receiver 1810 and the AI decoder 1830 may be the same as the functions of the receiver 210 and the AI decoder 230 described above with reference to FIG. 2. That is, the receiver 1810 receives AI-encoded data and transmits the received AI-encoded data to the AI decoder 1830. The parser 1832 of the AI decoder 1830 parses the AI-encoded data, outputs image data included in the AI-encoded data to the first decoder 1834, and outputs AI data to the AI setter 1838. The first decoder 1834 obtains a second image 135 by performing a first decoding process on the image data, and transmits the second image 135 to the AI upscaler 1836. The AI setter 1838 transmits, to the AI upscaler 1836, DNN setting information obtained from among a plurality of pieces of DNN setting information based on the AI data. The AI upscaler 1836 obtains a third image 145 by performing an AI upscale process on the second image 135 according to the DNN setting information. Because the functions of the receiver 1810 and the AI decoder 1830 have been described in detail with reference to FIG. 2, detailed descriptions thereof are omitted herein.

Comparing the AI upscaler 1836 with the AI upscaler 236 illustrated in FIG. 2, the AI upscaler 1836 includes a pre-processor 1837.

The pre-processor 1837 pre-processes the second image 135 and inputs data obtained as a result of the pre-processing to the second DNN.

In an embodiment of the disclosure, the data obtained as a result of the pre-processing may include a plurality of images having a resolution higher than that of the second image 135. The resolution of the images may be higher than the resolution of the second image 135 and lower than the resolution of the third image 145. Alternatively, the resolution of the images may be equal to the resolution of the third image 145.

Because the images having a resolution higher than that of the second image 135 are input to the second DNN, the amount of computations to be performed in the second DNN may be reduced, as compared with the case in which a single second image 135 is input to the second DNN. In other words, when the second image 135 is input to the second DNN, an operation of increasing the resolution of the second image 135 to the resolution of the third image 145 is required, but when images having a resolution higher than that of the second image 135 are input to the second DNN, an operation of increasing the resolution of the image may not be required, or the amount of computations may be reduced.

Because the number of layers included in the second DNN is proportional to the amount of computations, the number of layers included in the second DNN may be decreased by reducing the amount of computations to be performed in the second DNN.

Some images obtained as a result of the pre-processing may include a feature map of the second image 135. The feature map represents unique characteristics of the second image 135, for example, a vertical direction characteristic, a horizontal direction characteristic, or an edge characteristic. The second DNN may quickly grasp the characteristics of the second image 135 by using the feature map input from the pre-processor 1837 without the need to directly obtain, from the second image 135, the feature map representing the characteristics of the second image 135.

That is, according to an embodiment of the disclosure, the structure of the second DNN may be simplified because a plurality of images, which have a resolution higher than that of the second image 135 and some of which are the feature maps, are input to the second DNN.

The pre-processor 1837 may pre-process the second image 135 by using a rule-based method instead of a neural network requiring a large amount of computations.

In an embodiment of the disclosure, the data obtained as a result of the pre-processing may include a first enlarged image upscaled from the second image 135 and an enlargement feature map corresponding to the second image 135. The first enlarged image may be obtained by upscaling the second image by using a legacy scale method. In an embodiment of the disclosure, the legacy scale method may include at least one of a nearest neighbor scale method, a bilinear scale method, a bicubic scale method, a lanczos scale method, or a stair step scale method.

The resolution of the first enlarged image and the enlargement feature map is higher than the resolution of the second image 135. For example, the resolution of the first enlarged image and the enlargement feature map may be equal to the resolution of the third image 145.

The second DNN obtains the third image 145 by processing the first enlarged image and the enlargement feature map output from the pre-processor 1837. As described above, the second DNN may operate according to DNN setting information selected based on AI data from among a plurality of pieces of DNN setting information.

Hereinafter, the configuration of the pre-processor 1837 and the structure of the second DNN that processes the pre-processed data will be described in detail.

Figure 19:
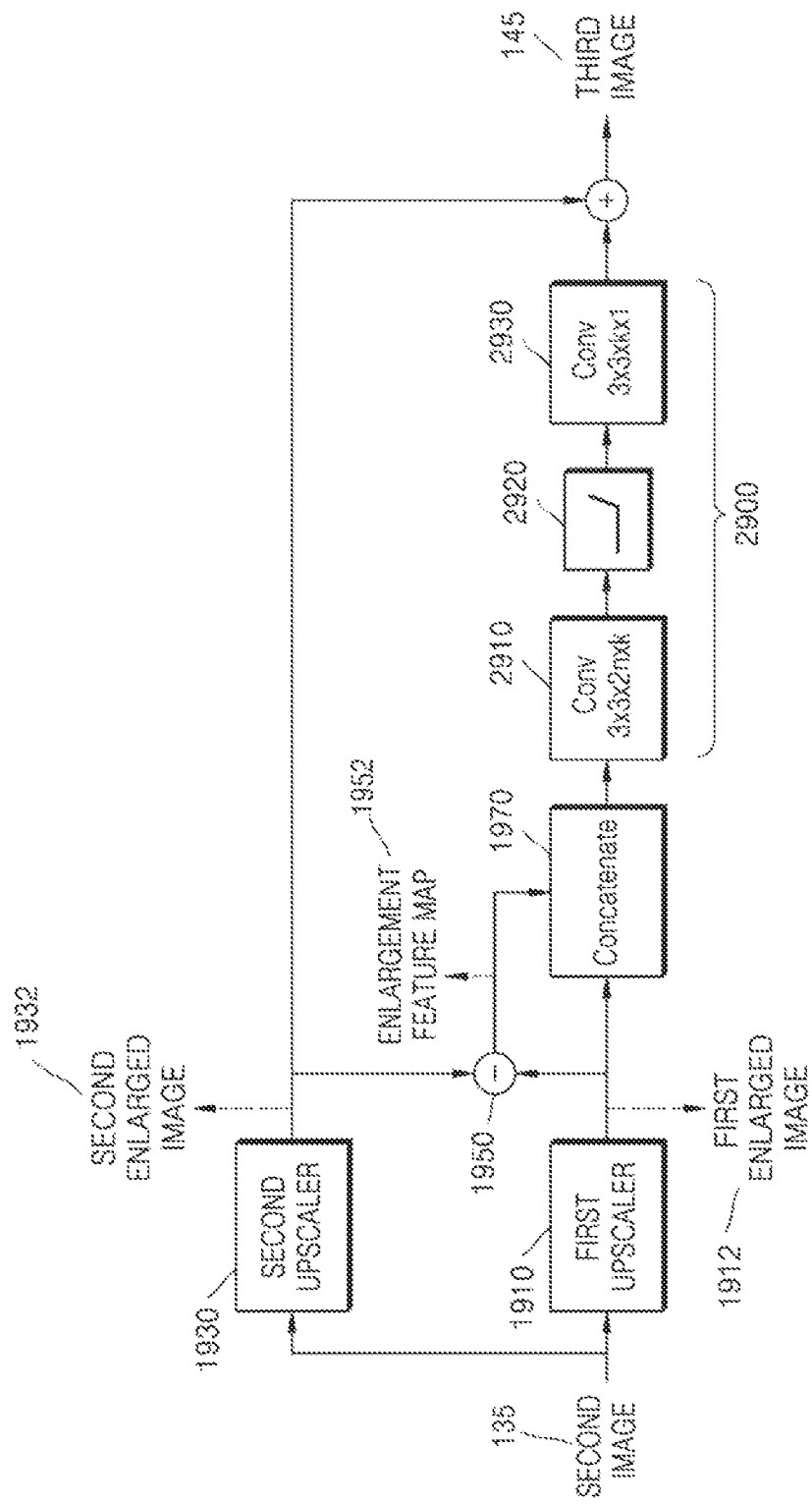
FIG. 19 is a diagram for describing an AI upscale process using a second DNN, according to an embodiment of the disclosure.

FIG. 19 is a diagram for describing an AI upscale process using a second DNN 2900, according to an embodiment of the disclosure.

A pre-processor 1837 includes a first upscaler 1910, a second upscaler 1930, and a subtractor 1950 so as to pre-process a second image 135.

Each of the first upscaler 1910 and the second upscaler 1930 may upscale the second image 135 according to a previously determined scale method. The first upscaler 1910 and the second upscaler 1930 upscales the second image 135 by using a rule-based scale method.

In an embodiment of the disclosure, the rule-based scale method may include at least one of a nearest neighbor scale method, a bilinear scale method, a bicubic scale method, a lanczos scale method, or a stair step scale method.

Each of the first upscaler 1910 and the second upscaler 1930 may upscale the second image 135 according to different scale methods from each other. For example, the first upscaler 1910 may upscale the second image 135 by using a nearest neighbor scale method, and the second upscaler 1930 may upscale the second image 135 by using a bicubic scale method.

The first upscaler 1910 obtains a first enlarged image 1912 by upscaling the second image 135. The second upscaler 1930 obtains a second enlarged image 1932 by upscaling the second image 135.

The subtractor 1950 obtains a residual image between the second enlarged image 1932 and the first enlarged image 1912 as an enlargement feature map 1952. The residual image may include difference values between pixel values of one image of the first enlarged image 1912 and the second enlarged image 1932 and pixel values of the other image thereof.

The first enlarged image 1912 and the enlargement feature map 1952 are concatenated 1970 and input to the second DNN 2900.

The sum of the number of first enlarged images 1912 and the number of enlargement feature maps 1952 has to be equal to the number of input channels of the first layer of the second DNN 2900. In FIG. 19, 3×3×2n×k of a first convolution layer 2910, which is the first layer of the second DNN 2900, means that the first convolution layer 2910 processes 2n images with k filter kernels each having a 3×3 size and outputs k feature maps. Here, n and k are real numbers greater than zero.

Because the number of input channels of the first convolution layer 2910 is 2n, the sum of the number of first enlarged images 1912 and the number of enlargement feature maps 1952 has to be 2n. That is, when the number of first enlarged images 1912 is p, the number of enlargement feature maps 1952 has to be 2n-p.

In an embodiment of the disclosure, the first upscaler 1910 obtains p first enlarged images 1912 by upscaling the second image 135 by using p different scale methods (p is a natural number) from each other. The second upscaler 1930 obtains q second enlarged images 1932 by upscaling the second image 135 by using q different scale methods (q is a natural number) from each other. The subtractor 1950 may obtain 2n-p residual images between the p first enlarged images 1912 and the q second enlarged images 1932. The p first enlarged images 1912 and the 2n-p residual images may be input to the second DNN 2900.

In another embodiment of the disclosure, the first upscaler 1910 obtains n first enlarged images 1912 by upscaling the second image 135 by using n different scale methods from each other. The second upscaler 1930 obtains one second enlarged image 1932 by upscaling the second image 135 by using any one of the scale methods. The subtractor 1950 may obtain n residual images between each of the n first enlarged images 1912 and one second enlarged image 1932. The n first enlarged images 1912 and the n residual images may be input to the second DNN 2900.

In another embodiment of the disclosure, the first upscaler 1910 obtains n first enlarged images 1912 by upscaling the second image 135 by using n different scale methods from each other. The second upscaler 1930 obtains n second enlarged images 1932 by upscaling the second image 135 by using n different scale methods from each other. The subtractor 1950 may obtain n residual images between the n first enlarged images 1912 and the n second enlarged images 1932. The n first enlarged images 1912 and the n residual images may be input to the second DNN 2900.

In another embodiment of the disclosure, the first upscaler 1910 obtains n different first enlarged images 1912 from the second image 135 according to a nearest neighbor scale method, and the second upscaler 1930 obtains one second enlarged image 1932 by upscaling the second image 135 by any one of the scale methods. The subtractor 1950 may obtain n residual images between each of the n first enlarged images 1912 and one second enlarged image 1932. The n first enlarged images 1912 and the n residual images may be input to the second DNN 2900.

According to the nearest neighbor scale method, in order to obtain n first enlarged images 1912, the first upscaler 1910 may generate new pixels around each pixel included in the second image 135, and may obtain the first enlarged image 1912 including pixels included in the second image 135 and newly generated pixels. At this time, in order to obtain n different first enlarged images 1912, the first upscaler 1910 may generate new pixels by applying each pixel included in the second image 135 to different operation expressions.

The pre-processor 1837 may determine the resolutions of the first enlarged image 1912 and the second enlarged image 1932 according to the target resolution of the third image 145. For example, when the target resolution of the third image 145 is twice the resolution of the second image 135, the pre-processor 1837 may determine the resolutions of the first enlarged image 1912 and the second enlarged image 1932 to be twice the resolution of the second image 135. The first upscaler 1910 and the second upscaler 1930 may respectively obtain, from the second image 135, the first enlarged image 1912 and the second enlarged image 1932, the resolutions of which are increased by twice.

As another example, when the target resolution of the third image 145 is four times the resolution of the second image 135, the pre-processor 1837 may determine the resolutions of the first enlarged image 1912 and the second enlarged image 1932 to be twice the resolution of the second image 135. The first upscaler 1910 and the second upscaler 1930 may respectively obtain, from the second image 135, the first enlarged image 1912 and the second enlarged image 1932, the resolutions of which are increased by twice. In this case, in order to obtain the third image 145, the resolution of which is increased by four times as compared with the second image 135, the second DNN 2900 may perform an operation of increasing the resolutions of the first enlarged image 1912 and the enlargement feature map 1952 by twice.

The first enlarged image 1912 and the enlargement feature map 1952 are input to the first convolution layer 2910. The first convolution layer 2910 performs a convolution process on the first enlarged image 1912 and the enlargement feature map 1952 by using k filter kernels each having a 3×3 size. k feature maps generated as a result of the convolution process are input to a first activation layer 2920.

The first activation layer 2920 may impart non-linear characteristics to the k feature maps. The first activation layer 2920 determines whether to transmit the sample values of the feature maps output from the first convolution layer 2910 to a second convolution layer 2930. For example, some sample values of the feature maps are activated by the first activation layer 2920 and are transmitted to the second convolution layer 2930, and some sample values thereof are deactivated by the first activation layer 2920 and are not transmitted to the second convolution layer 2930. Information indicated by the feature maps output from the first convolution layer 2910 is emphasized by the first activation layer 2920.

An output of the first activation layer 2920 is input to the second convolution layer 2930. The second convolution layer 2930 performs a convolution process on k feature maps by using one filter kernel having a 3×3 size. As a result of the convolution process, one image may be output from the second convolution layer 2930.

The third image 145 may be obtained by adding the second enlarged image 1932 obtained by the second upscaler 1930 to the image output from the second convolution layer 2930. That the second enlarged image 1932 is added to the image output from the second convolutional layer 2930 may mean that the pixel values of the two images are added to obtain one image. In an embodiment of the disclosure, when the resolution of the second enlarged image 1932 is different from the resolution of the image output from the second convolution layer 2930, the resolution of the second enlarged image 1932 may be scaled according to the resolution of the image output from the second convolution layer 2930.

According to an implementation, the second enlarged image 1932 is not added to the image output from the second convolution layer 2930, and the image output from the second convolution layer 2930 may be determined as the third image 145.

FIG. 19 illustrates that the second DNN 2900 includes two convolution layers 2910 and 2930 and one activation layer 2920, but this is only an example. According to an implementation, the number of convolution layers and the number of activation layers may be variously changed. Also, according to an implementation, the second DNN 2900 may be implemented through an RNN. That is, a CNN structure of the second DNN 2900 according to the embodiment of the disclosure may be changed to an RNN structure.

FIG. 19 illustrates that the size of the filter kernel of the convolution layers 2910 and 2930 is 3×3, but this is only an example. The size of the filter kernel used in each convolutional layer may vary according to an implementation.

Figure 20:
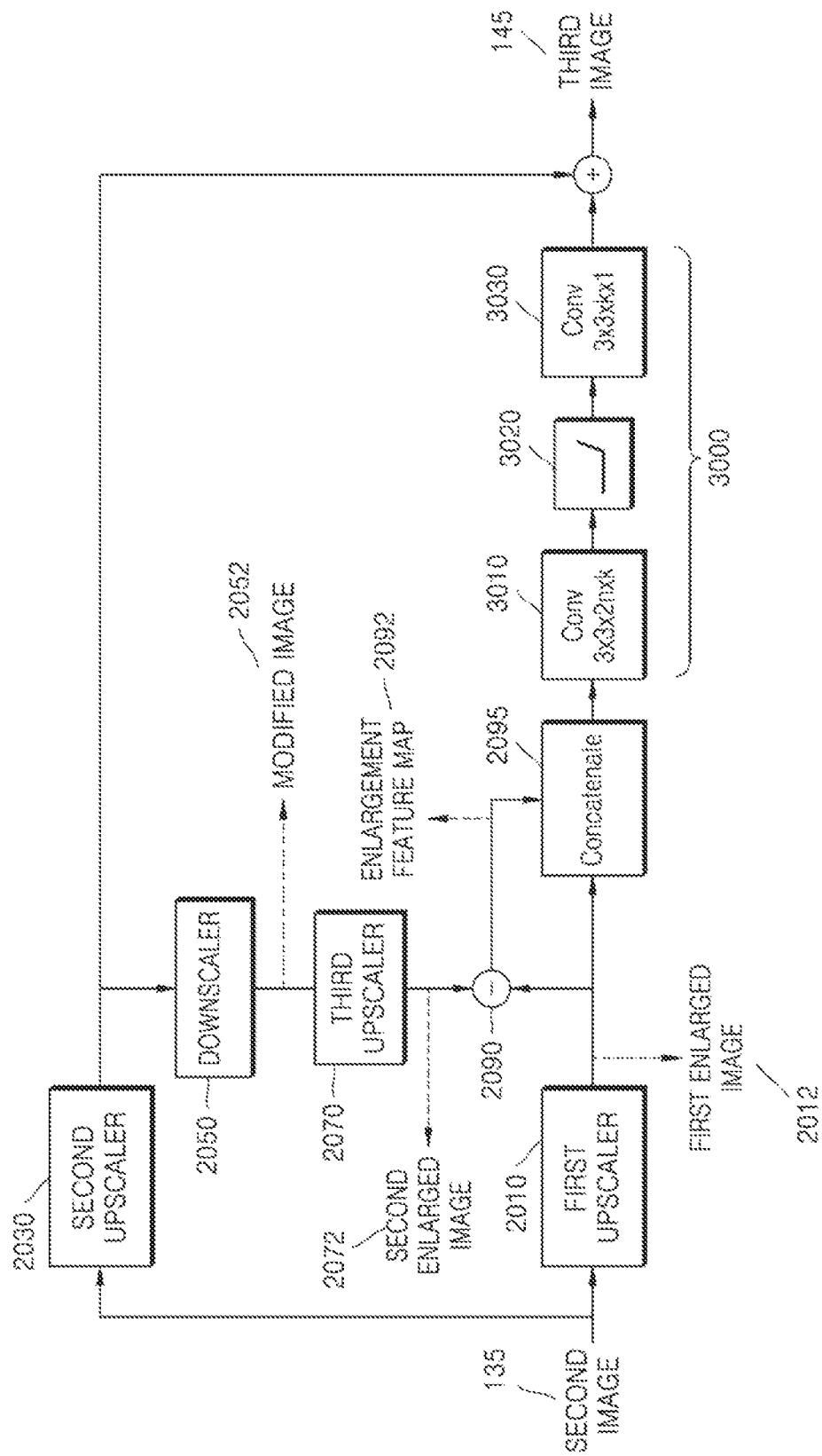
FIG. 20 is a diagram for describing an AI upscale process using a second DNN, according to another embodiment of the disclosure.

FIG. 20 is a diagram for describing an AI upscale process using a second DNN 3000, according to another embodiment of the disclosure.

A pre-processor 1837 includes a first upscaler 2010, a second upscaler 2030, a downscaler 2050, a third upscaler 2070, and a subtractor 2090 so as to pre-process a second image 135.

The first upscaler 2010 may upscale the second image 135 according to a previously determined scale method. The first upscaler 2010 upscales the second image 135 by using a rule-based scale method.

The second upscaler 2030 and the downscaler 2050 may upscale and downscale the second image 135 according to a previously determined scale method.

The scale method used by the first upscaler 2010 and the scale method used by the second upscaler 2030 and the downscaler 2050 may be identical to or different from each other.

A modified image 2052 is obtained from the second image 135 according to the upscale and the downscale of the second upscaler 2030 and the downscaler 2050. The resolution of the modified image 2052 may be equal to the resolution of the second image 135. The second upscaler 2030 and the downscaler 2050 are for quality degradation of the second image 135, and at least some pixel values in the second image 135 may be changed by the second upscaler 2030 and the downscaler 2050.

The third upscaler 2070 may upscale the modified image 2052 according to a previously determined scale method. The third upscaler 2070 upscales the modified image 2052 by using a rule-based scale method.

The first upscaler 2010 and the third upscaler 2070 may upscale the second image 135 and the modified image 2052 according to the same scale method. For example, the first upscaler 2010 and the third upscaler 2070 may upscale the second image 135 and the modified image 2052 according to a nearest neighbor scale method.

According to an implementation, the first upscaler 2010 and the third upscaler 2070 may upscale the second image 135 and the modified image 2052 according to different scale methods from each other. For example, the first upscaler 2010 may upscale the second image 135 by using a nearest neighbor scale method, and the third upscaler 2070 may upscale the modified image 2052 by using a bicubic scale method.

The subtractor 2090 obtains, as an enlargement feature map 2092, a residual image between a first enlarged image 2012 obtained by the first upscaler 2010 and a second enlarged image 2072 obtained by the third upscaler 2070. The residual image may include difference values between pixel values of one image of the first enlarged image 2012 and the second enlarged image 2072 and pixel values of the other image thereof.

The first enlarged image 2012 and the enlargement feature map 2092 are concatenated 2095 and input to the second DNN 3000.

The sum of the number of first enlarged images 2012 and the number of enlargement feature maps 2092 has to be equal to the number of input channels of the first layer of the second DNN 3000. In FIG. 20, 3×3×2n×k of a first convolution layer 3000, which is the first layer of the second DNN 3010, means that the first convolution layer 3010 processes 2n images with k filter kernels each having a 3×3 size and outputs k feature maps. Here, n and k are real numbers greater than zero.

Because the number of input channels of the first convolution layer 3010 is 2n, the sum of the number of first enlarged images 2012 and the number of enlargement feature maps 2092 has to be 2n. That is, when the number of first enlarged images 2012 is p, the number of enlargement feature maps 2092 has to be 2n-p.

In an embodiment of the disclosure, the first upscaler 2010 obtains p first enlarged images 2012 by upscaling the second image 135 by using p different scale methods (p is a natural number) from each other. The third upscaler 2070 obtains q second enlarged images 2072 by upscaling the modified image 2052 by using q different scale methods (q is a natural number) from each other. The subtractor 2090 may obtain 2n-p residual images between the p first enlarged images 2012 and the q second enlarged images 2072. The p first enlarged images 2012 and the 2n-p residual images may be input to the second DNN 3000.

In another embodiment of the disclosure, the first upscaler 2010 obtains n first enlarged images 2012 by upscaling the second image 135 by using n different scale methods from each other. The third upscaler 2070 obtains one second enlarged image 2072 by upscaling the modified image 2052 by using any one of the scale methods. The subtractor 2090 may obtain n residual images between each of the n first enlarged images 2012 and one second enlarged image 2072. The n first enlarged images 2012 and the n residual images may be input to the second DNN 3000.

In another embodiment of the disclosure, the first upscaler 2010 obtains n first enlarged images 2012 by upscaling the second image 135 by using n different scale methods from each other. The third upscaler 2070 obtains n second enlarged images 2072 by upscaling the modified image 2052 by using n different scale methods from each other. The subtractor 2090 may obtain n residual images between the n first enlarged images 2012 and the n second enlarged images 2072. The n first enlarged images 2012 and the n residual images may be input to the second DNN 3000.

In another embodiment of the disclosure, the first upscaler 2010 obtains n different first enlarged images 2012 from the second image 135 according to a nearest neighbor scale method, and the third upscaler 2070 obtains n different second enlarged image 2072 from the modified image 2052 according to a nearest neighbor scale method. The subtractor 2090 may obtain n residual images between the n first enlarged images 2012 and the n second enlarged images 2072. For example, the subtractor 2090 may map the n first enlarged images 2012 and the n second enlarged images 2072 on a one-to-one basis, and may obtain n residual images between the first enlarged images 2012 and the second enlarged images mapped to each other. The n first enlarged images 2012 and the n residual images may be input to the second DNN 3000. Because the nearest neighbor scale method has been described with reference to FIG. 19, detailed descriptions are omitted herein.

The pre-processor 1837 may determine the resolutions of the first enlarged image 2012 and the second enlarged image 2072 according to the target resolution of the third image 145. For example, when the target resolution of the third image 145 is twice the resolution of the second image 135, the pre-processor 1837 may determine the resolutions of the first enlarged image 2012 and the second enlarged image 2072 to be twice the resolution of the second image 135. The first upscaler 2010 and the third upscaler 2070 may respectively obtain, from the second image 135 and the modified image 2052, the first enlarged image 2012 and the second enlarged image 2072, the resolutions of which are increased by twice.

As another example, when the target resolution of the third image 145 is four times the resolution of the second image 135, the pre-processor 1837 may determine the resolutions of the first enlarged image 2012 and the second enlarged image 2072 to be twice the resolution of the second image 135 and the modified image 2052. The first upscaler 2010 and the third upscaler 2070 may respectively obtain, from the second image 135 and the modified image 2052, the first enlarged image 2012 and the second enlarged image 2072, the resolutions of which are increased by twice. In this case, in order to obtain the third image 145, the resolution of which is increased by four times as compared with the second image 135, the second DNN 3000 may perform an operation of increasing the resolutions of the first enlarged image 2012 and the enlargement feature map 2092 by twice.

The first enlarged image 2012 and the enlargement feature map 2092 are input to the first convolution layer 3010. The first convolution layer 3010 performs a convolution process on the first enlarged image 2012 and the enlargement feature map 2092 by using k filter kernels each having a 3×3 size. k feature maps generated as a result of the convolution process are input to a first activation layer 3020.

The first activation layer 3020 may impart non-linear characteristics to the k feature maps.

An output of the first activation layer 3020 is input to the second convolution layer 3030. The second convolution layer 3030 performs a convolution process on k feature maps by using one filter kernel having a 3×3 size. As a result of the convolution process, one image may be output from the second convolution layer 3030.

The third image 145 may be obtained by adding the enlarged image obtained by the second upscaler 2030 to the image output from the second convolution layer 3030. In an embodiment of the disclosure, when the resolution of the enlarged image obtained by the second upscaler 2030 is different from the resolution of the image output from the second convolution layer 3030, the resolution of the enlarged image obtained by the second upscaler 2030 may be scaled according to the resolution of the image output from the second convolution layer 3030. Alternatively, the second upscaler 2030 may upscale the second image 135 according to the resolution of the third image 145. In this case, the downscaler 2050 may downscale the enlarged image obtained by the second upscaler 2030 according to the resolution of the second image 135.

According to an implementation, the enlarged image obtained by the second upscaler 2030 is not added to the image output from the second convolution layer 3030, and the image output from the second convolution layer 3030 may be determined as the third image 145.

FIG. 20 illustrates that the second DNN 3000 includes two convolution layers 3010 and 3030 and one activation layer 3020, but this is only an example. According to an implementation, the number of convolution layers and the number of activation layers may be variously changed. Also, according to an implementation, the second DNN 3000 may be implemented through an RNN. That is, a CNN structure of the second DNN 3000 according to the embodiment of the disclosure may be changed to an RNN structure.

FIG. 20 illustrates that the size of the filter kernel of the convolution layers 3010 and 3030 is 3×3, but this is only an example. The size of the filter kernel used in each convolutional layer may vary according to an implementation.

Figure 21:
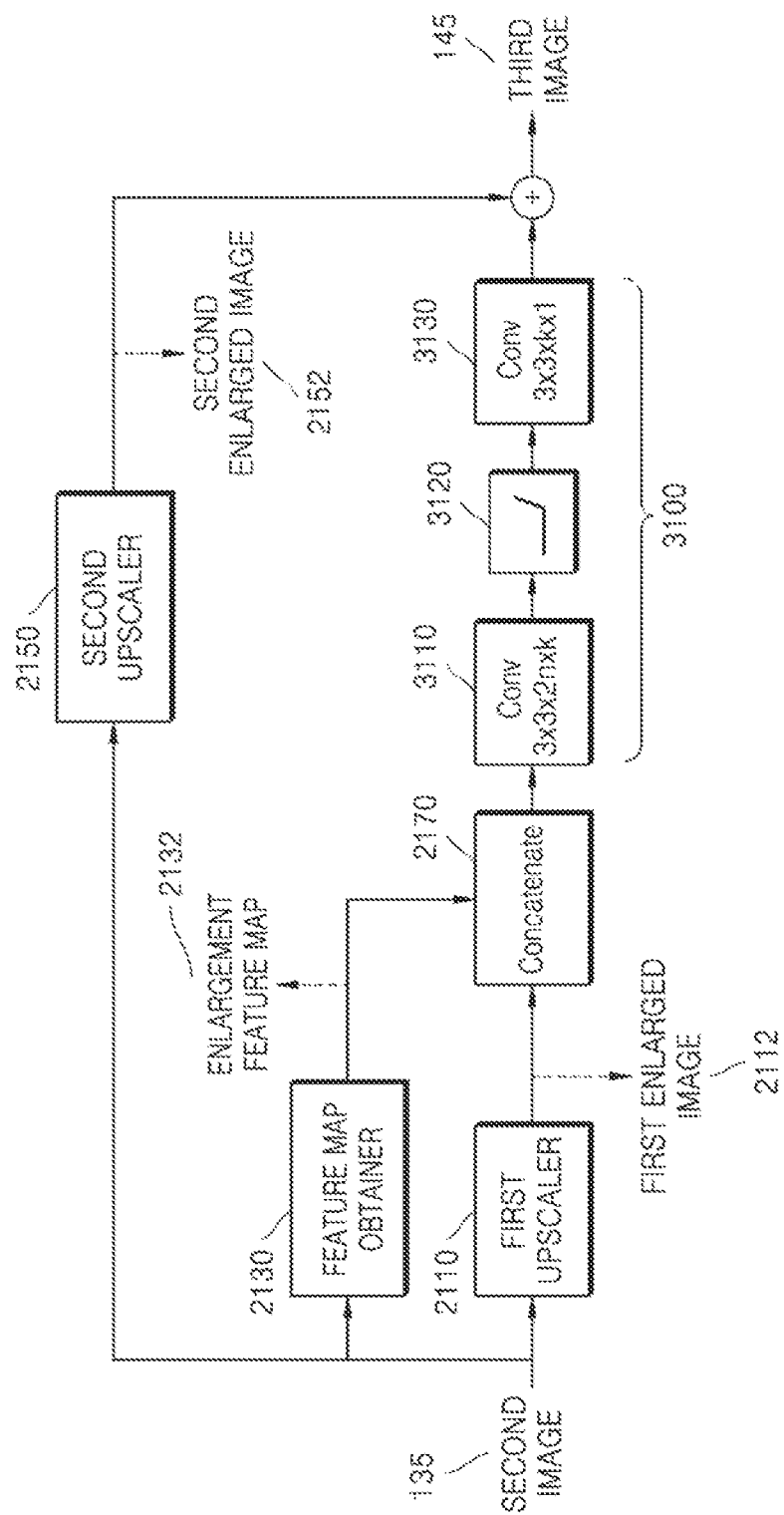
FIG. 21 is a diagram for describing an AI upscale process using a second DNN, according to another embodiment of the disclosure.

FIG. 21 is a diagram for describing an AI upscale process using a second DNN 3100, according to another embodiment of the disclosure.

A pre-processor 1837 may include a first upscaler 2110, a feature map obtainer 2130, and a second upscaler 2150 so as to pre-process a second image 135. According to an implementation, the second upscaler 2150 may not be included in the pre-processor 1837.

The first upscaler 2110 may upscale the second image 135 according to a previously determined scale method. The first upscaler 2110 upscales the second image 135 by using a rule-based scale method.

The feature map obtainer 2130 generates an enlargement feature map 2132 from the second image 135 according to a previously determined feature map extraction algorithm. When a resolution of an image generated according to the feature map extraction algorithm is different from a resolution of a first enlarged image 2112, the feature map obtainer 2130 may scale the resolution of the image generated according to the feature map extraction algorithm so as to match the resolution of the first enlarged image 2112.

In an embodiment of the disclosure, the feature map obtainer 2130 may obtain an edge map generated according to an edge detection algorithm as the enlargement feature map 2132. The edge detection algorithm may include a sobel algorithm, a prewitt algorithm, a Roberts algorithm, a compass algorithm, or a canny algorithm, but is not limited thereto. Because the edge map well shows the edge characteristics of the second image 135, for example, the amount of change in brightness in the vertical direction and the amount of change in brightness in the horizontal direction, the AI upscale considering image characteristics may be performed more quickly as the edge map is input to the second DNN 3100 as the enlargement feature map 2132.

In an embodiment of the disclosure, the feature map obtainer 2130 may obtain the enlargement feature map 2132 by processing the second image 135 with a neural network. For example, the feature map obtainer 2130 may obtain the enlargement feature map 2132 by using a neural network such as VGGnet.

The first enlarged image 2112 and the enlargement feature map 2132 are concatenated 2170 and input to the second DNN 3100.

The sum of the number of first enlarged images 2112 and the number of enlargement feature maps 2132 has to be equal to the number of input channels of the first layer of the second DNN 3100. In FIG. 21, 3×3×2n×k of a first convolution layer 3100, which is the first layer of the second DNN 3110, means that the first convolution layer 3110 processes 2n images with k filter kernels each having a 3×3 size and outputs k feature maps. Here, n and k are real numbers greater than zero.

Because the number of input channels of the first convolution layer 3110 is 2n, the sum of the number of first enlarged images 2112 and the number of enlargement feature maps 2132 has to be 2n. That is, when the number of first enlarged images 2112 is p, the number of enlargement feature maps 2132 has to be 2n-p.

In an embodiment of the disclosure, the first upscaler 2110 may obtain p first enlarged images 2112 by upscaling the second image 135 by using p different scale methods (p is a natural number) from each other. The feature map obtainer 2130 may obtain 2n-p enlargement feature maps 2132 according to the 2n-p feature map extraction algorithms.

In another embodiment of the disclosure, the first upscaler 2110 may obtain p different first enlarged images 2112 from the second image 135 according to a nearest neighbor scale method. The feature map obtainer 2130 may obtain 2n-p enlargement feature maps 2132 according to the 2n-p feature map extraction algorithms.

The pre-processor 1837 may determine the resolutions of the first enlarged image 2112 and the enlargement feature map 2132 according to the target resolution of the third image 145.

For example, when the target resolution of the third image 145 is twice the resolution of the second image 135, the pre-processor 1837 may determine the resolutions of the first enlarged image 2112 and the enlargement feature map 2132 to be twice the resolution of the second image 135. The first upscaler 2110 and the feature map obtainer 2130 may respectively obtain the first enlarged image 2112 and the enlargement feature map 2132, the resolutions of which are increased by twice as compared with the second image 135.

As another example, when the target resolution of the third image 145 is four times the resolution of the second image 135, the pre-processor 1837 may determine the resolutions of the first enlarged image 2112 and the enlargement feature map 2132 to be twice the resolution of the second image 135. The first upscaler 2110 and the feature map obtainer 2130 may respectively obtain the first enlarged image 2112 and the enlargement feature map 2132, the resolutions of which are increased by twice as compared with the second image 135. In this case, in order to obtain the third image 145, the resolution of which is increased by four times as compared with the second image 135, the second DNN 3100 may perform an operation of increasing the resolutions of the first enlarged image 2112 and the enlargement feature map 2132 by twice.

The first enlarged image 2112 and the enlargement feature map 2132 are input to the first convolution layer 3110. The first convolution layer 3110 performs a convolution process on the first enlarged image 2112 and the enlargement feature map 2132 by using k filter kernels each having a 3×3 size. k feature maps generated as a result of the convolution process are input to a first activation layer 3120.

The first activation layer 3120 may impart non-linear characteristics to the k feature maps. An output of the first activation layer 3120 is input to the second convolution layer 3130.

The second convolution layer 3130 performs a convolution process on k feature maps by using one filter kernel having a 3×3 size. As a result of the convolution process, one image may be output from the second convolution layer 3130. The image output from the second convolution layer 3130 may be determined as the third image 145.

As illustrated in FIG. 21, the image output from the second convolution layer 3130 and the second enlarged image 2152 obtained by the second upscaler 2150 are added to obtain the third image 145. The second upscaler 2150 may obtain a second enlarged image 2152 by legacy-upscaling the second image 135.

FIG. 21 illustrates that the second DNN 3100 includes two convolution layers 3110 and 3130 and one activation layer 3120, but this is only an example. According to an implementation, the second DNN 3100 may be implemented through an RNN. That is, a CNN structure of the second DNN 3100 according to the embodiment of the disclosure may be changed to an RNN structure.

FIG. 21 illustrates that the size of the filter kernel of the convolution layers 3110 and 3130 is 3×3, but this is only an example. The size of the filter kernel used in each convolutional layer may vary according to an implementation.

In the second DNNs 2900, 3000, and 3100 described in connection with FIGS. 19 to 21, the output of any one convolution layer may be added to the output of the previous layer and the input data of the second DNNs 2900, 3000, and 3100 and transmitted to the next layer. For example, as described with reference to FIG. 17 illustrating the first DNN 2700, the output of the first convolution layer 2710 may be added to the input data of the second DNN and transmitted to the next layer, and the output of the second convolution layer may be added to the output of the first convolution layer and the input data of the second DNN and transmitted to the next layer.

Hereinafter, the method of obtaining the residual image (i.e., the reduction feature map or the enlargement feature map) described with reference to FIGS. 14, 15, 19, and 20 will be described with reference to FIGS. 22 to 24.

Figure 22:
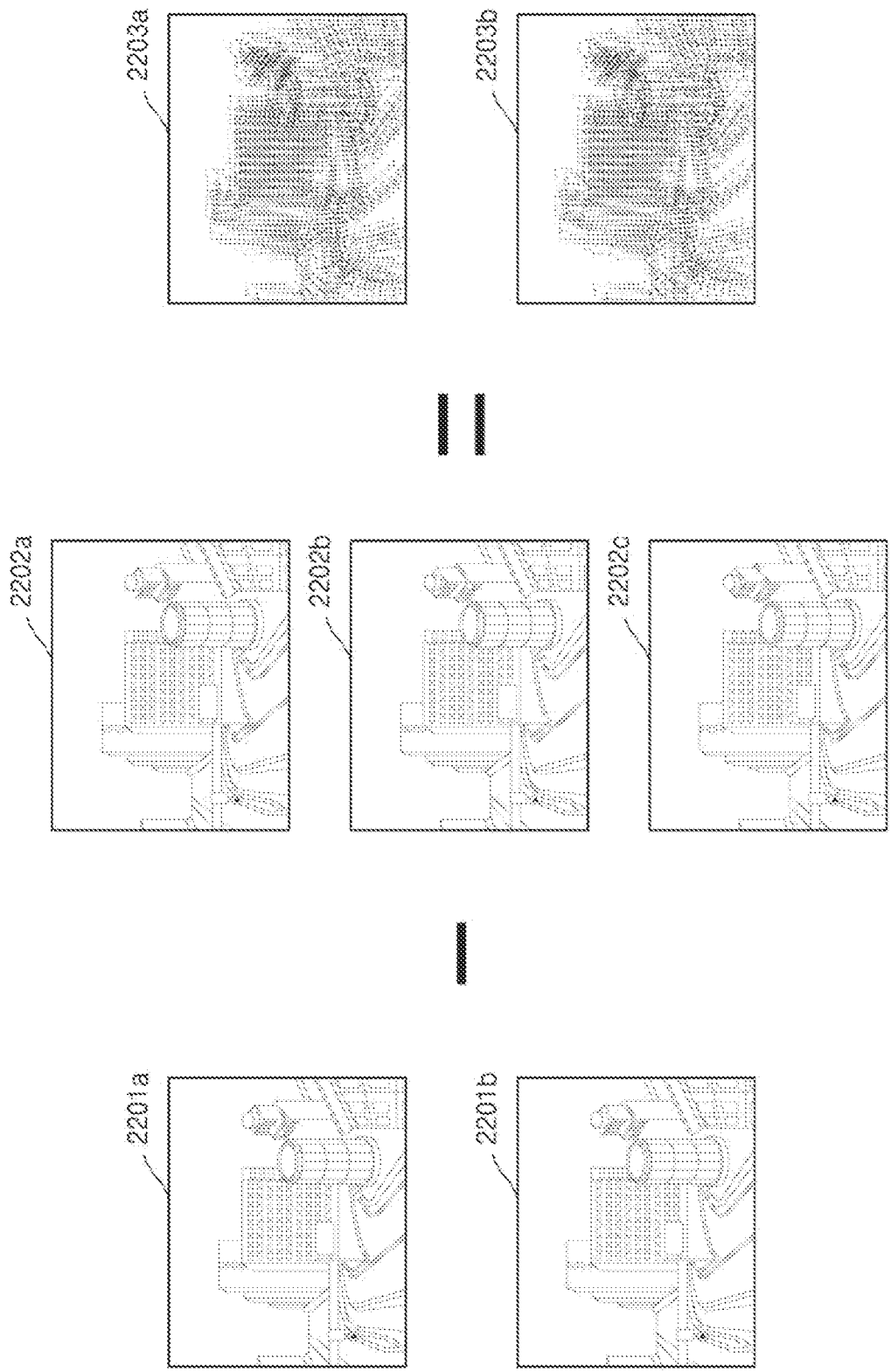
FIG. 22 is a diagram for describing a method of obtaining a residual image using a first reduced image (or a first enlarged image) and a second reduced image (or a second enlarged image)
Figure 23:
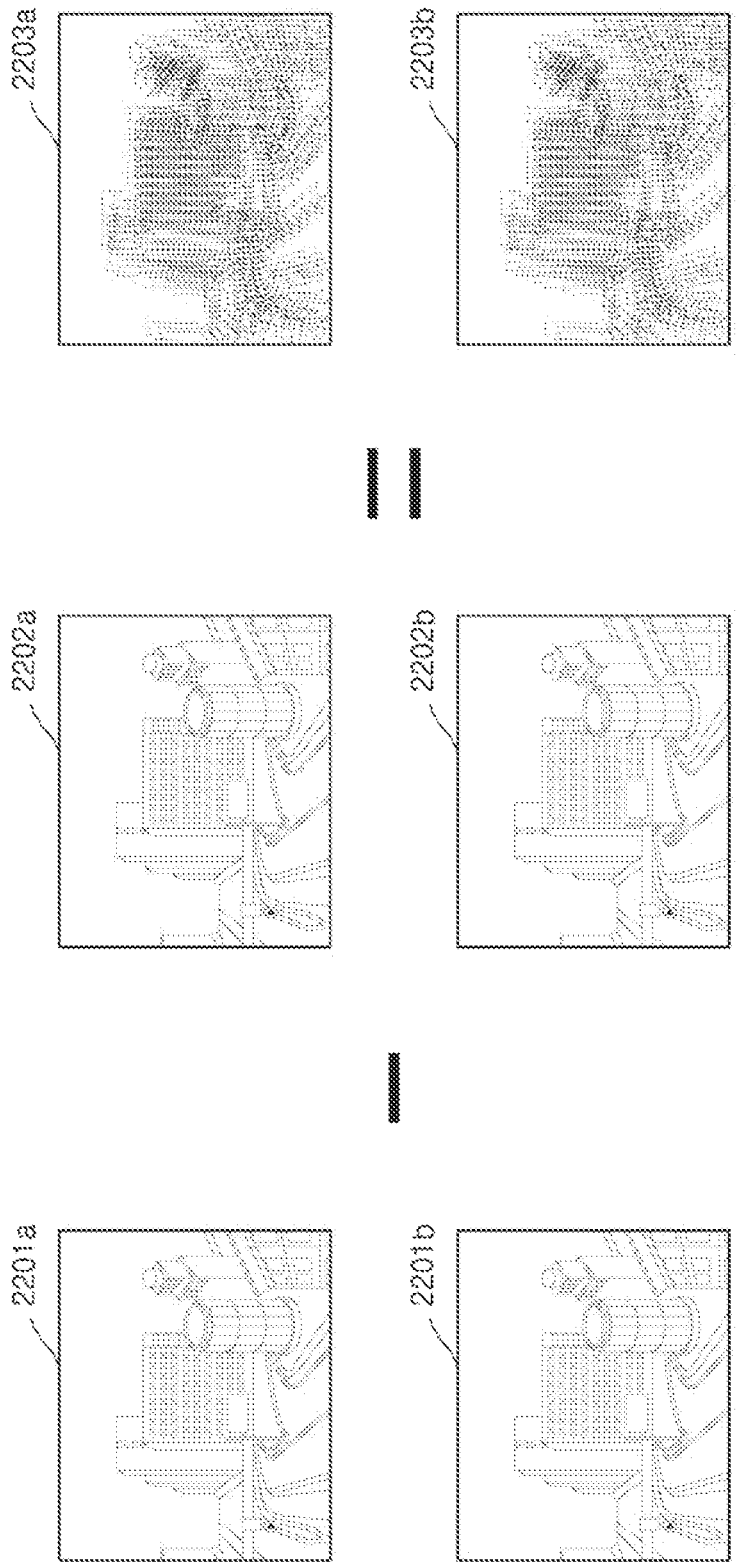
FIG. 23 is a diagram for describing a method of obtaining a residual image using a first reduced image (or a first enlarged image) and a second reduced image (or a second enlarged image)
Figure 24:
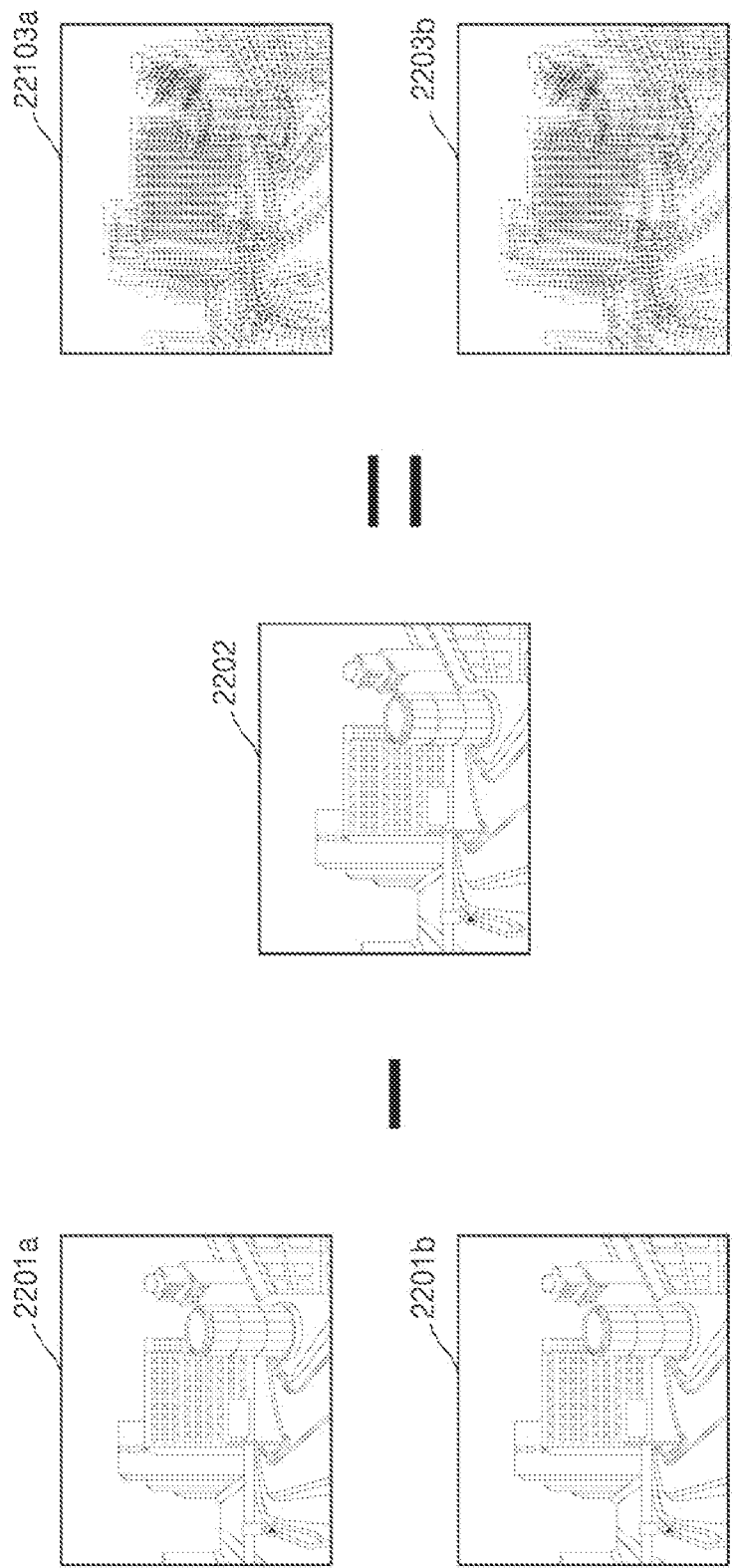
FIG. 24 is a diagram for describing a method of obtaining a residual image using a first reduced image (or a first enlarged image) and a second reduced image (or a second enlarged image)

FIGS. 22 to 24 are diagrams for describing a method of obtaining a residual image using a first reduced image (or a first enlarged image) and a second reduced image (a second enlarged image).

The following description will be given focusing on the first reduced image, the second reduced image, and the first DNN, it will be apparent that the first reduced image, the second reduced image, and the first DNN may be replaced with the first enlarged image, the second enlarged image, and the second DNN, respectively.

As described above, when the number of input channels of the first layer of the first DNN is 2n, the sum of the number of first reduced images and the number of residual images input to the first DNN has to be 2n.

FIGS. 22 to 24 illustrate the case in which 2n is 4.

As illustrated in FIG. 22, when the number of first reduced images 2201*a* and 2201*b* is 2 and the number of second reduced images 2202*a*, 2202*b*, and 2202*c* is 3, two residual images 2203*a* and 2203*b* are obtained between the first reduced images 2201*a* and 2201*b* and the second reduced images 2202*a*, 2202*b*, and 2202*c*.

Specifically, one residual image 2203*a* may be obtained between any one of the two first reduced images 2201*a* and 2201*b* and any one of the three second reduced images 2202*a*, 2202*b*, and 2202*c*. The other residual image 2203*b* may be obtained between any one of the two first reduced images 2201*a* and 2201*b* and any one of the three second reduced images 2202*a*, 2202*b*, and 2202*c*. In particular, in order to prevent the case in which the two residual images 2203*a* and 2203*b* are the same as each other, different pairs of the first reduced image and the second reduced image used to obtain the second residual image 2203*b* may be different from the first reduced image and/or the second reduced image used to obtain the first residual image 2203*a*. Among six pairs of the first reduced image and the second reduced image, which include a first pair of the first reduced image 2201*a* and the second reduced image 2202*a*, a second pair of the first reduced image 2201*a* and the second reduced image 2202*b*, a third pair of the first reduced image 2201*a* and the second reduced image 2202*c*, a fourth pair of the first reduced image 2201*b* and the second reduced image 2202*a*, a fifth pair of the first reduced image 2201*b* and the second reduced image 2202*b*, and a sixth pair of the first reduced image 2201*b* and the second reduced image 2202*c*, two different pairs are selected to obtain the first residual image 2203*a* and the second residual image 2203*b*. For example, when the first reduced image 2201*a* and the second reduced image 2202*a* are used to obtain the first residual image 2203*a*, the first reduced image 2201*a* and the second reduced image 2202*b*, the first reduced image 2201*b* and the second reduced image 2202*a*, or the first reduced image 2201*b* and the second reduced image 2202*b* may be used to obtain the second residual image 2203*b*. That is, by generating the residual images 2203*a* and 2203*b* to be different from each other, the type of data input to the first DNN may be diversified.

Next, as illustrated in FIG. 23, when the number of first reduced images 2201a and 2201b is 2 and the number of second reduced images 2202a and 2202b is 2, one residual image 2203a may be obtained between any one of the two first reduced images 2201a and 2201b and any one of the two second reduced images 2202a and 2202b. The other residual image 2203b may be obtained between any one of the two first reduced images 2201a and 2201b and any one of the two second reduced images 2202a and 2202b. At this time, in order to prevent the case in which the two residual images 2203a and 2203b are the same as each other, the first reduced image and/or the second reduced image used to obtain the second residual image 2203b may be different from the first reduced image and/or the second reduced image used to obtain the first residual image 2203a. For example, when the first reduced image 2201a and the second reduced image 2202a are used to obtain the first residual image 2203a, the first reduced image 2201a and the second reduced image 2202b, the first reduced image 2201b and the second reduced image 2202a, or the first reduced image 2201b and the second reduced image 2202b may be used to obtain the second residual image 2203b.

Next, as illustrated in FIG. 24, when the number of first reduced images 2201a and 2201b is 2 and the number of second reduced image 2202 is 1, two residual images 2203a and 2203b may be obtained between each of the two first reduced images 2201a and 2201b and one second reduced image 2202. That is, the residual image 2203a between the first reduced image 2201a and the second reduced image 2202, and the residual image 2203b between the first reduced image 2201b and the second reduced image 2202 are obtained.

FIGS. 22 to 24 only illustrate an embodiment of the disclosure for matching the sum of the number of first reduced images and the number of residual images with the number of input channels of the first layer of the first DNN, and methods other than the methods described with reference to FIGS. 22 to 24 may be used within the range apparent to those of ordinary skill in the art.

Hereinafter, a method of training the first DNN 2400, 2500, 2600, or 2700 and the second DNN 2900, 3000, or 3100 with low complexity will be described with reference to FIG. 25.

Figure 25:
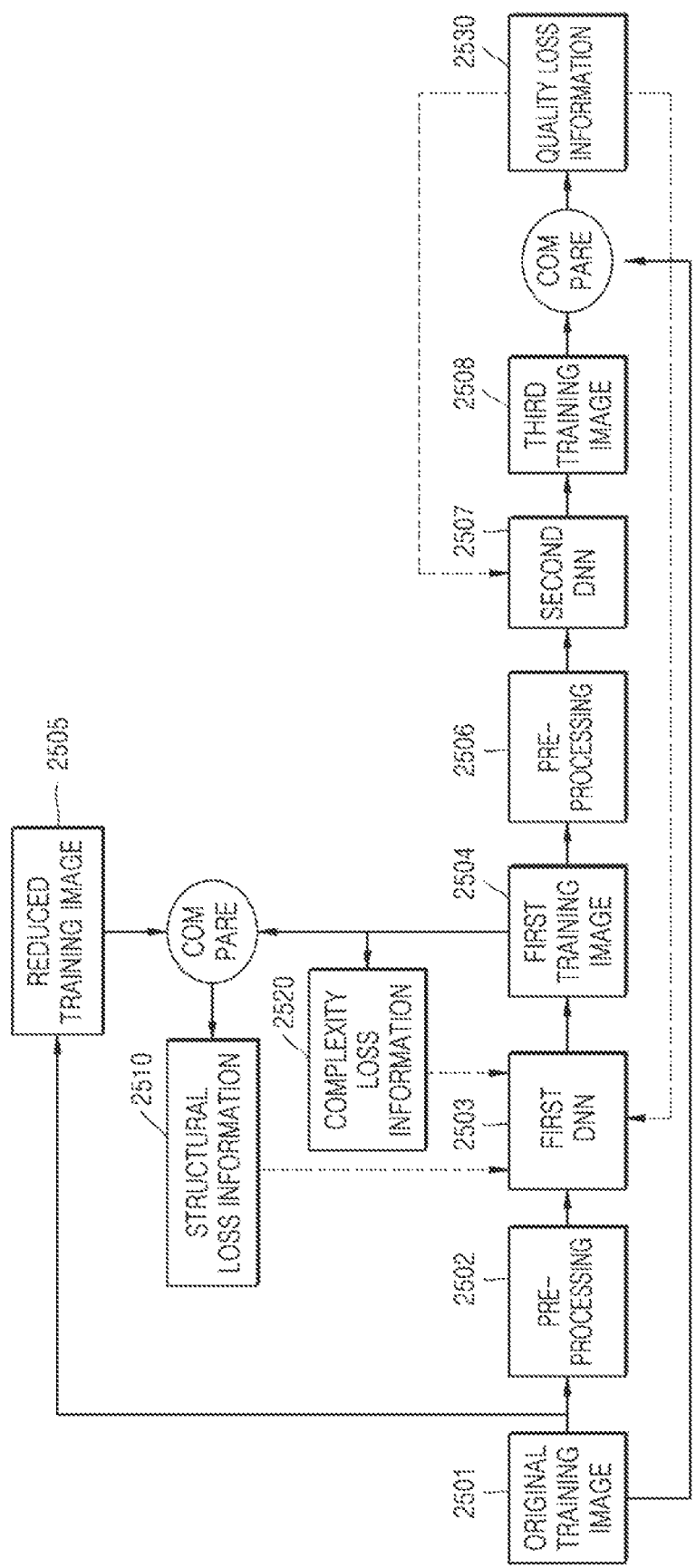
FIG. 25 is a diagram for describing another method of training a first DNN and a second DNN.

FIG. 25 is a diagram for describing a method of training a first DNN 2503 and a second DNN 2507.

The first DNN 2503 illustrated in FIG. 25 may be the above-described first DNN 2400, 2500, 2600, or 2700, and the second DNN 2507 may be the above-described second DNN 2900, 3000, or 3100.

Comparing FIG. 25 with FIG. 11 described above, it may be seen that, in the training process illustrated in FIG. 25, an original training image 2501 is pre-processed 2502 before being input to the first DNN 2503, and a first training image 2504 (or a second training image) is pre-processed 2506 before being input to the second DNN 2507.

Specifically, the original training image 2501 is pre-processed 2502, and a reduced image and a reduction feature map obtained as a result of the pre-processing 2502 are input to the first DNN 2503. The pre-processing 2502 may be the same as the process performed by the above-described pre-processor 1313.

The first training image 2504 output by the first DNN 2503 or the second training image first-encoded/first-decoded from the first training image 2504 is pre-processed 2506. The enlarged image and the enlargement feature map obtained as a result of the pre-processing 2506 are input to the second DNN 2507. The pre-processing 2506 may be the same as the process performed by the above-described pre-processor 1837.

A third training image 2508 is obtained as a result of processing the enlarged image and the enlargement feature map by the second DNN 2507.

Apart from the pre-processing 2502 of the original training image 2501, a downscaled reduced training image 2505 is obtained from the original training image 2501, and structural loss information 2510 corresponding to a result of comparison between the first training image 2504 and the reduced training image 2505 is obtained.

Also, complexity loss information 2520 may be determined based on spatial complexity of the first training image 2504.

Also, quality loss information 2530 may be determined according to a result of comparison between the original training image 2501 and the third training image 2508.

Because the structural loss information 2510, the complexity loss information 2520, and the quality loss information 2530 have been described in detail with reference to FIG. 11, descriptions thereof are omitted herein.

Referring to FIG. 25, the structural loss information 2510, the complexity loss information 2520, and the quality loss information 2530 are used for training the first DNN 2503, and the quality loss information 2530 is used for training the second DNN 2507. That is, the quality loss information 2530 is used for training both the first DNN 2503 and the second DNN 2507.

The first DNN 2503 may update the parameters so that final loss information determined based on the structural loss information 2510, the complexity loss information 2520, and the quality loss information 2530 is reduced or minimized. Also, the second DNN 2507 may update the parameters so that the quality loss information 2530 is reduced or minimized. According to an implementation, the second DNN 2507 may be trained based on the quality loss information 2530 and at least one of the structural loss information 2510 or the complexity loss information 2520.

Because the process of training the first DNN 2503 and the second DNN 2507 based on the final loss information is the same as described with reference to FIG. 11, descriptions thereof are omitted herein. The above-described embodiments of the disclosure may be written as programs or instructions that may be executed on a computer, and the written programs or instructions may be stored in a medium.

The medium may continuously store computer-executable programs or instructions, or may temporarily store computer-executable programs or instructions for execution or download. Also, the medium may be a variety of recording means or storage means in the form of single hardware or a combination of a plurality of hardware, and is not limited to a medium directly connected to a computer system, but may be distributed on a network. Examples of the medium include a magnetic medium such as a hard disk, a floppy disk, and magnetic tape, an optical recording medium such as a CD-ROM and a DVD, a magneto-optical medium such as a floptical disk, read-only memory (ROM), random access memory (RAM), and flash memory, and are configured to store program instructions. Also, examples of other media include a recording medium or a storage medium, which is managed in an application store that distributes applications, a site that supplies or distributes a variety of software, a server, and the like.

The model related to the above-described DNN may be implemented as a software module. When implemented as a software module (e.g., a program module including instructions), the DNN model may be stored in a computer-readable recording medium.

Also, the DNN model may be integrated in the form of a hardware chip so as to be a part of the AI decoding apparatus 200 or the AI encoding apparatus 600 described above. For example, the DNN model may be manufactured in the form of a dedicated hardware chip for AI, or may be manufactured as a part of an existing general-purpose processor (e.g., a CPU or an application processor) or a dedicated graphic processor (e.g., a GPU).

Also, the DNN model may be provided in the form of downloadable software. A computer program product may include a product (e.g., a downloadable application) in the form of a software program that is electronically distributed through a manufacturer or an electronic market. For electronic distribution, at least a part of the software program may be stored in a storage medium or may be temporarily generated. In this case, the storage medium may be a server of a manufacturer or an electronic market, or a storage medium of a relay server.

In the AI encoding apparatus and method and the AI decoding apparatus and method according to the embodiments of the disclosure, an image may be processed at a low bitrate through AI-based image encoding and decoding.

However, the effects that may be achieved by the AI encoding apparatus and method and the AI decoding apparatus and method according to the embodiments of the disclosure are not limited to those described above, and other effects not described herein will be clearly understood by those of ordinary skill in the art from the following description.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A server for providing an image using artificial intelligence (AI), the server comprising:
a processor configured to execute one or more instructions stored in the server to:
obtain, as a reduction feature map having a resolution lower than a resolution of an original image, a residual image between a first reduced image and a second reduced image that are downscaled from the original image;
obtain a first image by inputting, to a downscale neural network (NN), the first reduced image and the reduction feature map, and by adding an output image of a last layer of the downscale NN and the second reduced image;
encode the first image to generate image data; and
provide an electronic device with the image data.

2. The server of claim 1, wherein the processor is further configured to:
obtain a plurality of first reduced images comprising pixels located at different points from each other within pixel groups of the original image; and
obtain, as the reduction feature map, a plurality of residual images between the plurality of first reduced images and the second reduced image.

3. The server of claim 2, wherein a sum of a number of the plurality of first reduced images and a number of the plurality of residual images is equal to a number of input channels of a first layer of the downscale NN.

4. The server of claim 1, wherein the processor is further configured to obtain an edge map corresponding to the original image as the reduction feature map.

5. The server of claim 1, wherein the processor is further configured to:
upscale the second reduced image is downscaled from the original image; and
obtain, as the reduction feature map, the residual image between the second reduced image that is upscaled after being downscaled and the first reduced image.

6. The server of claim 1, wherein output data of any one layer of a plurality of layers of the downscale NN is added to output data of preceding layers prior to the any one layer, and a sum of the output data of the any one layer and the output data of the preceding layers is input to a next layer of the any one layer.

7. A method for providing an image by a server configured to use artificial intelligence (AI), the method comprising:
obtaining, as a reduction feature map having a resolution lower than a resolution of an original image, a residual image between a first reduced image and a second reduced image that are downscaled from the original image
obtaining a first image by inputting, to a downscale neural network (NN), the first reduced image and the reduction feature map and by adding an output image of a last layer of the downscale NN and the second reduced image;
encoding the first image to generate image data; and
providing an electronic device with the image data.

8. The method of claim 1, further comprising:
obtaining a plurality of first reduced images comprising pixels located at different points from each other within pixel groups of the original image; and
obtaining, as the reduction feature map, a plurality of residual images between the plurality of first reduced images and the second reduced image.

9. The method of claim 8, wherein a sum of a number of the plurality of first reduced images and a number of the plurality of residual images is equal to a number of input channels of a first layer of the downscale NN.

10. A computer-readable recording medium having recorded thereon a program for executing the method of claim 7.

* * * * *